United States Patent
Mellen et al.

(10) Patent No.: US 11,104,055 B2
(45) Date of Patent: *Aug. 31, 2021

(54) CONTINUOUS BLOW MOULDING MACHINE, PREFORMS, SYSTEM AND PROCESS

(71) Applicant: INTEGRATED PLASTICS PTY LIMITED, Villawood (AU)

(72) Inventors: Nick Mellen, Villawood (AU); Ho-Seon Kim, Gyeonggi-do (KR)

(73) Assignee: INTEGRATED PLASTICS PTY LIMITED, Villawood (AU)

(*) Notice: Subject to any disclaimer, the term of this patent is extended or adjusted under 35 U.S.C. 154(b) by 0 days.

This patent is subject to a terminal disclaimer.

(21) Appl. No.: 16/649,580

(22) PCT Filed: Sep. 20, 2018

(86) PCT No.: PCT/AU2018/051030
§ 371 (c)(1),
(2) Date: Mar. 20, 2020

(87) PCT Pub. No.: WO2019/056063
PCT Pub. Date: Mar. 28, 2019

(65) Prior Publication Data
US 2020/0254676 A1    Aug. 13, 2020

(30) Foreign Application Priority Data

Sep. 21, 2017  (AU) ................................. 2017903839
Nov. 30, 2017  (AU) ................................. 2017904831

(Continued)

(51) Int. Cl.
*B29C 49/42*  (2006.01)
*B29C 49/64*  (2006.01)
(Continued)

(52) U.S. Cl.
CPC .......... *B29C 49/4205* (2013.01); *B29C 49/06* (2013.01); *B29C 49/08* (2013.01);
(Continued)

(58) Field of Classification Search
CPC .............. B29C 49/062; B29C 49/4205; B29C 2049/4231; B29C 49/36;
(Continued)

(56) References Cited

U.S. PATENT DOCUMENTS 5,542,233 A    8/1996  Graffin
5,683,729 A    11/1997 Valles
(Continued)

OTHER PUBLICATIONS

International Search Report (ISR) and Written Opinion (WO) dated Jan. 25, 2019 for Application No. PCT/AU2018/051030.
(Continued)

*Primary Examiner* — Robert B Davis
(74) *Attorney, Agent, or Firm* — Ladas & Parry LLP

(57) ABSTRACT

A continuously rotating, non-symmetric preform feed, stretch-blow-moulding machine dedicated to the stretch-blow-moulding of containers from non-symmetric injection moulded preforms; the non-symmetric preforms including an integral handle extending from a first junction point to a second junction point on a body of the preform; the body of the preform and the integral handle constituted from the same material.

20 Claims, 37 Drawing Sheets

(30) Foreign Application Priority Data

| | | | |
|---|---|---|---|
| Mar. 9, 2018 | (AU) | ................................ | 2018900795 |
| Mar. 23, 2018 | (AU) | ................................ | 2018900977 |
| Apr. 10, 2018 | (AU) | ................................ | 2018901184 |

(51) Int. Cl.

| | |
|---|---|
| *B29C 49/06* | (2006.01) |
| *B29C 49/08* | (2006.01) |
| *B65D 1/02* | (2006.01) |
| *B65D 23/10* | (2006.01) |
| *B65G 47/86* | (2006.01) |
| *B29L 31/00* | (2006.01) |

(52) U.S. Cl.
CPC ........ *B29C 49/6409* (2013.01); *B65D 1/0223* (2013.01); *B65D 23/10* (2013.01); *B65G 47/847* (2013.01); *B29B 2911/14331* (2015.05); *B29B 2911/14373* (2013.01); *B29B 2911/14513* (2013.01); *B29C 2049/4226* (2013.01); *B29C 2049/4231* (2013.01); *B29L 2031/712* (2013.01)

(58) Field of Classification Search
CPC .. B29B 2911/14513; B29B 2911/1454; B65G 47/847; B65G 47/2445
See application file for complete search history.

(56) References Cited

U.S. PATENT DOCUMENTS

| | | | |
|---|---|---|---|
| 6,779,651 | B1 | 8/2004 | Linglet et al. |
| 6,779,652 | B2 | 8/2004 | Linglet et al. |
| 2012/0048683 | A1 | 3/2012 | Forsthoevel et al. |
| 2014/0225315 | A1 | 8/2014 | Ogihara |
| 2015/0044620 | A1 | 2/2015 | Beale |
| 2017/0157833 | A1 | 6/2017 | Marastoni et al. |

OTHER PUBLICATIONS

International Preliminary Report on Patentability (IPRP) dated Feb. 27, 2020 for Application No. PCT/AU2018/051030.

Written Opinion issued by the Intellectual Property Office of Singapore dated Jun. 25, 2021 in connection with corresponding Singapore Application No. 11202002502W.

Section A-A

Section B-B

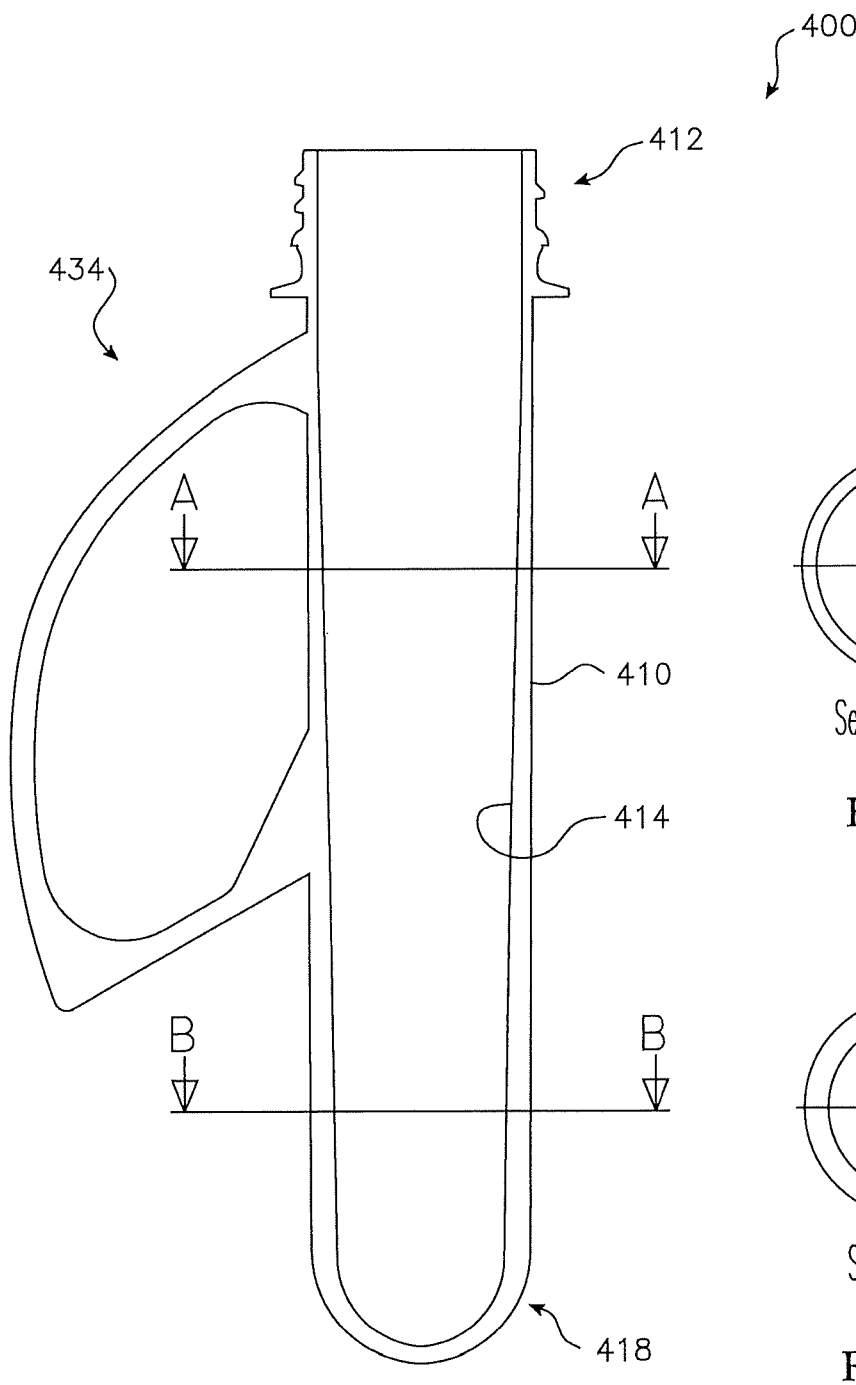
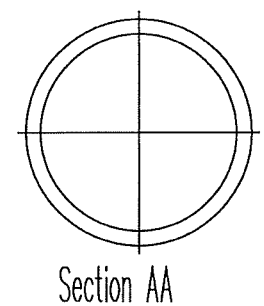
Fig. 19A
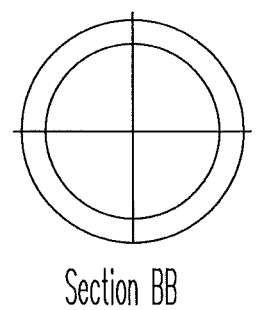
Fig. 19B
Fig. 19

Section A-A  Fig. 21A

Section B-B  Fig. 21B

Side View

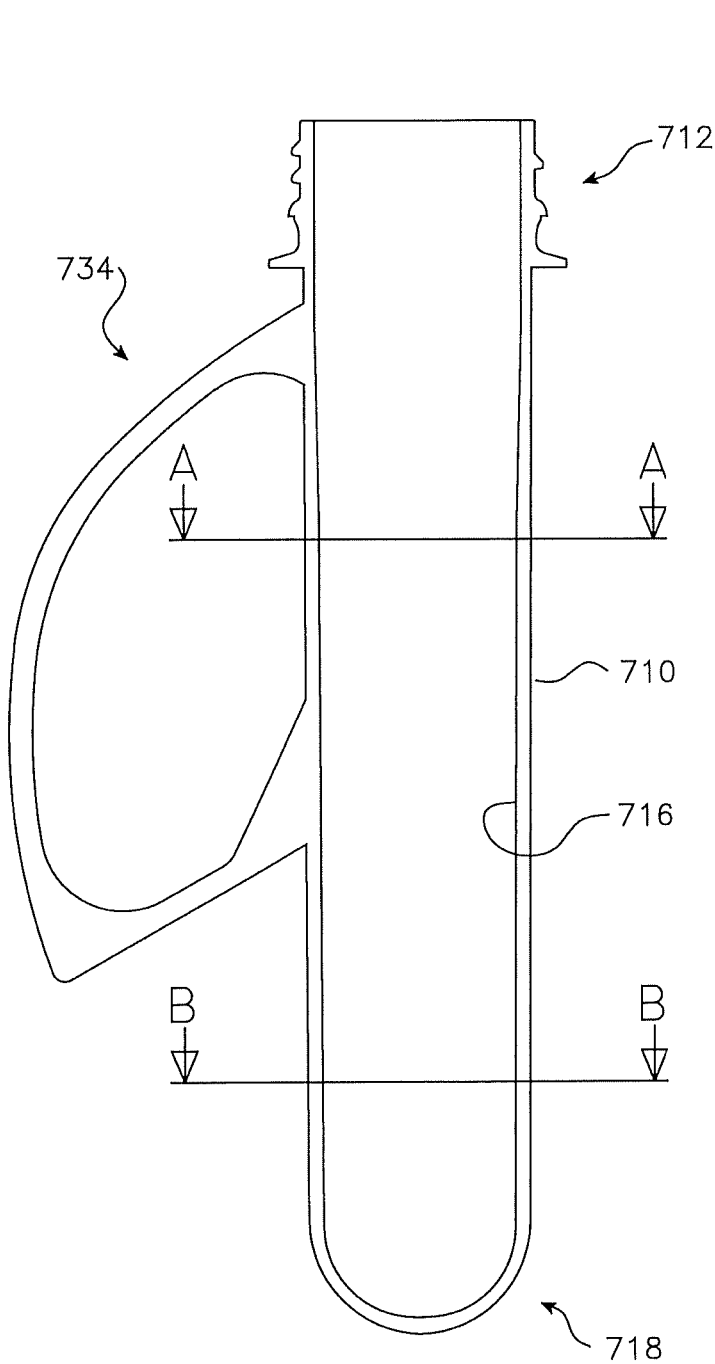
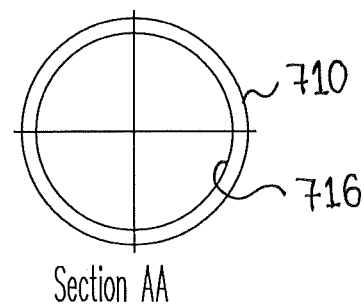
Fig. 22A
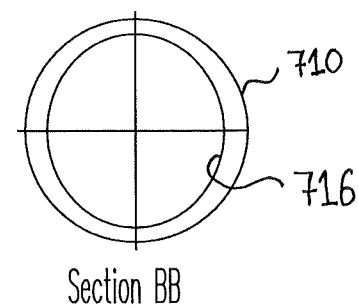
Fig. 22B
Fig. 22

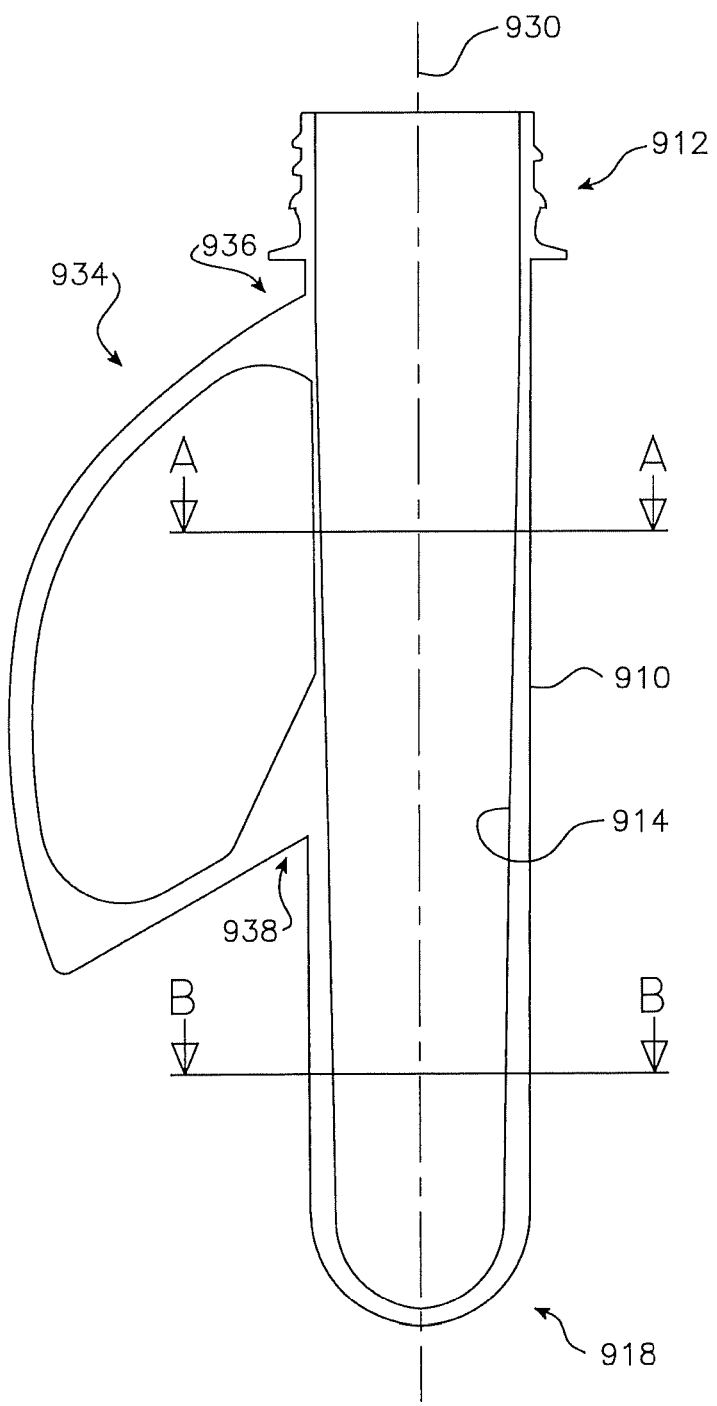
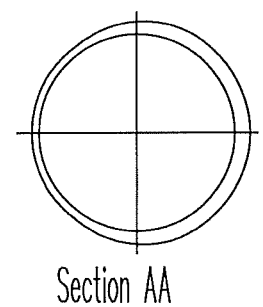
Section AA
Fig. 23A
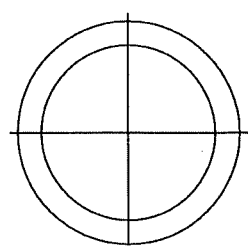
Section BB
Fig. 23B
Fig. 23

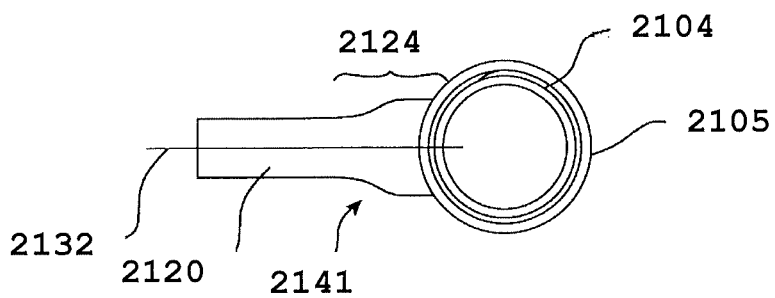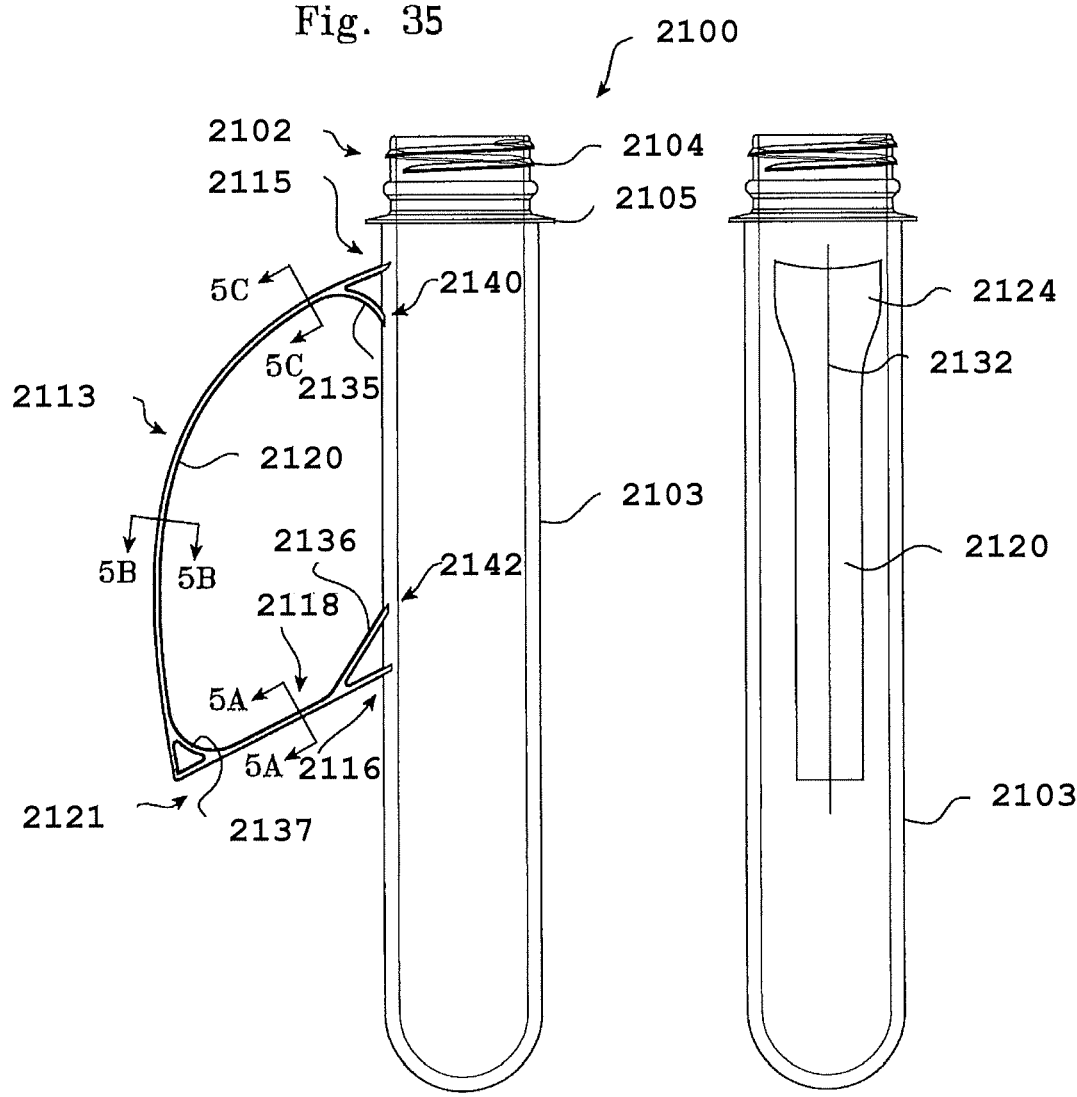
Fig. 35
Fig. 33      Fig. 34

Section A-A  Fig. 36A

Section B-B  Fig. 36B

Side View

CONTINUOUS BLOW MOULDING MACHINE, PREFORMS, SYSTEM AND PROCESS

RELATED APPLICATION

This application is an application under 35 U.S.C. 371 of International Application No. PCT/AU2018/051030 filed on Sep. 20, 2018, the entire contents of which are incorporated herein by reference.

TECHNICAL FIELD

The present invention relates to the equipment and method for the production of stretch-blow-moulded polymer containers from injection-moulded preforms.

BACKGROUND

The process of stretch-blow-moulding polymer containers from a prior injection moulded preform is long established in the art. Generally, preforms, as injection moulded, comprise an elongate cylindrical body portion and a neck. In the stretch blow-moulding process, the preform enters a die, held by the neck which retains its injection moulded shape, and the body is firstly mechanically stretched in at least one direction followed by the injection of air to force the polymer material into the desired shape as defined by the die cavity and also stretching the polymer material in at least one other direction—termed biaxial orientation. Where time has elapsed between the injection moulding of the preforms and their entry into the blow moulding process so that the preforms have cooled to ambient temperature, a preheating process is applied before preforms enter the blow mould die.

The process is considerably more complicated if the preform is rotationally non-symmetric and, as in the present case, is injection moulded with an integrally attached handle, and more particularly if the handle is in the form of a loop, integrally attached at two points on the body of the preform. The complication arises primarily from the need to control the orientation of the handle and to correctly preheat the body of the preform while protecting the handle from excessive heat absorption, as well as the correct insertion of the preform into the stretch-blow-moulding die.

Such a preform and systems for its transformation into a container with integral handle are disclosed in WO2007101309. The entire disclosure of WO2007101309 is incorporated hereby cross reference. In that disclosure, preforms enter a production machine such as schematically shown in FIGS. 55 and 72 of that document after orientation of the handle, which orientation is then maintained, through the preheating stage and into the stretch-blow-moulding die.

In the systems disclosed in WO2007101309 however, the process of production is discontinuous or 'batch'; that is, the production machines progress preforms incrementally, pausing at each index to allow for pick and place loading of preforms, their insertion into a supporting mandrel and the entry into and exit from the stretch blow-moulding cavities, while the preforms are stopped for each moulding cycle. A disadvantage of this incremental processing is that it is clearly less efficient than a continuous process.

The present invention relates to a machine and process for the stretch blow moulding of preforms with an integral handle in a continuous feed, thus non-incrementing system. Because of the several stages in the process, the requirements of establishing handle orientation, the preheating stage and the stretch-blow-moulding stage as well as the removal of finished containers, requires the transfer of preforms between rotating in-feed, preheating, moulding and transport elements of the system. A continuous process makes these processes and transfers for a preform with integral handle, considerably more complex.

A system for handling a non-rotationally symmetric preform requiring a known orientation for selective preheating and prior to loading into a stretch-blow-moulding die was disclosed in U.S. Pat. No. 8,632,333 B2. In the arrangement of this patent orientation is established with reference to a small reference tab or notch, but this preform not having a handle there is no need for orientation relative a heat shield.

US 2012/0048683 also discloses a continuously rotating blow moulding system in which special precautions are taken against deformation of preforms due to centrifugal forces by specific orientation of the preforms passing through the system. Although it is noted that such orientation may be of benefit for non-symmetric preforms, for example those with a handle, there is no disclosure of orientation of a preform for entry into a heat shield.

U.S. Pat. No. 6,779,651 specifically teaches the importance of orientation of preforms with handles prior to introduction of the preform into the stretch-blow-moulding die. There is however no suggestion that the handle requires shielding by means of a heat shield so that there is no arrangement in this patent of the control of orientation to marry the handle with a heat shield.

A suit of patents and applications to Thibodeau, U.S. D746,142 S; U.S. Pat. Nos. 8,524,143 B2; 9,499,302 B2 and WO2015/112440 A1 are drawn to the production of containers with integral handle stretch-blow-moulded from injection moulded preforms with integral handles. However, in contrast with the arrangement of the present application as set out below, the handle of a container according to Thibodeau is of radically different shape to the handle as injection moulded with the preform, being subjected to a sort of uncurling during the stretch-blow-moulding phase.

Another continuously rotating blow-moulding system is disclosed in U.S. Pat. No. 5,683,729 in which mechanisms for the transfer of preforms between various stages of the system are described. There is however no disclosure of preforms with integral handles and thus no treatment of special orientation of the preforms.

It is an object of the present invention to address or at least ameliorate some of the above disadvantages.

NOTES

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Definitions

Continuous preform feed: In this specification, continuous preform feed occurs where preforms are advanced at constant velocity from an entry location to an exit location along a path. This is to be distinguished from a batch mode operation where the preform feed advances and then stops whilst a blow mould operation takes place.

Non-symmetric preform: In this specification, a non-symmetric preform is a preform which is not symmetric about its longitudinal axis. The primary source of non-symmetry occurs where the preform incorporates an integral handle. In certain embodiments the preform walls are also a source of non-symmetry.

Integral handle preform: In this specification, an integral handle preform is a non-symmetric preform which has a handle portion extending from a body of the preform and wherein the handle is integrally moulded with the body of the preform.

Stretch blow moulding die: In this specification, a stretch blow moulding die comprises an openable cavity adapted to receive a preheated preform for subsequent stretch blow moulding of the preheated preform within the cavity of the die.

Accordingly in one broad form of the invention there is provided a continuously rotating, non-symmetric preform feed, stretch-blow-moulding machine dedicated to the stretch-blow-moulding of containers from non-symmetric injection moulded preforms; the non-symmetric preforms including an integral handle extending from a first junction point to a second junction point on a body of the preform: the body of the preform and the integral handle constituted from the same material.

In a further broad form of the invention there is provided a method of controlling paths of grippers of pick and place apparatuses of rotating transfer systems; the rotating transfer systems operating in a continuous non-symmetric preform feed stretch-blow-moulding machine; the paths of the grippers following respective loci of non-symmetrical preforms as preforms are transferred by the rotating transfer systems from a preform pick off position, inserted into and extracted from a preform support mandrel of a preheating stage and inserted into and extracted as a stretch-blow-moulded containers from rotating stretch-blow-moulding dies: the non-symmetrical preforms comprising a body portion and an integral handle extending from the body portion; the method including the step of rotationally mounting each of the pick and place apparatuses on a rotating arm of a respective rotating transfer system.

In a further broad form of the invention there is provided a method of transferring a non-symmetric preform between stages of a continuous non-symmetric preform feed rotating stretch-blow-moulding machine; the non-symmetric preform being transformed into a stretch-blow-moulded container by a step of stretching and blowing the non-symmetric preform in a cavity of the stretch-blow-moulding die; the method including the step of orienting the non-symmetrical preform so that an integral handle of the preform has a known orientation at arrival at a pick off position in the machine.

In a further broad form of the invention there is provided a method of manipulating a non-symmetrical injection moulded preform into a stretch-blow-moulding die of a continuous preform feed stretch-blow-moulding machine; the method including the step of extracting a preform from a preform preheating stage with a pick and place apparatus of a continuously rotating transfer system such that an integral handle of the preform has a predetermined orientation.

In a further broad form of the invention there is provided a method of controllably heating a pre-form to a die introduction temperature; the pre-form having a neck portion extending from a body portion; said pre-form further having a handle portion extending radially, said method comprising controllably transferring an integral handle PET pre-form onto a continuously moving conveyor; securing the preform by its neck portion to the conveyor whereby the preform is transported by the conveyor at substantially constant velocity along a reheating path from a pre-form entry location to a pre-form exit location.

Preferably at least portions of the pre-form controllably heated to the die introduction temperature by the time it reaches the pre-form exit location.

Preferably a controllable heater array distributed along the path arranged to direct heat to selected portions of the pre-form.

Preferably the pre-form controllably transferred from the preform exit location into a die for stretch blow moulding of the pre-form thereby to form a blown container.

In a further broad form of the invention there is provided a method of orienting a non-symmetrical preform for entry to stages of a stretch blow-moulding machine; the none symmetrical preform including an integral handle extending from a first junction point below a neck of the preform to a second junction point on the body of the preform: the method including the step of providing preforms to slide down inclined rails towards an orientation mechanism while supported by the necks of the preforms along upper rails of the inclined rails.

In a further broad form of the invention there is provided a continuously rotating, non-symmetric preform feed, stretch-blow-moulding machine in which injection-moulded preforms with integral handles are transferred from a first transfer system to a preheating stage; the transfer of a preform from a gripper of the first transfer system to a preform supporting mandrel achieved in one fluid motion as a vertical axis of the preform is brought into alignment with a vertical axis of the preform supporting mandrel and the handle of the preform is slid into a heat shield provided on the mandrel.

Accordingly in further broad form of the invention there is provided a continuous non-symmetric preform feed stretch-blow-moulding machine dedicated to the stretch-blow-moulding of containers from non-symmetric injection moulded preforms; the non-symmetrical preforms including an integral handle extending from a first junction point to a second junction point on a body of the preform; the body of the preform and the integral handle constituted from the same material; the machine including a preform orientation system to orient the handle of the preform into a known orientation at arrival at a pick off position.

Preferably the preforms are in continuous motion from an initial preform pick off point through stretch-blow-moulding into the containers and ejection from the machine as stretch-blow-moulded containers.

Preferably the integral handle retains a shape of the handle as injection moulded through all stages of the stretch-blow-moulding machine to forming a handle on the stretch-blow-moulded container.

Preferably the stages of the stretch-blow-moulding machine include a handle orientation stage; all preforms arriving at the pick off point having the integral handle oriented in a predetermined direction relative to motion of the preform approaching the pick off position.

Preferably the stages of the stretch-blow-moulding machine include a continuously rotating first transfer system transferring preforms from a continuously rotating preform feeder wheel at the preform pick off position to a transfer to preheating position at a continuously rotating preheating stage.

Preferably a first pick and place apparatus of the first transfer system includes a preform grasping gripper; reciprocating rotation and linear displacement of the grasping gripper induced by a combination of a rotating carrier of the pick and place apparatus and two cam loci.

Preferably the rotating carrier is an arm of four radially extending support arms rotating about a common centre of rotation; an outer end of each support arm rotationally supporting a pick and place apparatus.

Preferably the support arms rotate above a fixed cam plate; the cam plate provided with an inboard cam channel for a first locus of the two cam loci and a periphery of the cam plate providing an outer cam surface for a second locus of the two cam loci.

Preferably a housing of a linear guide of the pick and place apparatus is rotationally mounted at the outer end of the supporting arm; an outrigger arm extending from the housing provided with a first cam follower locating in the cam channel.

Preferably a free sliding element of the linear guide is provided with a second cam follower, the second cam follower maintained in contact with the outer cam surface by a spring.

Preferably the grasping gripper of the pick and place apparatus is mounted to a rotary actuator supported from an outer end of the free sliding element; the rotary actuator adapted to rotate fingers of the grasping gripper 180 degrees as a pick and place apparatus transits between the preform pick off position and the transfer to preheating position.

Preferably the continuously rotating preheating stage includes a preform transport system; preform supporting mandrels travelling along a loop rail system, the preform supporting mandrels rotating preforms about a vertical axis of the preforms as preforms travel past banks of heating elements.

Preferably the preform supporting mandrels are provided with a heat shield; the heat shield comprising a channel projecting from a cylindrical collar.

Preferably the pick and place apparatus of the first transfer system brings a vertical axis of a perform into alignment with a vertical axis of the cylindrical collar of a preform supporting mandrel at the transfer to preheating position; the gripper of the pick and place apparatus concurrently manoeuvring the handle of the preform between side elements of the channel of the mandrel.

Preferably the preform is lowered after the neck of the preform is released by the gripper of the pick and place apparatus so that the neck of the preform is located within the cylindrical collar of the mandrel.

Preferably a preheated preform is extracted from a supporting mandrel by a pick and place apparatus of a second transfer system at a transfer from supporting mandrel position; the transfer from supporting mandrel position lying on a line joining respective centres of rotation of a proximate rotating guide wheel of the preheating transport system and the second transfer system.

Preferably the preform extracted from a preform supporting handle by a gripper of the pick and place apparatus of the second transfer system is rotated through 180 degrees by a rotary actuator of the pick and place apparatus as an arm of the second transfer system rotates the pick and place apparatus towards a die loading position.

Preferably a combination of rotation of the arm of the second transfer system and rotation and linear displacement of the gripper induced by the loci of a first and second cam follower of the pick and place apparatus, brings a vertical axis of the preform into alignment with a vertical axis of a stretch-blow-moulding die as both the pick and place apparatus and an opened stretch-blow-moulding die approach the die loading position; movements of the gripper concurrently bringing the handle of the preform into alignment with a line joining respective centres of rotation of the stretch-blow-moulding die and the second transfer system.

Preferably a pick and place apparatus of a third transfer system extracts a stretch-blow-moulded container from the stretch-blow-moulding die as the stretch-blow-moulding die opens at a die unloading position; the die unloading position lying on a line joining respective centres of rotation of the rotating stretch-blow-moulding die and the third transfer system.

Preferably the extracted stretch-blow-moulded containers are rotated from the die unloading position to a rotating outfeed wheel; the rotating outfeed wheel transferring the containers along a discharge channel and a container receiving bin.

In yet a further broad form of the invention there is provided a pick and place apparatus manipulating a non-symmetrical preform; the pick and place apparatus operating in a continuously rotating stretch-blow-molding machine wherein a preform gripping gripper of the pick and place apparatus is urged into reciprocating rotation and linear displacement by a combination of a rotating support of the pick and place apparatus and two cam loci.

Preferably the reciprocating rotation is about a vertical axis; linear displacement being in a horizontal plane.

In yet a further broad form of the invention there is provided a method of controlling paths of grippers of pick and place apparatuses of rotating transfer systems; the rotating transfer systems operating in a continuous non-symmetric preform feed stretch-blow-moulding machine; the paths of the grippers following respective loci of non-symmetrical preforms as preforms are transferred by the rotating transfer systems from a preform pick off position, inserted into and extracted from a preform support mandrel of a preheating stage and inserted into and extracted as a stretch-blow-moulded containers from rotating stretch-blow-moulding dies; the non-symmetrical preforms comprising a body portion and an integral handle extending from the body portion; the method including the steps of:

rotationally mounting each of the pick and place apparatuses on a rotating arm of a respective rotating transfer system,
  urging reciprocating rotation of the grippers about respective vertical axes of the pick and place apparatuses controlled by a locus of a first cam follower and the rotation of the rotation of the rotating arm,
  urging reciprocating horizontal linear displacement controlled by a locus of a second cam follower and the rotation of the rotating arm, and,
  wherein the locus of the first cam follower is determined by a cam channel of a cam plate; the locus of the second cam follower being determined by an outer cam surface of the cam plate.

Preferably a first rotating transfer system transfers a non-symmetrical preform from a rotating preform feeder wheel to a rotating preform support mandrel of the preform preheating system.

Preferably a second rotating transfer system transfers a non-symmetrical preform from a rotating perform support mandrel into a stretch-blow-moulding die.

Preferably a third rotating transfer system extracts stretch-blow-moulded containers from the stretch-blow-moulding die to a rotating outfeed wheel.

In yet a further broad form of the invention there is provided a method of transferring a non-symmetric preform between stages of a continuous non-symmetric preform feed rotating stretch-blow-moulding machine; the non-symmetric preform being transformed into a stretch-blow-moulded container by a step of stretching and blowing the non-symmetric preform in a cavity of the stretch-blow-moulding die; the method including the steps of:

orienting the non-symmetrical preform so that an integral handle of the preform has a known orientation at arrival at a pick off position in the machine, gripping a neck of the preform in grippers of a pick and place apparatus of a rotating first rotating transfer system and rotating the preform to a preheating stage of the machine, manoeuvring the gripper of the first pick and place apparatus so as to align the integral handle with a heat shield of a moving preform supporting mandrel and aligning an axis of a body of the preform with a neck supporting cylindrical collar of the mandrel, removing the non-symmetric preform from the preform supporting mandrel with a gripper of a second pick and place apparatus of a rotating second rotating transfer system and rotating the preform to a rotating stretch-blow-moulding die of the machine in a second stage, manoeuvring the gripper of the second pick and place apparatus so as to align the integral handle with a handle nesting portion of the stretch-blow-moulding die and a vertical axis of the preform with a vertical axis of the stretch-blow-moulding die in a third stage, manoeuvring grippers of a pick and place apparatus of a rotating third rotating transfer system in position to grasp the neck of a now stretch-blow-moulded container and extracting the stretch-blow-moulded container from the stretch-blow-moulding die in a fourth stage.

Preferably the movement of the grippers of the pick and place apparatus of any one of the first, second or third rotating transfer systems is controlled by a combination of rotation of an arm of the transfer system supporting the pick and place apparatus and rotation and linear displacement controlled by loci of two cam followers.

Preferably the locus of the first cam follower is determined by a cam channel provided in a fixed cam plate of each of the first, second and third rotating transfer systems; the locus of the second cam follower determined by an outer cam surface of the fixed cam plates.

In yet a further broad form of the invention there is provided a method of manipulating a non-symmetrical injection moulded preform into a stretch-blow-moulding die of a continuous preform feed stretch-blow-moulding machine; the method including the steps of:

extracting a preform from a preform preheating stage with a pick and place apparatus of a continuously rotating transfer system such that an integral handle of the preform has a predetermined orientation, and wherein manoeuvring of a preform supporting gripper of the pick and place apparatus is controlled by rotation of an arm of the transfer system in combination with rotation and linear extension of the gripper guided by loci of two cam followers.

Preferably the method includes the further steps of:

manoeuvring the pick and place apparatus to align the integral handle with a bisecting radial line of an open stretch-blow-moulding die as the bisecting radial line rotates into coincidence with a line extending between rotation centres of the stretch-blow-moulding machine and the transfer system, further manoeuvring the pick and place apparatus to align a vertical axis of a body of the preform with an axis of the die and the handle of the preform with a handle nesting portion of the die when opposing halves of the die close on reaching the line between rotation centres, In yet a further broad form of the invention there is provided a method of preventing distortion of an integral handle of a preform in a stretch-blow-moulding process in a continuous preform feed stretch-blow-moulding machine; the method including the steps of:

preparing each half of a stretch-blow-moulding die with a handle nesting cavity conforming to at least a portion of the integral handle of the preform.

manipulating the preform so that the handle is brought into coincidence with the handle nesting cavity as two halves of the stretch-blow-moulding die close on the preform.

Preferably the manipulation of the preform is by a pick and place apparatus; a gripper of the pick and place apparatus urged into rotational and linear motion by a combination of rotation of an arm of a preform transfer system to which the pick and place is mounted, and rotation and linear displacement controlled by two cam loci.

In yet a further broad form of the invention there is provided a method of controllably heating a pre-form to a die introduction temperature; the pre-form having a neck portion extending from a body portion; said pre-form further having a handle portion extending radially; said method comprising controllably transferring an integral handle PET pre-form onto a continuously moving conveyor;

securing the preform by its neck portion to the conveyor whereby the preform is transported by the conveyor at substantially constant velocity along a reheating path from a pre-form entry location to a pre-form exit location;

at least portions of the pre-form controllably heated to the die introduction temperature by the time it reaches the pre-form exit location;

a controllable heater array distributed along the path arranged to direct heat to selected portions of the pre-form;

the pre-form controllably transferred from the preform exit location into a die for stretch blow moulding of the pre-form thereby to form a blown container.

Preferably the handle portion is solid and has a first end and a second end; the first end integrally connected at a first, upper location to the pre-form; the second end integrally connected at a second, lower location to the pre-form.

Preferably the first, upper location is located on the body portion.

Preferably the first, upper location is located on the neck portion.

Preferably the second, lower location is located on the body portion.

Preferably the elements are arranged in modules; the modules arrayed around the continuously rotating preform conveyer; the elements controlled as a group based on height wherein the top most elements of the modules are controlled to a predetermined temperature together whilst the next down in height elements are also controlled together to a predetermined temperature—and so on down to elements at the lowest level.

Preferably a processor controls the speed of rotation of a motor in order to control the continuous speed of advancement of the preforms.

Preferably a temperature sensor provides environment temperature sensing which is utilised by processor to modulate the degree of heating of all elements by a difference factor delta ($\Delta$).

In yet a further broad form of the invention there is provided an orientation mechanism controlling orientation of a non-symmetric injection moulded preforms prior to entry into stages of a stretch blow-moulding machine, the non-symmetric preforms each including an integral handle extending from a first junction point below a neck of the preform and a second junction point on a body of the preform; the mechanism including a pair of contra-rotating drive wheels disposed along opposite sides of inclined rails; one of the drive wheels inducing rotation of the body of the preform moving down the inclined rails to rotate the handle of the preform into a preferred position.

Preferably the inclined rails include a pair of upper rails between the preforms are suspended by necks of the preform and a pair of lower rails which constrain the integral handles into approximate alignment with a long axis of the inclined rails; integral handles of the preforms constrained to either a leading or a trailing orientation.

Preferably the pair of drive wheels are located at a level coincident with a lower portion of the body of the preform below the lower rails and a lowest point of the integral handles; axes of the drive wheels normal to the long axis of the inclined rails.

Preferably a gap between the pair of drive wheels is smaller than a diameter of the body of the preform; each guide wheel including at least one tyre of a sufficiently soft polymer material to allow passage of the body of the preform through the gap between the pair of drive wheels.

Preferably directions of rotation of the pair of contra-rotating drive wheels draw preforms moving down the inclined rails through the gap between the drive wheels; a first of the drive wheels rotating in an anticlockwise direction with a second opposite drive wheel rotating in a clockwise direction.

Preferably the drive wheels rotate at different rates of rotation; the ratio of rotation of the first drive wheel to the rotation of the second opposite drive wheel being of the order of 2:1.

Preferably the different rates of rotation of the drive wheels cause the second opposite drive wheel to rotate the body of the preform in an anticlockwise direction as the preform passes through the gap between the two drive wheels.

Preferably rotation of the body of the preform changes orientation of a preform with a leading handle at entry to the mechanism to a preform with a trailing handle on exit from the mechanism; a gap in the lower rail at the side of the lower rail adjacent the first drive wheel.

In yet a further broad form of the invention there is provided a method of orienting a non-symmetrical preform for entry to stages of a stretch blow-moulding machine; the none symmetrical preform including an integral handle extending from a first junction point below a neck of the preform to a second junction point on the body of the preform; the method including the steps of:
providing preforms to slide down inclined rails towards an orientation mechanism while supported by the necks of the preforms along upper rails of the inclined rails,
constraining integral handles of the preforms in either a leading or in a trailing position between lower rails of the inclined rails.
drawing preforms through a gap between a pair of contra rotating drive wheels of the orientation mechanism disposed along the inclined rails, and
wherein differential rates of rotation of the pair of drive wheels rotate the body of the preform from a leading orientation of the integral handle at entry to the orientation mechanism into trailing orientation of the handle at exit of the preform from the orientation mechanism.

Preferably the pair of drive wheels are located coincident with a lowermost portion of the body of the preform below lower rails of the inclined rails and below a lowermost point of the integral handle.

Preferably a first of the pair of contra rotating guide wheels at one side of the inclined rails rotates in an anti-clockwise direction; the second of the pair of contra rotating drive wheels at an opposite side of the inclined rails rotating in a clockwise direction; the pair of contra rotating drive wheels acting to draw preforms through the gap between the drive wheels.

Preferably the ratio of the rate of rotation of the contra rotating drive wheel to the rate of rotation of the clockwise rotating drive wheel is in the order of 2:1.

Preferably the clockwise rotation of the clockwise rotating drive wheel rotates bodies of a preforms passing through the gap between the drive wheels in an anticlockwise direction such that a preform with an integral handle in a leading orientation is rotated so that the integral handle is in a trailing orientation.

In another broad form of the invention, there is provided an injection-moulded preform forming a stretch-blow-moulded container; the preform comprising an open neck portion and a hollow body extending from the neck portion; the preform further including an integrally injection-moulded handle; at least a portion of walls of the hollow body varying in thicknesses.

Preferably, at least a portion of an inner surface of the hollow body is non-concentric with outer surfaces of the hollow body.

Preferably, the outer surfaces of the hollow body are defined by diameters centred on a central longitudinal axis of the preform to form a substantially cylindrical body.

Preferably, the cross sections of the at least a portion of the inner surface of the hollow body are ovoid in section.

Preferably, the centres of the cross sections of ovoid shape are centred on the central longitudinal axis of the preform.

Preferably, the centres of the cross sections of ovoid shaper are offset from the longitudinal axes of the preform.

Preferably, the centres of circular cross sections of a portion of the hollow body are offset from a central longitudinal axis of the hollow body.

Preferably, a core or mandrel forming the inner surface of the hollow body in an injection moulding step, comprises at least one portion of circular cross sections to form an upper region of the inner surface of the preform, portion of the mandrel comprising ovoid cross sections depending from a transition portion between a lower end of the at least one portion of circular cross sections and the portion of ovoid cross sections.

Preferably, the mandrel comprises two portions of circular cross sections; an upper portion and a lower portion; the transition portion depending from the lower portion.

Preferably, the upper portion is of diameters equal to inner diameters of the neck portion of the preform.

Preferably, the lower portion is of diameters smaller than the diameters of the upper portion.

Preferably, the transition portion forms an asymmetrical frustum of a cone; an upper end of the transition portion having a diameter equal to that of a lower end of the lower portion with the lower end of the transition portion conforming in cross section to the ovoid cross section of an upper end of the ovoid portion.

Preferably, each of the upper portions and the ovoid portion are tapering; the cross sections decreasing in area from respective maximum areas at upper ends of the portions to minimum areas at the respective lower ends.

Preferably, the diameters defining the outer surface of the hollow body decrease in dimension from a maximum diameter at a lower end of the neck portion to the lower end of the hollow body.

Preferably, the preform includes an integral handle; the handle forming a loop of material extending vertically below the neck portion of the preform to a lower junction on the body of the preform.

Preferably, a central vertical plane of the handle passes through the central axis of the preform.

Preferably, the major axes of the cross sections of the ovoid portion of inner surface of the hollow body of the preform lie in the central vertical plane.

Preferably, the wall thicknesses of the preform in that portion of the preform in which the inner surfaces are defined by the ovoid cross sections, vary from a maximum at opposite ends of the minor axes of the ovoid cross sections to minimum thicknesses at outer ends of the major axes.

Preferably, the ratio of maximum wall thickness to minimum wall thickness of the ovoid portion lies in the range of 2:1 and 2.2:1.

Preferably, the polymer walls of the preform proximate maximum thickness are distributed predominantly to longer side walls of a rectangular cross section blown container; the polymer walls of the preform proximate minimum thickness predominantly distributed to shorter side walls of the blown container.

In another broad form of the invention, there is provided a method of optimizing wall thickness in a stretch-blow-moulded container; the method including the steps of:
   injection moulding hollow preforms in which at least a lower portion of each preform has internal cross sections non-concentric with external surfaces of the lower portion, bringing the preforms to a temperature suitable for stretch-blow-moulding, inserting the preforms into cavities of a stretch-blow-moulding machine, mechanically stretching the preforms and injecting air to form the container.

Preferably, the mandrels for the injection moulding of the preforms include at least one upper region of circular cross sections.

Preferably, the lower portion of the preform has cross sections of an ovoid form.

Preferably, the upper region of the mandrel includes an upper portion and a lower portion.

Preferably, a transition portion extends between a lower end of the lower portion and an upper end of the lower section.

Preferably, the external surfaces of the preform are defined by diameters centred on a central longitudinal axis of the preform.

Preferably, an integral handle is formed on the preform extending in a loop between a first junction region below a neck portion of the preform and a second junction region on a body of the preform; a central vertical plane of the integral handle coincident with the central longitudinal axis.

Preferably, the major axes of the cross sections of ovoid form of the lower section lie in the central vertical plane.

Preferably, the wall thicknesses of the preform in the lower section vary from maximum thicknesses at opposite ends of the minor axes of the ovoid cross sections to minimum thicknesses at opposite ends of the major axes.

Preferably, in stretch-blow-moulding a container of generally rectangular cross section, polymer material proximate the maximum thicknesses is distributed to longer sides of the container and polymer material proximate the minimum thicknesses is distributed to shorter sides of the container.

In another broad form of the invention, there is provided a mandrel for forming internal surfaces of an injection-moulded hollow preform; the mandrel including at least one portion with cross sections which are non-concentric with diameters defining outer surfaces of the preform.

Preferably, the non-concentric cross sections are ovoid in form; the ovoid forms defining varying wall thickness of the preform.

Preferably, the major axes of the ovoid formed cross sections lie in a vertical plane containing a vertical central longitudinal axis of the preform; the vertical plane forming a mid plane of an integral handle formed on the preform depending vertically from a first junction region below a neck portion of the preform to a second junction point on a body of the preform.

In another broad form of the invention, there is provided a method of biasing distribution of polymer material from walls of at least one portion of a preform to selected side walls of a container stretch-blow-moulded from the preform; the method including the steps of:
   arranging a mandrel defining inside surfaces of the preform with cross sections of the at least one portion which are non-concentric with corresponding outer surfaces of the preform as defined by a cavity of a preform injection moulding die,
   arranging the mandrel in the injection moulding die such that major axes of the cross sections of the mandrel of the at least one portion are aligned with a central vertical plane of the cavity,
   injection moulding the preform,
   introducing the preform into a cavity of a stretch-blow-moulding machine such that the central vertical plane of the preform is aligned with a central vertical plane of a blown container of generally rectangular cross section, and
   wherein the central vertical plane of the container is parallel to opposing longer sides of the container.

Preferably, the cross sections of the mandrel in the at least one portion are ovoid in shape; major axes of the ovoid cross sections aligned with the central vertical plane; centres of the ovoid cross sections coincident with a central axis of a body of the preform.

Preferably, the outer surfaces of the body of the preform are defined by diameters centred on the central axis.

Preferably, the preform includes an integral handle forming an integral handle on the container; the integral handle of the preform extending vertically from a first junction below a neck portion of the preform to a second junction on a body of the preform; the integral handle centred on the central vertical plane of the preform.

Preferably, in a blow moulding stage polymer material of walls of the preform in the at least one portion and on opposing ends of a minor axes of the ovoid cross sections are biased to the opposing longer sides of the container; polymer material proximate to opposite ends of a major axes of the ovoid cross sections biased towards the shorter side walls of the container.

In another broad form of the invention, there is provided a method of injection moulding a preform in which at least a portion of wall thicknesses of a hollow body of the preform varies along a length of the hollow body; the method including the steps of:
- forming at least one pair of opposing cavities in an injection moulding die: the cavities defining external surfaces of the preform and an integral handle,
- locating a mandrel in each of the at least one opposing cavities such that a central longitudinal axis of the mandrel is coincident with an axis of the cavity as defined by a neck portion of the hollow body,
- closing the injection moulding die to form a cavity about the mandrel,
- injecting a polymer into the cavity to form the preform, and
- wherein the injection-moulded preform includes an integral, injection-moulded handle; the handle extending as a loop from a first junction point below a neck portion of the preform to a second junction point on the hollow body of the preform.

Preferably, the wall thicknesses of the hollow body of the perform increase from below the neck portion to proximate a lower end of the preform.

Preferably, the cross sections of internal surfaces of the perform are concentric with cross sections of external surfaces of the preform.

Preferably, at least a portion of cross sections of internal surfaces of the preform are non-concentric with cross sections of outer surfaces of the preform.

Preferably, the non-concentricity of the cross sections of internal surfaces of the preform with cross sections of the outer surface of the preform is from a portion of cross sections of the internal surface being of ovoid form.

Preferably, the non-concentricity of the internal surfaces with the outer surface of the hollow body is from centres of cross sections of the internal surface being of offset from a central longitudinal axis of the preform.

In a further broad form of the invention, there is provided a preform and a container stretch-blow-moulded from the preform in a stretch-blow-moulding machine; the preform comprising a neck portion, a collar below the neck portion and a body extending from below the collar; the body including a first cylindrical portion having a first diameter and a second conical portion tapering from a diameter smaller than the diameter of the first portion to a minimum diameter proximate a bottom portion of the preform.

Preferably, the preform includes an integral handle forming a loop extending from a first junction position proximate the collar to a second junction position along the body.

Preferably, the first cylindrical portion extends from below the collar; the first portion being of a substantially constant diameter.

Preferably, wall thickness of the second conical portion tapers from a minimum thickness proximate the first cylindrical portion to a maximum thickness proximate a tangent line between the conical portion and a bottom portion of the preform.

In a further broad form of the invention, there is provided a method of reducing material required to form a container stretch-blow-moulded from a preform; the preform comprising a neck portion, a collar below the neck portion and a generally cylindrical body below the neck portion; the preform further including a handle extending from a first junction position below the collar to a second junction position along the body of the preform; the method including the steps of:
- Forming the body of the preform in at least two portions of different configuration; a first cylindrical portion and a second conical portion;
- Reducing a base diameter of the conical portion relative to a diameter of the first cylindrical portion.

Preferably, wall thickness of the second portion varies from a minimum thickness proximate the base diameter of the conical portion to a maximum thickness proximate a tangent line between the second conical portion and a bottom portion of the preform.

In a further broad form of the invention, there is provided a continuously rotating stretch-blow-moulding machine; the stretch-blow-moulding machine including an orientation device orienting integral handles of injection-moulded preforms from which containers with integral handles are stretch-blow-moulded in the machine; the orientation device including a pair of side by side contra-rotating auger screws located above spaced apart main support rails of a preform infeed track and centred about a vertical mid plane of the main support rails; configuration of diameters, pitch and flutes of the auger screws arranged to capture necks of the preforms and advance preforms along the preform infeed track; sides of preforms advancing along the auger screws contacting a friction strip inducing rotation of the preforms; rotation causing all preform integral handles to rotate from any random first orientation to a second predefined orientation.

Preferably, the preforms with integral handles are fed onto a pair of side by side contra-rotating rollers centred about the vertical mid plane of the pair of spaced apart rails of the preform feed-in track; the pair of contra-rotating rollers located before the auger screws; the pair of roller space apart sufficient to allow bodies and integral handles of the preforms to slide between the rollers into a position wherein the preforms are suspended between the rollers by collars below the necks of the preforms; the bodies and integral handles of the preforms constrained between spaced apart guide rails in the random first orientation; the guide rails located at a level below the main preform support rails proximate the middle of the handles.

Preferably, in the random first orientation handles may be leading or trailing relative a direction of movement of preforms along the infeed track towards a preform pick-off position at a lower outer end of the infeed track.

Preferably, the friction strip mounted to one of the main support rails is substantially coextensive with lengths of the auger screws; the friction strip intruding into space between the pair of spaced apart main support rails sufficient to engage with the sides of bodies of preforms moved along by the auger screws.

Preferably, a section of that guide rail on the same side as the friction strip is discontinuous for a length substantially coextensive with lengths of the auger screws.

Preferably, rotation of the preforms while carried along the auger screws rotates all preform handles into a handle trailing position with the handles arrested by contact with that guide rail of the pairs of guide rails opposite to the friction strip; the handles able to rotated through the discontinuous section of the guide rail.

Preferably, the auger screws separate successive preforms according to the pitch of the auger screws; the auger screws further providing downward pressure on preforms with oriented handles between the ends of the auger screws and the preform pick-off position.

In a further broad form of the invention, there is provided a method of producing stretch-blow-moulded containers with integral handle in a continuously rotating stretch-blow-moulding machine; the containers with integral handle stretch-blow-moulded from separately injection-moulded preforms with integral handle; the preform comprising a neck portion, a body portion and a handle forming a loop of orientable material extending from a first junction point below the neck portion to a second junction point on the body portion; the method of injection-moulding including the steps of:

Forming a multicavity injection-moulding die;
In a heated fixed side of the die forming an array of cavities; the cavities formed to correspond to sections of the preforms to a point below the integral handle;
Providing a corresponding array of opposing half cavities projecting from a face of the opposite moving side of the die; the half cavities shaped to form the preform from the neck portion, body and integral handle to the point below the integral handle;
Providing cores for forming the internal shape of the preforms; the cores fixed to the moving side of the die and centred on a common axis of the cavities in the fixed heated side of the die and the opposing half cavities.
Preferably, in a mould cycle
cavities in the heated fixed side of the die and the opposing half cavities at the opposite moving side of the die are injected with orientable polymer material to form the preforms;
When filled, after a predetermined delay moving the moving side of the die away from the heated fixed side to draw the ends of the preform bodies below the handle out of the cavities in the heated fixed side of the die;
After a predetermined delay, opening the opposing half cavities to release the neck portion, the integral handle and the body portion of the preform to below the handle portion.
Preferably, further in the mould cycle
activating a robot to position an array of vacuum suction elements between the heated fixed side of the die and the moving side of the die;
positioning the array of vacuum suction elements in registration with the array of cavities;
as the opposing half cavities open apply vacuum pressure to the vacuum elements and activate the robot to drive the vacuum elements to fit over the ends of the preforms;
retract the robot to draw the preforms from the cores and withdraw the vacuum elements and retained preforms from between the heated fixed side and the moving side of the die;
rotate the array of vacuum elements into a position in which axes of the preforms are substantially vertical and cut vacuum pressure to allow preforms to fall into a receiving bin.

Preferably, each vacuum element is provided with a slot or channel at an open end of the vacuum elements; the slot or channel provided to allow each vacuum element to accommodate at least a portion of the handle of the preform.

In a further broad form of the invention, there is provided a continuously rotating, non-symmetric preform feed, stretch-blow-moulding machine in which injection-moulded preforms with integral handles are transferred from a first transfer system to a preheating stage; the transfer of a preform from a gripper of the first transfer system to a preform supporting mandrel achieved in one fluid motion as a vertical axis of the preform is brought into alignment with a vertical axis of the preform supporting mandrel and the handle of the preform is slid into a heat shield provided on the mandrel, the transfer made while accommodating each of the rotations of a loop rail of the preheating stage, the mandrel and the transfer system as well as movements of the gripper.

Preferably, the handle as injection moulded is protected by the heat shield during the preheating stage; the shape of the handle of a container stretch-blow-moulded from the injection moulded preform being identical to the as injection-moulded shape of the handle of the preform.

BRIEF DESCRIPTION OF DRAWINGS

Embodiments of the present invention will now be described with reference to the accompanying drawings wherein:

FIG. 19 is a sectioned side view of a further preferred embodiment of a preform according to the invention;

FIGS. 19A and 19B are selected cross sections of the preform of FIG. 19;

FIGS. 21A and 21B are selected cross sections of the preform of FIG. 21;

FIG. 22 is a sectioned side view of a further preferred embodiment of a preform according to the invention;

FIGS. 22A and 22B are selected cross sections of the preform of FIG. 22;

FIG. 23 is a sectioned side view of a further preferred embodiment of a preform according to the invention;

FIGS. 23A and 23B are selected cross sections of the preform of FIG. 23;

FIG. 33 is a side view of a preferred embodiment of a preform and integrally attached handle according to the invention.

FIG. 34 is an end view of the preform of FIG. 33.

FIG. 35 is a view from above of the preform and handle of FIGS. 33 and 34.

FIGS. 36A and 36B are selected cross sections of the preform of FIG. 36;

DESCRIPTION OF EMBODIMENTS

Figure 1:
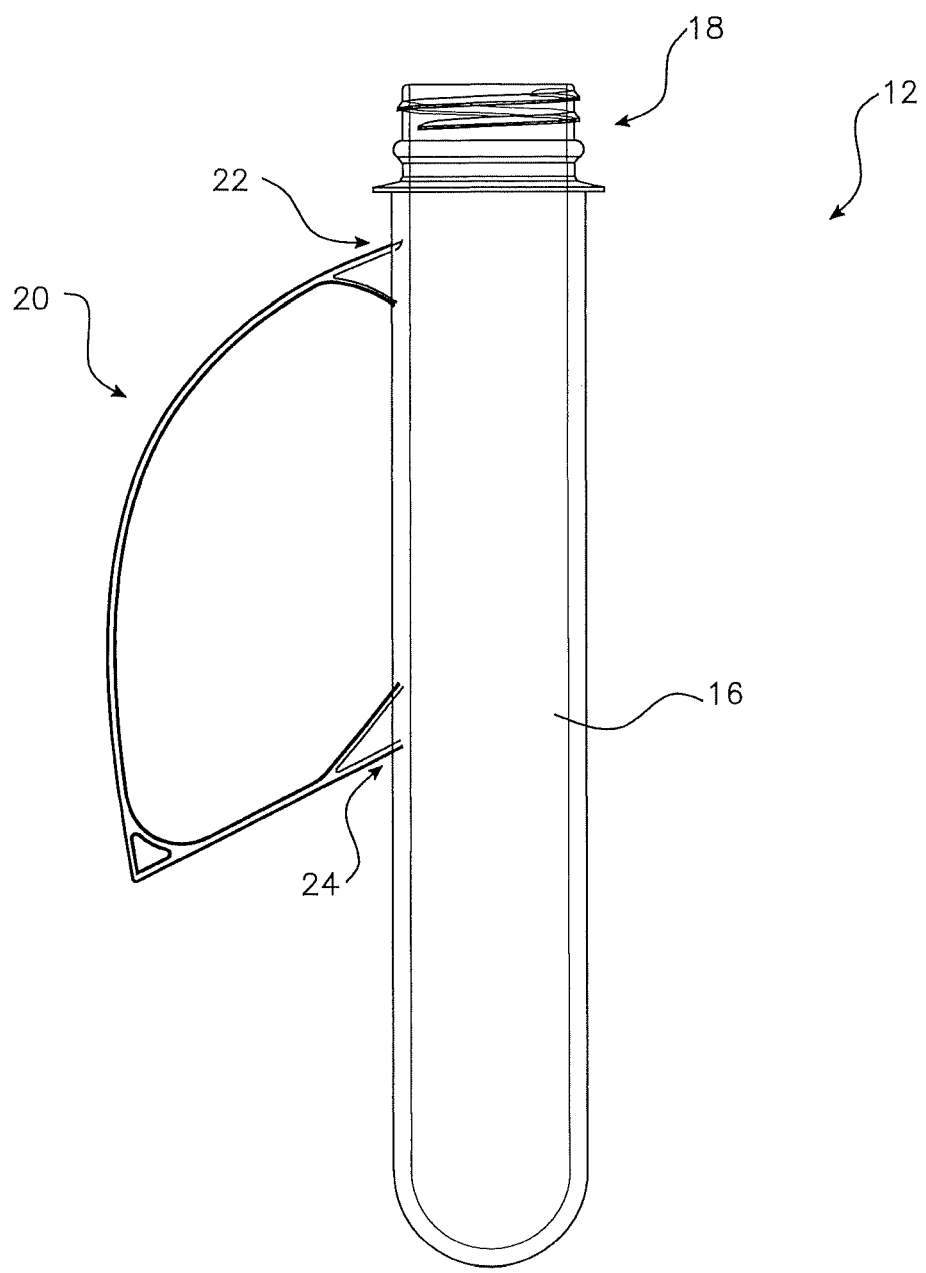
FIG. 1 is a side view of a perform with integral handle for stretch blow-moulding a container by means of a continuous blow moulding machine.
Figure 2:
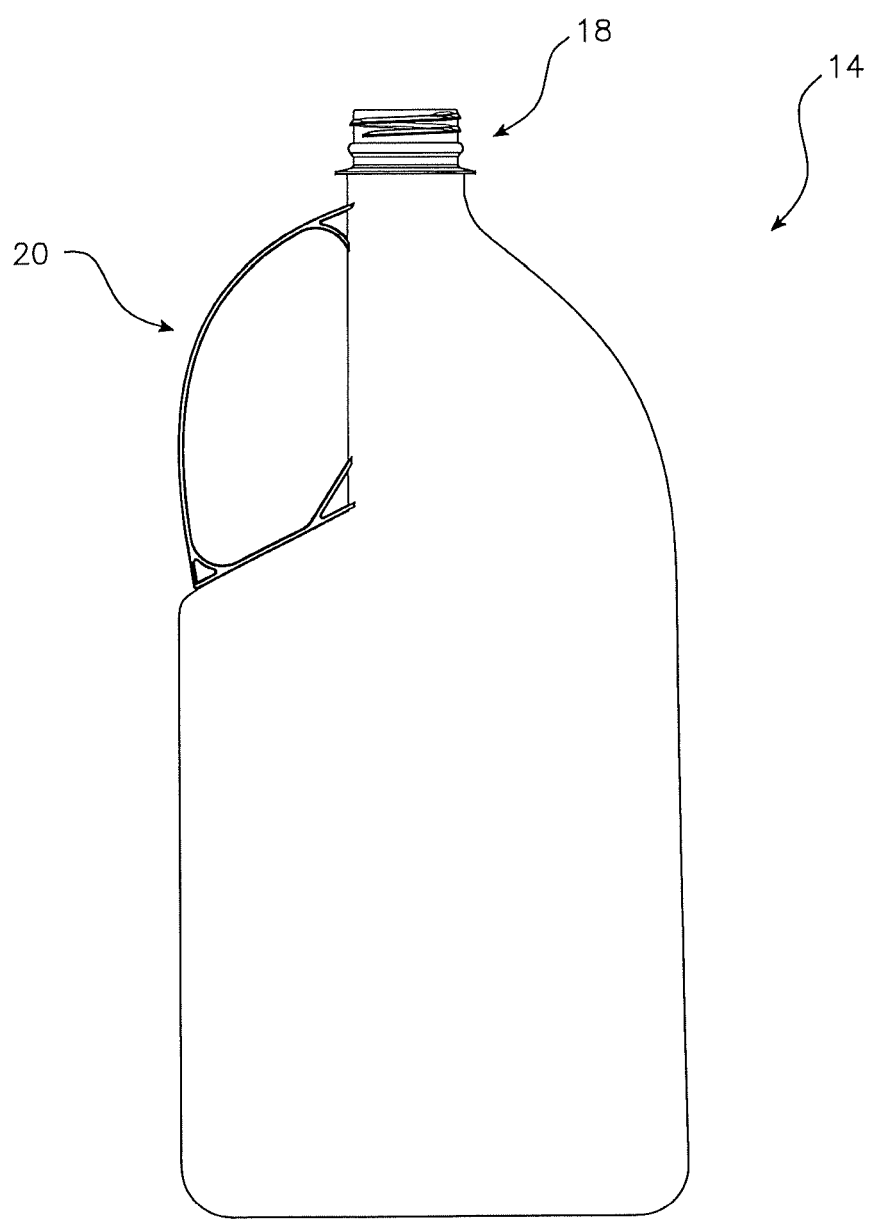
FIG. 2 is a side view of a container with integral handle stretch blow-moulded from the preform of FIG. 1.
Figure 3:
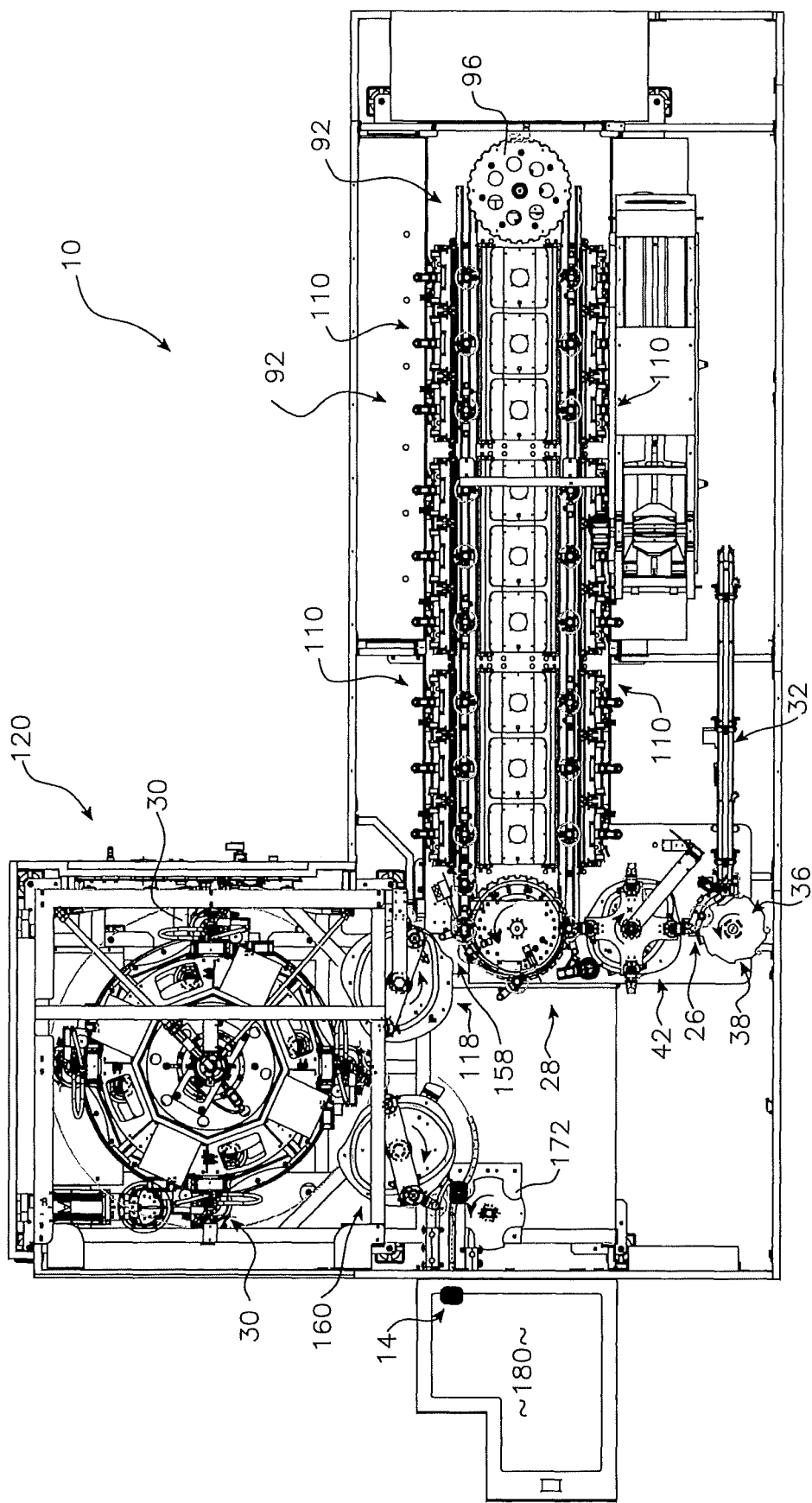
FIG. 3 is a plan view of the stretch blow-moulding machine producing the container of FIG. 2.

A feature of the present machine 10, a preferred configuration of which is shown in FIG. 3, is that motion through the machine of a non-symmetric injection moulded preform 12 as shown in FIG. 1, from its initial intake to its emergence as a stretch blow-moulded container 14 (as shown in FIG. 2), is continuous. As shown in FIG. 1, the previously injection moulded polymer preform comprises a cylindrical elongate body 16 and neck 18. An integral handle 20 extends from a first junction point 22 just below the neck 18 to a second junction point 24 on the body 16 of the preform.

Referring again to FIG. 3, the continuous, non-incrementing process of the machine 10 includes the transfer of preforms from a loading or pick off position 26 to a preheating stage 28, through the preheating stage and transfer to a stretch-blow moulding die 30 with subsequent removal of the blown container 14 from the die and removal from the machine. These stages will now be described in detail.

Entry of Preforms and Handle Orientation—First Preferred Embodiment

Figure 4:
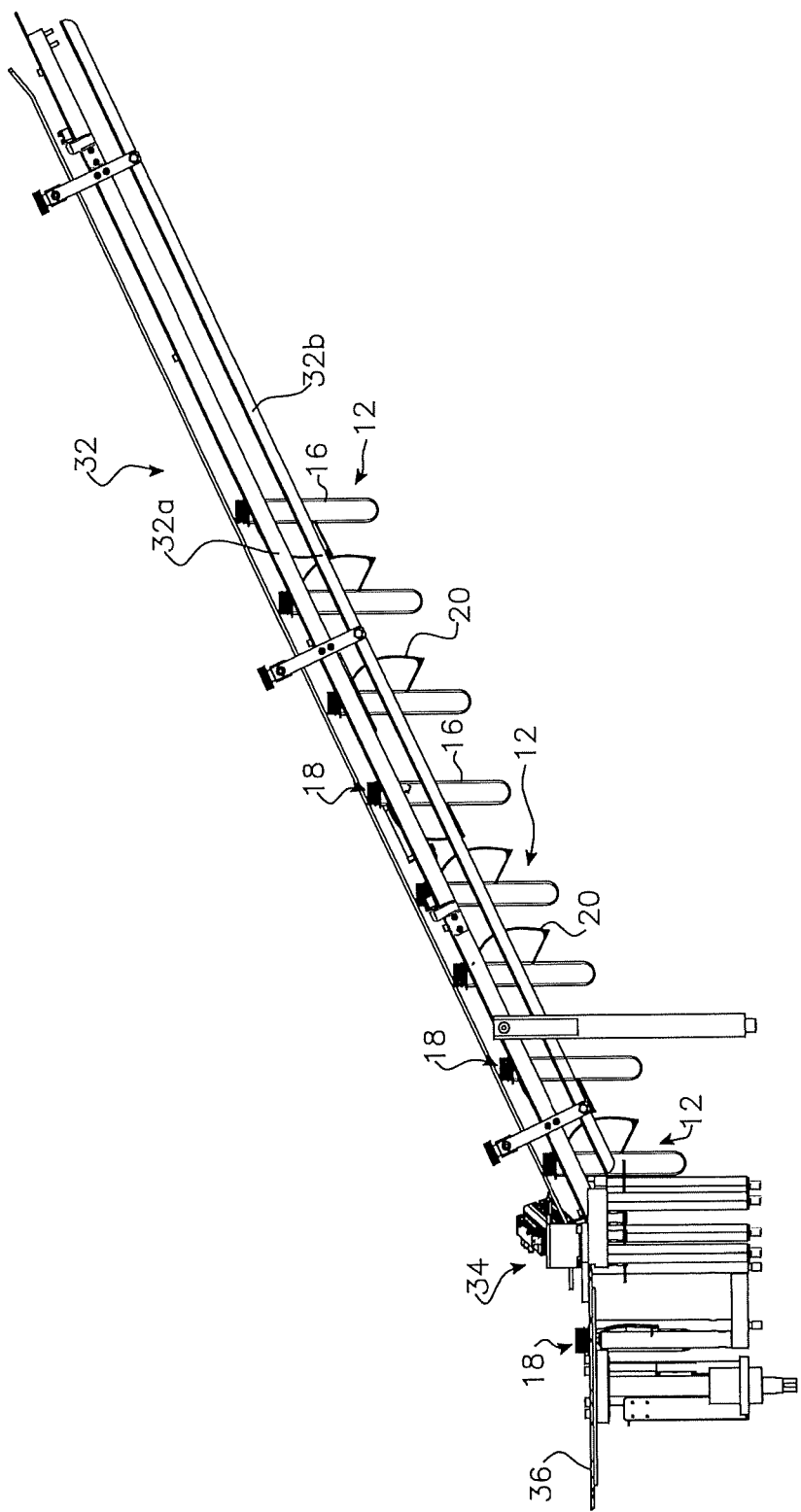
FIG. 4 is a side view of a preform orientation and loading section of the machine of FIG. 3.
Figure 5:
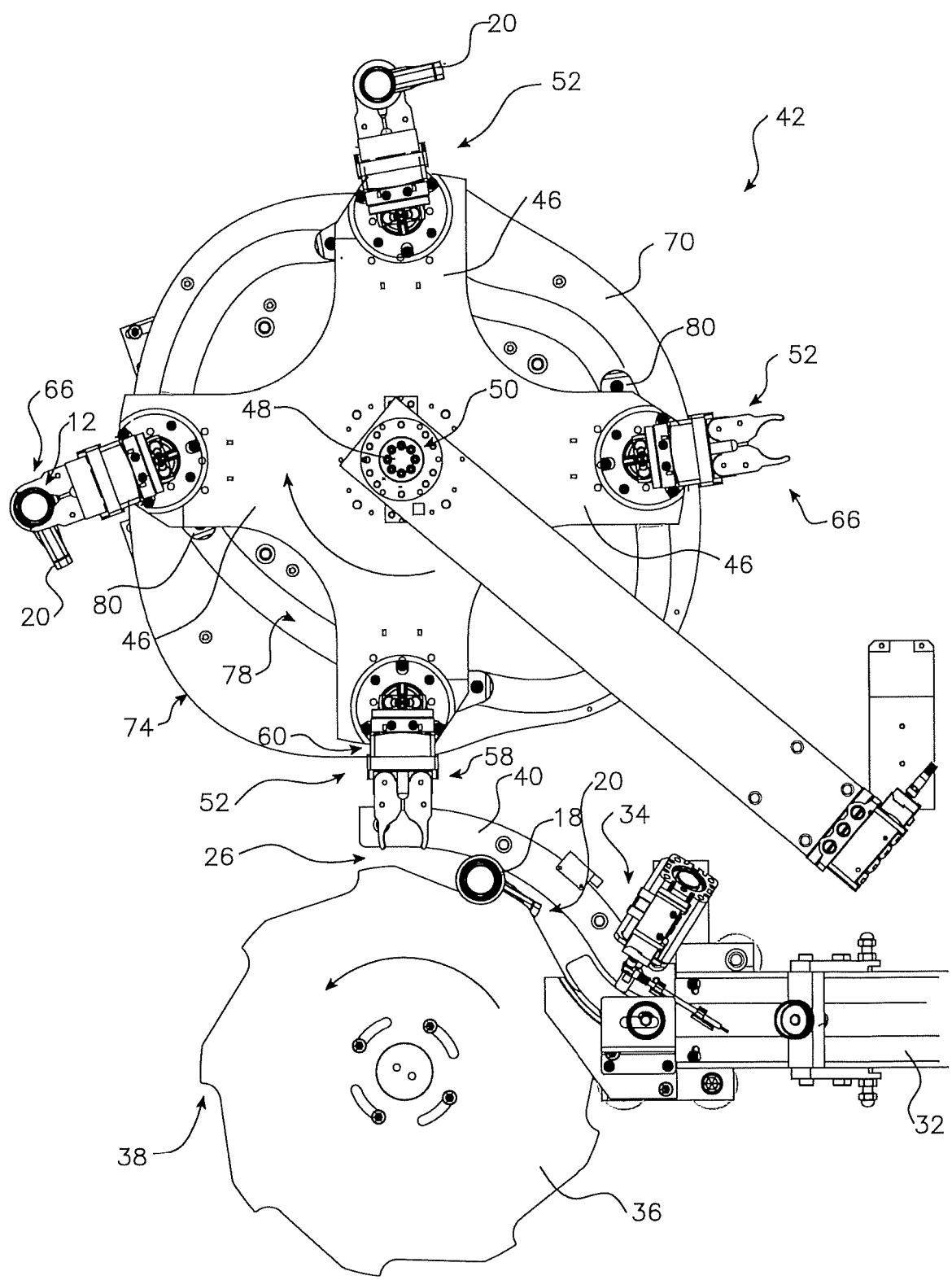
FIG. 5 is a plan view of a loading end of the preform orientation and loading section of FIG. 4 and a first preform transfer system.

As shown in the preferred layout of the machine 10 in FIG. 3 and referring also to FIGS. 4 and 5, the previously injection moulded preforms 12 (as shown in FIG. 1) are fed, for example from a hopper (not shown but as well understood in the industry) to slide under gravity down inclined rails 32 while supported by their necks 18. The inclined rails 32 comprise a pair of upper rails 32a between which the preforms are suspended by their necks 18, and a pair of lower rails 32b which constrain the handles 20 of the preforms approximately in line with the long axis of the rails. For reasons that will become clear, it is essential however, that during the passage of preforms through the stages of the machine, the orientation of the integral handle 20 of the preform is controlled precisely.

Preforms 12 with a handle roughly oriented pass one by one through an escapement 34 to be captured by a continuously rotating feeder wheel 36 which carries the preform between the feeder wheel and a short rail 40, in such a way that friction between the body 16 of the preform and the rail 40 induces rotation of the preform and its handle. The rotating handle collides with a stop 40a under the rail 40 forcing each handle into a rearward orientation with respect to the direction of travel, to arrive at a pick off position 26.

At the instance that a preform arrives at the pick of position 26, a pair of opposing actuators (not shown) located under the pick off position 26, simultaneously briefly close on, and then release, the preform handle 20 to fix its orientation relative the gripper 58 which, also at that instant engages with the neck 18 of the preform.

Entry of Preforms and Handle Orientation—Second Preferred Embodiment

Figure 4A:
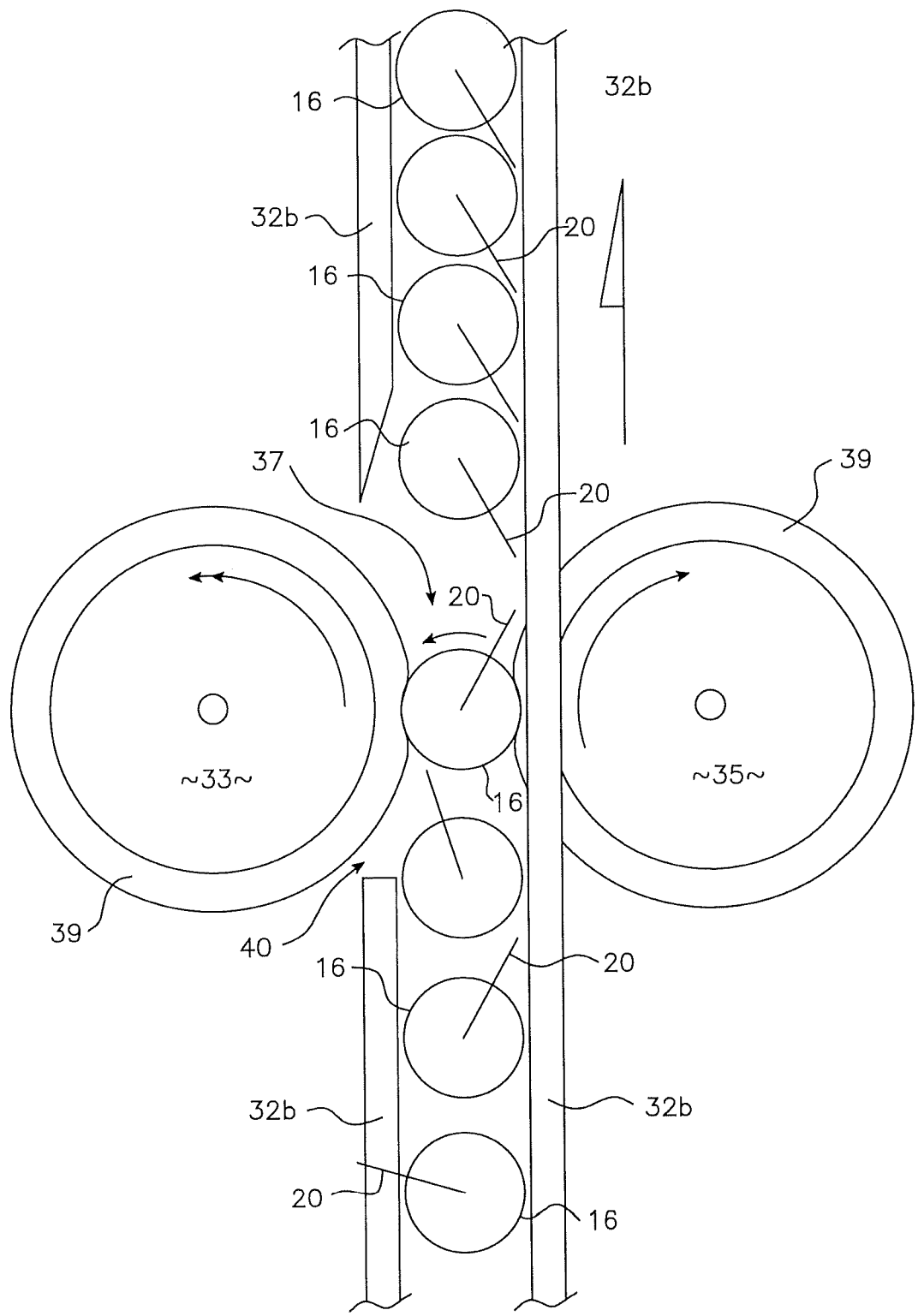
FIG. 4A is a plan view of the preform orientation and loading section of the machine of FIG. 3.

In this second preferred embodiment, with reference now to FIG. 4A, the injection moulded preforms 12 are again fed onto inclined rails 32a, down which they slide under gravity supported by the flanges at the necks 18. Again, as described for the first preferred embodiment above, the handles are loosely constrained between lower rails 32b, with the handles either in a "leading", that is pointing in the direction of movement of the preforms as they progress down the incline, or "trailing", pointing rearwardly.

In this second preferred embodiment an orientation mechanism 34A is located at a point along the rails 32 approaching the lower end of the rails. As can be seen in FIG. 4A, the mechanism includes two contra-rotating drive wheels 33 and 35, arranged at opposite sides of the rails 32, at a level coincident with the lowermost portion of the bodies of the preforms and below the lower rails 32b and the lowermost point of the handles. The axes of the wheels are normal to the slope of the inclined rails. Note only the lower rails 32b are shown in FIG. 4A.

The drive wheels 33 and 35 are separated by a gap 37 which is somewhat narrower than the diameter of the body 16 of the preforms. Each of the wheels 33 and 35 is provided with one or two tyres 39 of a sufficiently soft polymer material to allow a preform body 16 to pass through the gap but providing a degree of grip on the body.

As shown in FIG. 4A, drive wheel 33 rotates in an anticlockwise direction while drive wheel 35 rotates in a clockwise direction. The combination of these two rotations has the effect of drawing a preform through the gap 37. The two drive wheels do not however rotate at the same rate, with, in the preferred arrangement shown in FIG. 4A, drive wheel 35 rotating at a significantly lower rpm than that of guide wheel 33. A preferred ratio of rotation of drive wheel 33 to drive wheel 35 is of the order of 2:1.

The effect of this differential in rate of rotation of the two drive wheels is that drive wheel 35 exerts a considerably greater grip on the body 16 of the preform so that it acts to rotate the preform in an anticlockwise direction as the preform passes through the gap 37 between the two drive wheels. By this means a handle 20 of a preform which is in a leading position as the preform enters the gap 37, is rotated until it contacts the right hand lower rail 32b (as seen from above in FIG. 4A). To allow for this rotation of the handle a gap 40 is provide in the left hand lower rail.

It will be understood that the anticlockwise rotation induced by drive wheel 35 has no effect on those preforms entering the gap with their handles trailing, except to drive the trailing handle into contact with the right hand lower rail. Thus, all preforms downstream of the orientation mechanism 34A approach the escapement 34 in the preferred orientation with the handles in the trailing position.

The escapement 34 controls the feeding of the handle oriented preforms to the feeder wheel 36 as described above, retaining the trailing orientation of the handles as induced by the mechanism 34A. As for the first arrangement above, at the instance that a preform arrives at the pick of position 26, a pair of opposing actuators (not shown) located under the pick off position 26, simultaneously briefly close on, and then release, the preform handle 20 to fix its orientation relative the gripper 58 which, also at that instant engages with the neck 18 of the preform.

It will be understood that although the above description is specific to the rotation of the preform in an anticlockwise direction by the clockwise rotating drive wheel, orientation according to the principles of the mechanism may equally be achieved by reversing the differential rates of rotation of the two drive wheels and providing the gap in the lower guide rail on the opposite side to that illustrated in FIG. 4A. In this alternative arrangement, it is then the anticlockwise rotating drive wheel which induces clockwise rotation to the body of a preform passing between the wheels, rotating a leading oriented handle until it contacts the left hand lower rail (as seen from above in FIG. 4A), the gap allowing rotation of the handle then being provided in the right hand lower rail.

Precise orientation of the handle throughout the stages of the machine is critical to the process of preheating where the orientation must align with the alignment of heat shields, and for correctly placing the preform and the handle into the stretch-blow-moulding die.

Entry of Preforms and Handle Orientation—Third Preferred Embodiment

Figure 4B:
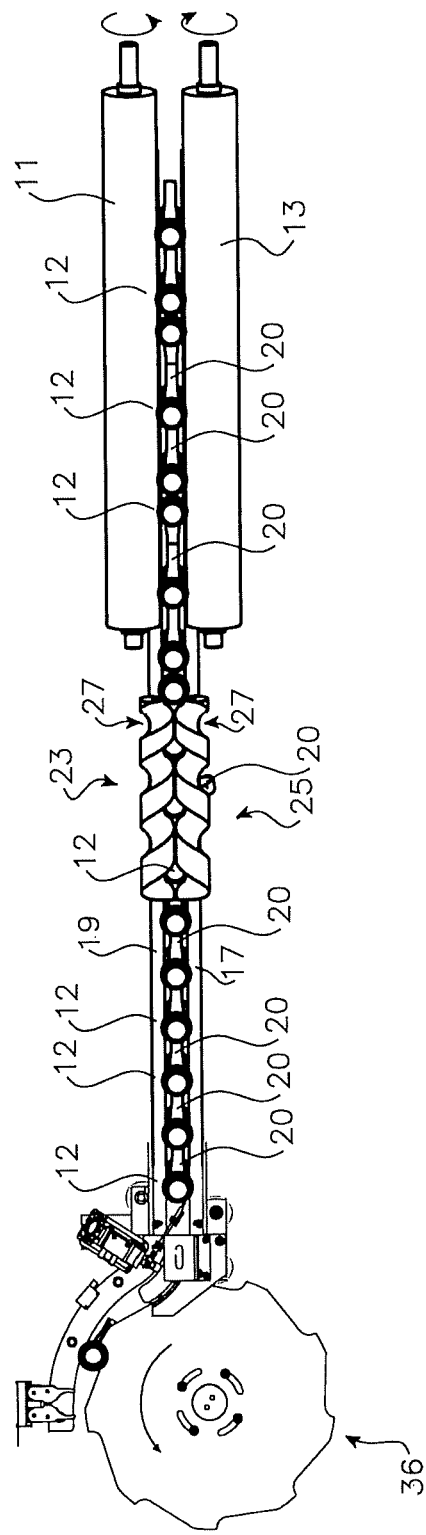
FIG. 4B is a plan view of a further preferred embodiment of a preform orientation arrangement for the machine of FIG. 3.
Figure 4C:
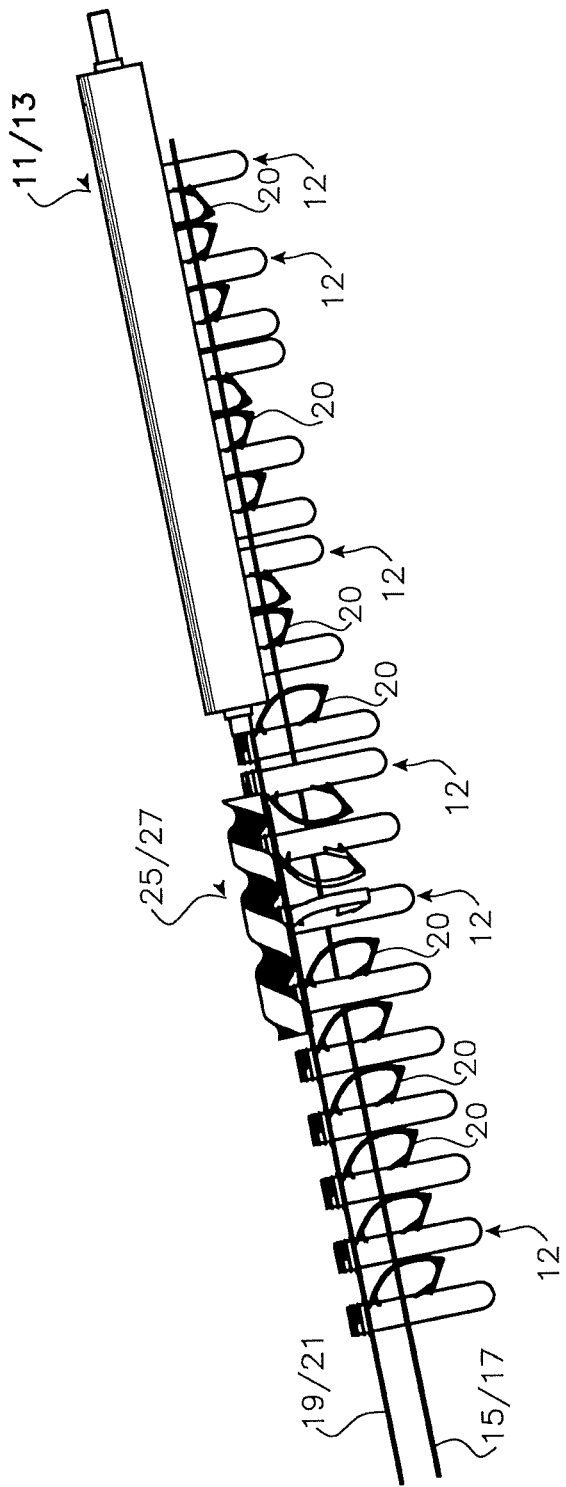
FIG. 4C is a side elevation view of the orientation arrangement of FIG. 4B.
Figure 4D:
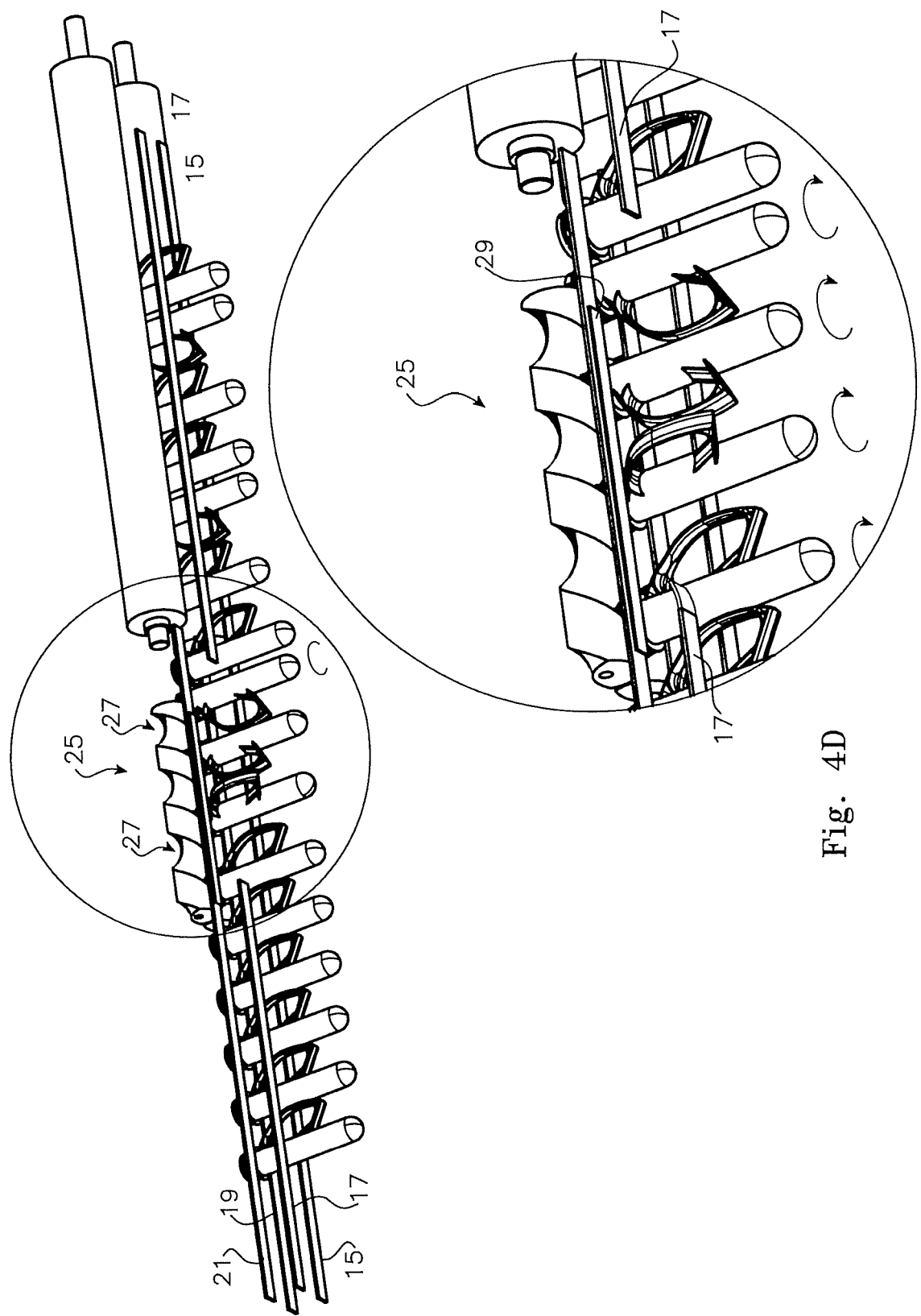
FIG. 4D is a perspective view from below of the orientation arrangement of FIGS. 4B and 4C.

With reference now to FIGS. 4B to 4D, in this further preferred arrangement of a handle orientation mechanism 34b, injection moulded preforms 12 emerge one at a time from a bulk supply via, for example, a conveyor (not shown) to be deposited centrally onto a pair of contra-rotating, downward sloping rollers 11 and 13. The rollers 11 and 13 are so spaced as to allow the body 16 and handle 20 of each preform to drop through the gap between them but retain the wider diameter of the projecting collar below the neck 18 of the preform. The rollers 11 and 13 are mounted above a pair of spaced apart guide rails 15 and 17 (as best seen in FIG. 4D) similarly spaced as the gap between the rollers. As the bodies and the handles of the preforms drop through the gap between the rollers and that between the guide rails 15 and 17, the handles 20 are constrained into approximate alignment between these rails, but at this stage handles may be "leading" or "trailing" relative to movement in the downward direction shown in FIGS. 4C and 4D. Since it is a requirement imposed by the design of the blow-moulding machine described below, that preform handles at entry of preforms into the feeder wheel 36 must be in the trailing position, those leading must be turned around.

At the downward ends of the rollers, the preforms drop to the level of main support rails 19 and 21, so that preforms are now retained between these main support rails by their collars. A combination of gravity and pressure from following preforms forces each preform against the upward outer ends of side by side, contra-rotating auger screws 23 and 25 located on either side of a median vertical plane between the support rails. The flutes 27 of the auger screws are sized so as to capture between them the necks 18 of the preforms. The pitch of the auger screws is such as to separate preforms while being driven in the downward direction by the screws' rotation.

Generally coextensive with the length of one of the auger screws, (in the arrangement shown in the drawings, auger screw 25), the main support rail 21 is provided at its underside with a friction strip 29 (as best seen in the enlargement inset of FIG. 4D). This friction strip 29 projects slightly into the gap between the main support rails 19 and 21 so that its inner edge engages with the body of a preform as it progresses between the augers. This friction contact urges rotation of the preform in an anticlockwise direction as seen from above.

Also approximately coextensive with the length of the auger screw 25 is a gap in the guide rail 17. Any rotation of an already trailing handle, will only force the handle into engagement with the opposite guide rail 15, and remain trailing. But, as can be seen from the enlarged inset of FIG. 4D, handles of preforms with handles leading at entry between the auger screws will gradually be rotated from the position where the handle is leading to it being in the trailing position, (being free to do so by the gap in guide rail 17) until these handles also are arrested from further rotation by the opposite guide rail 15. From here as can be seen from FIGS. 4C and 4D, the preforms, all with handles trailing, proceed down the main support rails 19 and 21 with the handles constrained between the now continuous guide rails 15 and 17 until they reach the final orientation operation at the feeder wheel 36.

As well as spacing and rotating preforms as they pass between the auger screws 23 and 25, the rotation rate of the auger screws is such as to deliver a preform to the feeder wheel 36 in synchronization with the rotation of that wheel. Furthermore, the rotation of the auger screws provides pressure to ensure preforms proceed down the main support rails.

Transfer to Preheating

Figure 6:
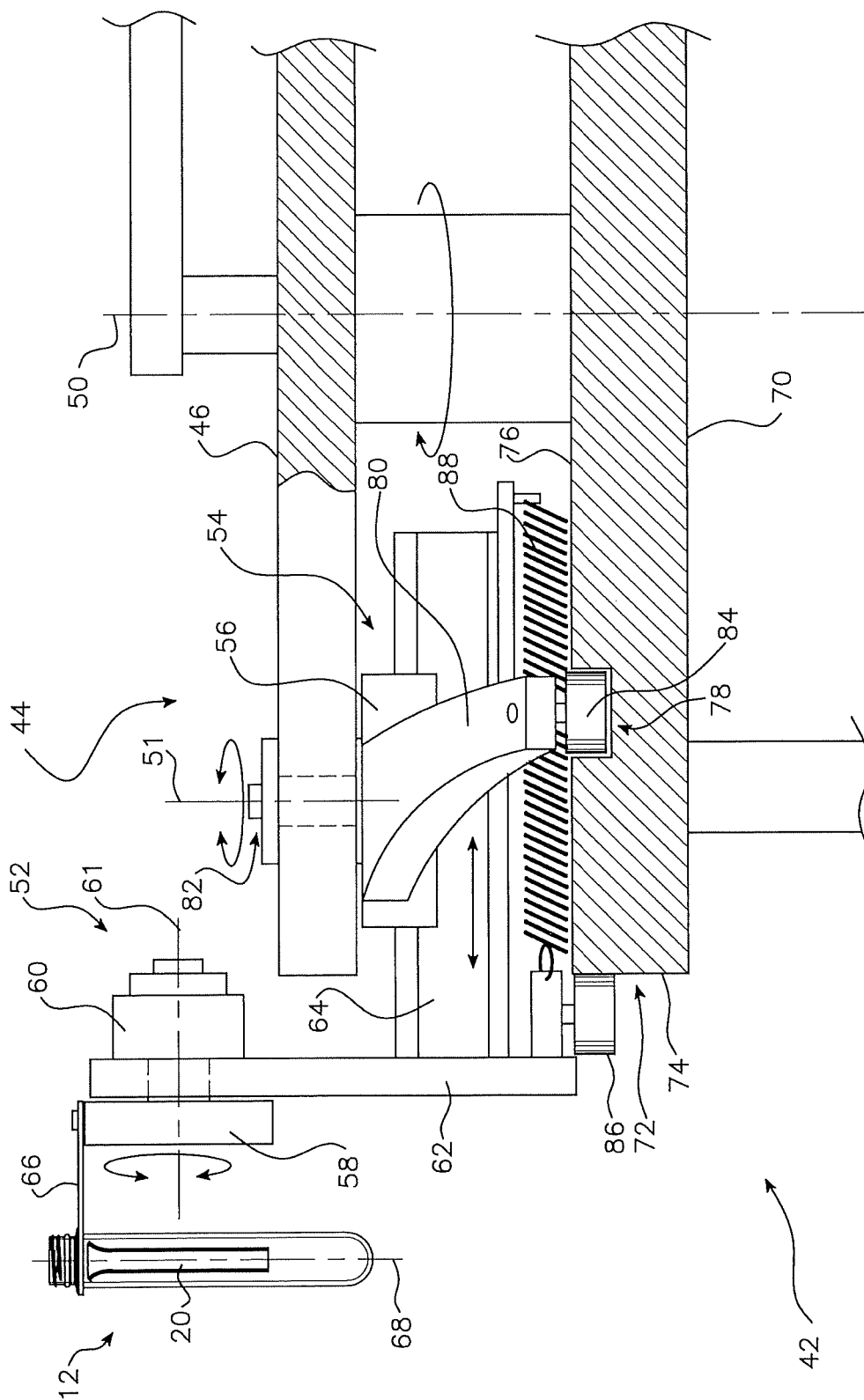
FIG. 6 is a perspective view of the first preform transfer system of FIG. 5.

Referring now to FIG. 5 and FIG. 6, a first rotating transfer system 42 is positioned adjacent the feeder wheel 36 with a continuously rotating carrier 44 of the first rotating transfer system 42 and the feeder wheel 36 contra-rotating one to the other.

The rotating carrier 44 of the first rotating transfer system 42 includes, in this embodiment, four opposing support arms 46 extending radially from a fixed centre of rotation 48 to rotate about a vertical axis 50. Each end of the arms carries a first pick and place apparatus 52. Each first pick and place apparatus 52 includes a linear guide 54, a housing 56 which is rotatably mounted to the outer end of the support arm 46, enabling rotation of the housing 56 about a vertical axis 51. A two-fingered gripper 58 is mounted to a rotary actuator 60 supported by vertical plate 62 at an outer end of a free sliding element 64 of the linear guide 54. The gripper fingers 66 are centred on a gripper effective vertical axis 68, with the gripper able to be rotated about the horizontal axis 61 of the rotary actuator 60.

A fixed horizontal cam plate 70 is mounted at a level below the rotating carrier 44 so that its centre is coincident with the vertical axis 50 of the rotating carrier. The perimeter edge 72 of the cam plate 70 forms an outer cam surface 74 and its upper surface 76 is provided with a cam channel 78 which is inboard of the perimeter edge 72 and the outer cam surface 74.

The housing 56 of the linear guide 54 is provided with an outrigger arm 80 extending radially from the centre of rotation 82 of the linear guide 54. The outer end of the outrigger arm 80 supports a first cam follower 84 locating in the cam channel 78. The free sliding element 64, adapted to reciprocating linear motion in a horizontal plane, is provided with a second cam follower 86 with the free sliding element 64 biased by springs 88 to maintain contact between the second cam follower 86 and the outer cam surface 74.

The cam channel 78 and outer cam surface 74 are arranged so that as a first pick and place apparatus 52 rotates past the preform pick off position 26, the rotation of the rotating carrier 44, combined with the loci of the first and second cam followers 84,86 causes the gripper 58 to be both reciprocatingly extended and retracted, and rotated relative the arm 46. The gripper motion is such that at the approach to the preform pick off position 26, the free sliding element 64 and thus the gripper 58 is extended followed by rotation of the linear guide 54 and gripper 58 in retrograde or negative direction relative to the direction of rotation of the rotating carrier 44.

At the instant a preform 12 arrives at the pick off position 26 after its approximate orientation, so that the handle 20 of the preform is trailing but not yet fixed, the extending movement of the gripper 58 through the first cam follower 84 against the outer cam surface 74, brings the gripper effective axis 68 into coincidence with the central axis of the preform. At this instance also, a pair of opposing actuators located under the pick off position 26 simultaneously briefly close on, and then release, the preform handle 20 to fix its orientation relative the gripper 58 which, also at that instant engages with the neck 18 of the preform. The gripper 58 is then rotated positively to carry the preform 12 clear of the supporting short rail 40 and away from the pick off position 26.

This combination of reciprocating rotation and extension and retraction of the gripper 58 compensates for the divergence of the loci of the supporting tooth formation 38 of the feeder wheel 36 and the rotating carrier 44 as they contra rotate one relative the other. It is by the means of the reciprocating rotation and retraction movements of the gripper through a combination of a rotating linear guide and the two cam loci that a smooth continuous transfer of preforms is possible between two rotating elements; that of the feeder wheel 36 and the rotating carrier 44.

Loading into Mandrel Stage

Figure 7:
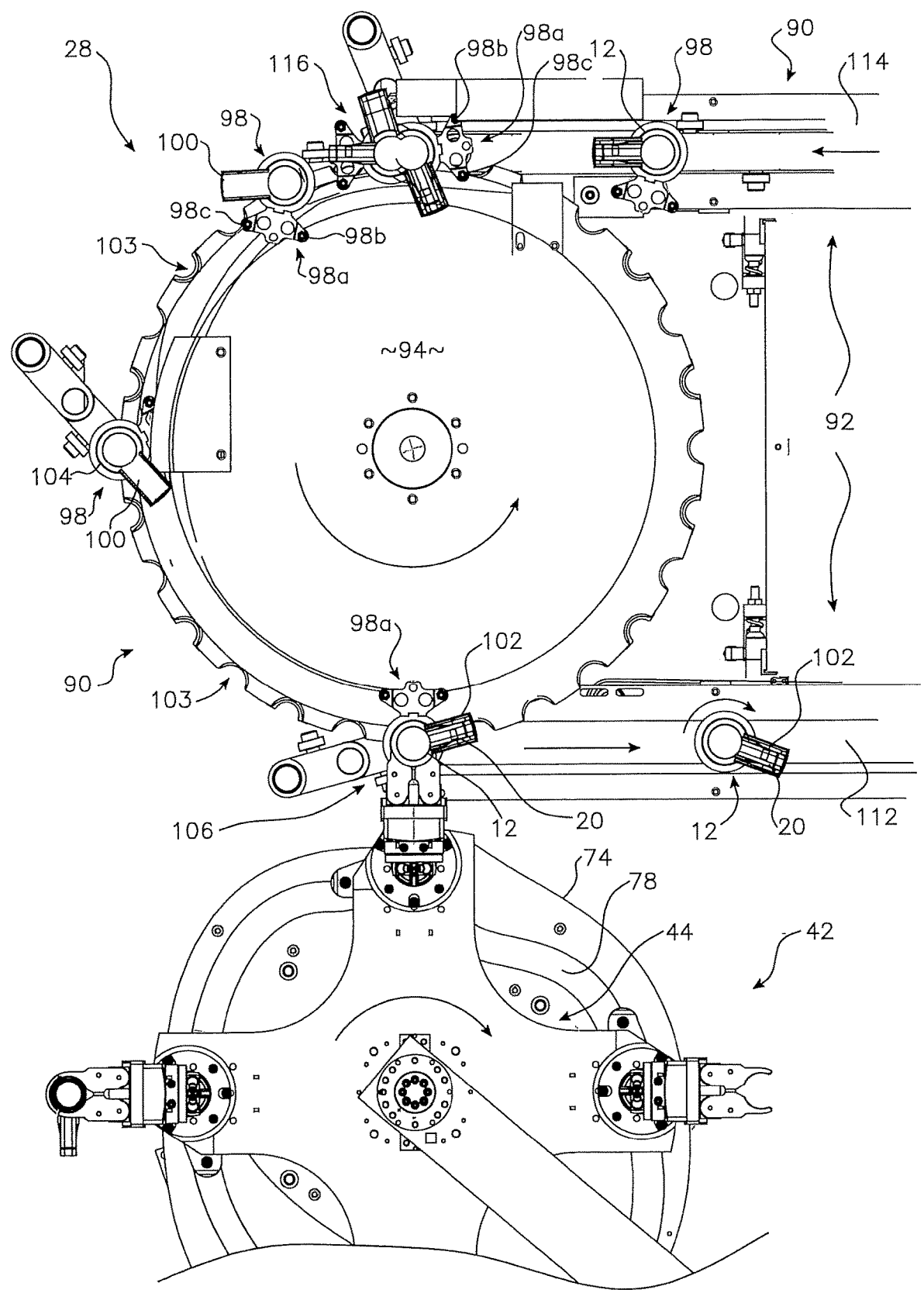
FIG. 7 is a plan view of a portion of the preform transfer system of FIGS. 5 and 6 and a preform loading and unloading area of a preform preheating stage of the machine.

With reference now to FIG. 7, rotation of the rotating carrier 44 brings a preform 12 retained in a gripper 58 to the preheating stage 28 as was shown in FIG. 3 of the machine 10. Because the preheating of the preforms is conducted with the preforms inverted from their initial position at the pick off position 26, that is, with the neck 18 upward, the rotary actuator 60 at the end of the free sliding element 64 rotates the grippers 58 and the preforms through 180 degree during their transit between pick off position 26 and the transfer to a preheating transport system 90. The effect of this rotation is that the handle 20 of the preform is now "leading" with respect to the direction of rotation of the rotating carrier 44, instead of trailing as it was at the pick off position 26 as could be seen in FIG. 5.

The preheating transport system 90 is also in continuous movement and comprises a loop rail system 92 with proximate and distal rotating guide wheels 94 and 96 respectively at either end of the loop. A plurality of preform supporting mandrels 98 are adapted to move around the loop rail system 92, driven into motion around the straight sections of the loop by a drive chain (not shown) to which they are fixed and around the guide wheels 94,96 by nesting in niches 103 of the guide wheels. As well as travelling around the loop rail system 92, the mandrels 98 are continuously rotated about their vertical axes.

Figure 8:
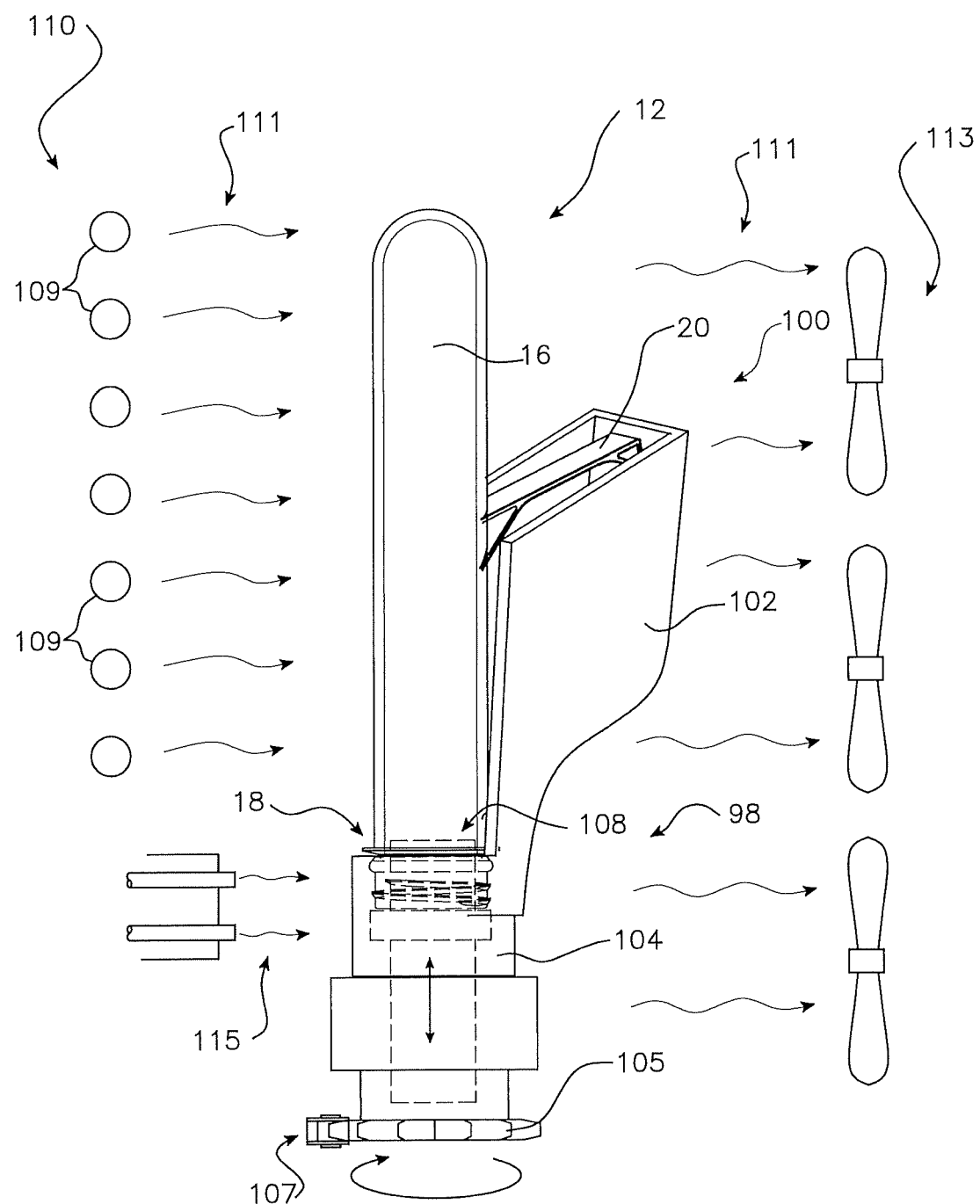
FIG. 8 is a perspective view of a perform of FIG. 1 inserted into a mandrel with heat shield for transport through the preform preheating stage of the machine.

Preheating of the preform 12 is required for the body 16 of the preform, that is for that portion of the preform which will be subjected to stretching and blow-moulding, to sufficiently soften the polymer. But the handle 20 and the neck 18 which retain their as injection moulded form in the blown container shown in FIG. 3, must be protected from excessive heat as the preform moves through the preheating stage. For this reason, as shown in FIG. 8, a preform supporting mandrel 98 is provided with a heat shield 100 comprising a channel 102 rising from a cylindrical collar 104 in which the handle 20 is protected while the neck 18 is protected by its insertion into the cylindrical collar 104 of the mandrel.

It may be noted that the patterns of the outer cam surface 74 and that of the cam channel 78 of the first rotating transfer system 42 as shown in FIG. 5, near the pick off position 26 differ from those at the approach to, and following the preform transfer to preheating position 106. This reflects the difference in movements required of a gripper 58 as it steers the preform into the position in which the vertical axis of the preform becomes aligned with that of the cylindrical collar 104 of the mandrel 98 and the handle 20 is aligned with the heat shield channel 102. At the instant these axes are aligned and the handle 20 of the preform is aligned between the side elements of the channel 102, a cylindrical plunger 108 within the collar 104 rises into the neck 18, then lowers to bring the neck to an inserted position within the collar. These movements of course take place while the first rotating transfer system 42 and the proximate guide wheel 94 are in continuous contrarotation. This complex movement is again made possible by the combination of the rotation of the arm 46 and the rotation and linear movements of the free sliding element 64, and thus of the gripper fingers 66 of the first pick and place apparatus 52.

Thus the transfer of a preform from the gripper of the first transfer system 42 to a preform supporting mandrel 98 is achieved in one fluid motion as the vertical axis of the preform is brought into alignment with that of the mandrel and the oriented handle of the preform slides into the heat shield, while accommodating each of the rotations of the loop rail, the mandrel and the transfer system as well as the movements of the gripper.

Preheating of Preforms

As best seen in FIGS. 3 and 8, banks 110 of heating elements 109 are positioned along each of the straight sections of the loop rail system 92. Graded hot air 111 is drawn across the path of the preforms 12 by extractor fans 113. To prevent excessive heat build-up of the cylindrical collar 104 and the neck 18 of the preform in the collar, a cooling air stream 115 is directed at the collars.

As a mandrel 98 and preform 12 are rotated away from the transfer-to-preheating position 106 by the proximate rotating guide wheel 94, the mandrels supported in the chain of the preheating transport system 90 travel along the first straight section 112, around the distal rotating guide wheel 96 and back along the second straight section 114 to arrive at a transfer-from-mandrel position 116. While traversing these straight sections, the mandrels are rotated about their vertical axes by a gear 105 of the mandrel engaging with chain 107 to evenly expose the bodies of the preforms to heat from the banks 110 of heating elements 109. The heating elements 109 are each arranged as a series of infra-red heating elements which are individually adjustable as to their proximity to the passing preforms.

It will be understood that the orientation of each mandrel 98 at both the transfer to preheating position 106 and at the transfer from mandrel position 116 is critical to allow the respective first and second transfer systems to insert and extract a preform handle from the channel of the mandrel's heat shield. These heat shield orientations with respect to the periphery of the proximate guide wheel 94 are not the same at these two positions so that the orientation of the mandrel and its heat shield need to be changed from that demanded at the handle extraction position to that required at the handle insertion position.

To this end, each mandrel is provided with a guide carriage 98a fixed to the mandrel. As a mandrel approaches the transfer-from-mandrel position 116, cam followers 98b and 98c engage with guide channels to rotate the mandrel into the required orientation. During transit about the periphery of proximate guide wheel 94, the cam followers 98b and 98c follow cam channels of a cam plate above the proximate guide wheel to bring the orientation of the heat shield to that required at the transfer-to-preheating position 106.

Transfer to Mould

Figure 9:
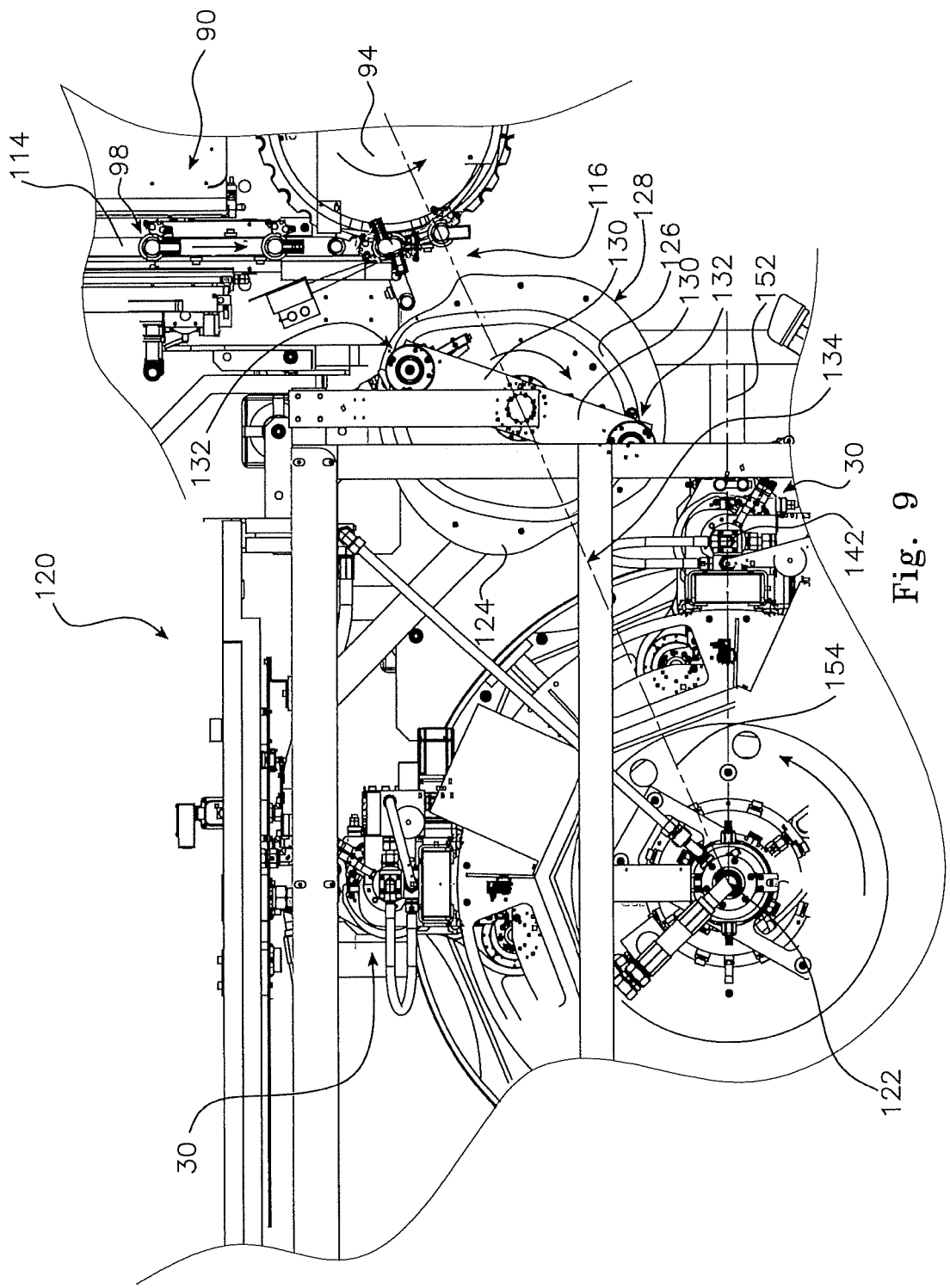
FIG. 9 is an enlarged plan view of section of the machine showing a portion of the preform loading and unloading area of FIG. 7, a second transfer system and a portion of the stretch-blow-moulding dies assembly of the machine.

With reference now to FIG. 9, a second rotating transfer system 118 operates to transfer preforms 12 from the preheating transport system 90 to a stretch blow moulding die assembly 120. The stretch blow moulding die assembly 120 comprises of four stretch blow moulding dies 30, two of which can be seen in the truncated view of the machine in FIG. 9. In the present embodiment, four radially disposed stretch blow moulding dies 30 rotate continuously about a common centre 122.

The second rotating transfer system 118 is of similar configuration to that of the first rotating transfer system 42 described above. That is, it includes a cam plate 124, also provided with an inboard cam channel 126 and an outer cam surface 128 around its periphery.

In this instance, second rotating transfer system 118 includes two, rather than four, continuously rotating opposing radial arms 130, each of which carries a second pick and place apparatus 132. Again, similar to the first pick and place apparatuses 52 of the first rotating transfer system 42 above, each includes a linear guide rotatably mounted to the respective outer end of the radial arm 130, with the free sliding element of the linear guide supporting a rotary actuator which, in turn supports a gripper. In this arrangement also, a first cam follower of an outrigger arm attached to the housing of the linear guide, locates in the inboard cam channel 126, while a second cam follower of the free sliding element of the linear guide remains in contact with the outer cam surface 128 by means of a spring.

Preforms still retained in preform supporting mandrels 98 arrive back at the rotating proximate guide wheel 94 of the preheating system and approach the transfer-from-mandrel position 116, and are rotated into the required orientation of the heat shield as explained above. The cylindrical plunger 108 of a mandrel 98 approaching the transfer-from-mandrel position 116, lifts the preform so that the neck is clear of the cylindrical collar 104 to allow the gripper of the second rotating transfer system 118 to engage the preform by the exposed neck 18. Again, it is the motion of the gripper induced by the combination of rotation of the radial arm 130, the rotation of the linear guide and linear movements of the free sliding element supporting the gripper as controlled by the cam channel 126 and outer cam surface 128, which allows the perform and its handle to be smoothly removed from the preheating transport system 90.

As one rotating radial arm 130 of the second rotating transfer system 118 approaches and removes a preform from the preheating transport system 90, the opposite radial arm approaches the die loading position 134. During its rotation from the transfer-from-mandrel position 116 to the die loading position 134, the rotary actuator of the second pick and place apparatus 132 rotates about its horizontal axis to change the preform from its inverted position held during the preheating stage, back into an upright position. (It should be noted that FIG. 9 shows both a rotating arm 130 and a stretch blow moulding die 30 approaching the die loading position 134)

Figure 10:
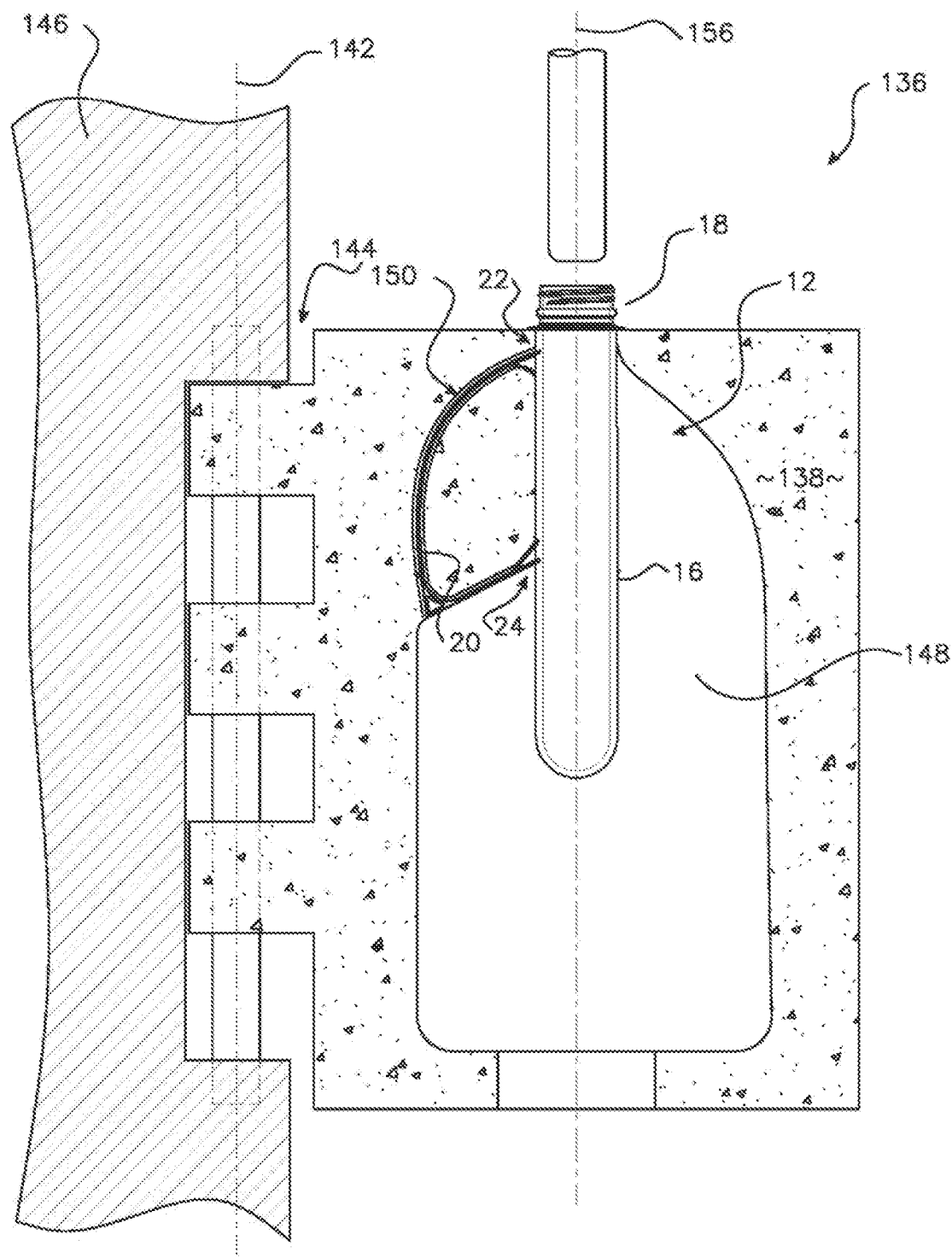
FIG. 10 is a front view of one half of a stretch-blow-moulding die for the production of the container shown in FIG. 2.

Stretch blow moulding dies of the die assembly 120, are in the form of two die halves 136, one of which is shown in FIG. 10. Die halves 136 are hinged together about a vertical axis 142 in the manner of a bivalve, and with the hinge supported from a central structure 146 of the die assembly 130 in a typical arrangement for radial stretch-blow-moulding machines. The face surface 138 of the die half shown in FIG. 10 has been shaded to highlight the die cavity 148 for the body 16 and integral handle 20 of the preform. As is common in the stretch-blow-moulding of containers, the neck 18, which remains unaltered in the stretch-blow-moulding process, projects out of the die when closed.

Referring again now to FIG. 9, as stretch-blow-moulding dies 30 approach the loading position 134 the die halves open symmetrically about a bisecting radial line 152 passing through the centre of rotation 122 and the vertical axis 142 of the die hinge 144, in preparation for receiving a preform.

It may noted from FIGS. 3 and 9, that the rotation centres of the second rotating transfer system 118, the proximate rotating guide wheel 94 of the preheating stage and that of the stretch-blow-moulding die assembly 120, lie along a straight line 154.

As an opened die 30 approaches the die loading position 134 lying on the straight line 154, a radial arm 130 with a preform retained in the gripper of the second pick and place apparatus 132 also approaches the loading position. As the bisecting radial line 152 of the die halves 136 becomes coincident with the straight line 154, the movements of the second pick and place apparatus 132 has brought the gripper effective vertical axis and thus the vertical axis of the preform into coincidence with the axis 156 of the die (as defined by the centre of the preform body when held in the die) and with the handle oriented to lie in the vertical plane defined by the straight line 154. While the die halves close and the paths of the die 30 and the end of the rotating arm 130 begin to diverge, the rotation and extension of the gripper, still holding the neck 18 of the preform, ensures the orientation of the handle is maintained in that vertical plane defined by the bisecting line of the die halves until closure is complete. The gripper then disengages from the preform neck.

It can be seen from FIG. 10, that the curved section of the handle 20 of the preform is nested in a constricting cavity 150 of the die which ensures that the handle is not distorted, nor the region between the junction points 22,24 stretched. The underside of the straight section of the handle forms a surface which, in effect, determines the shape of the container under the handle.

Figure 11:
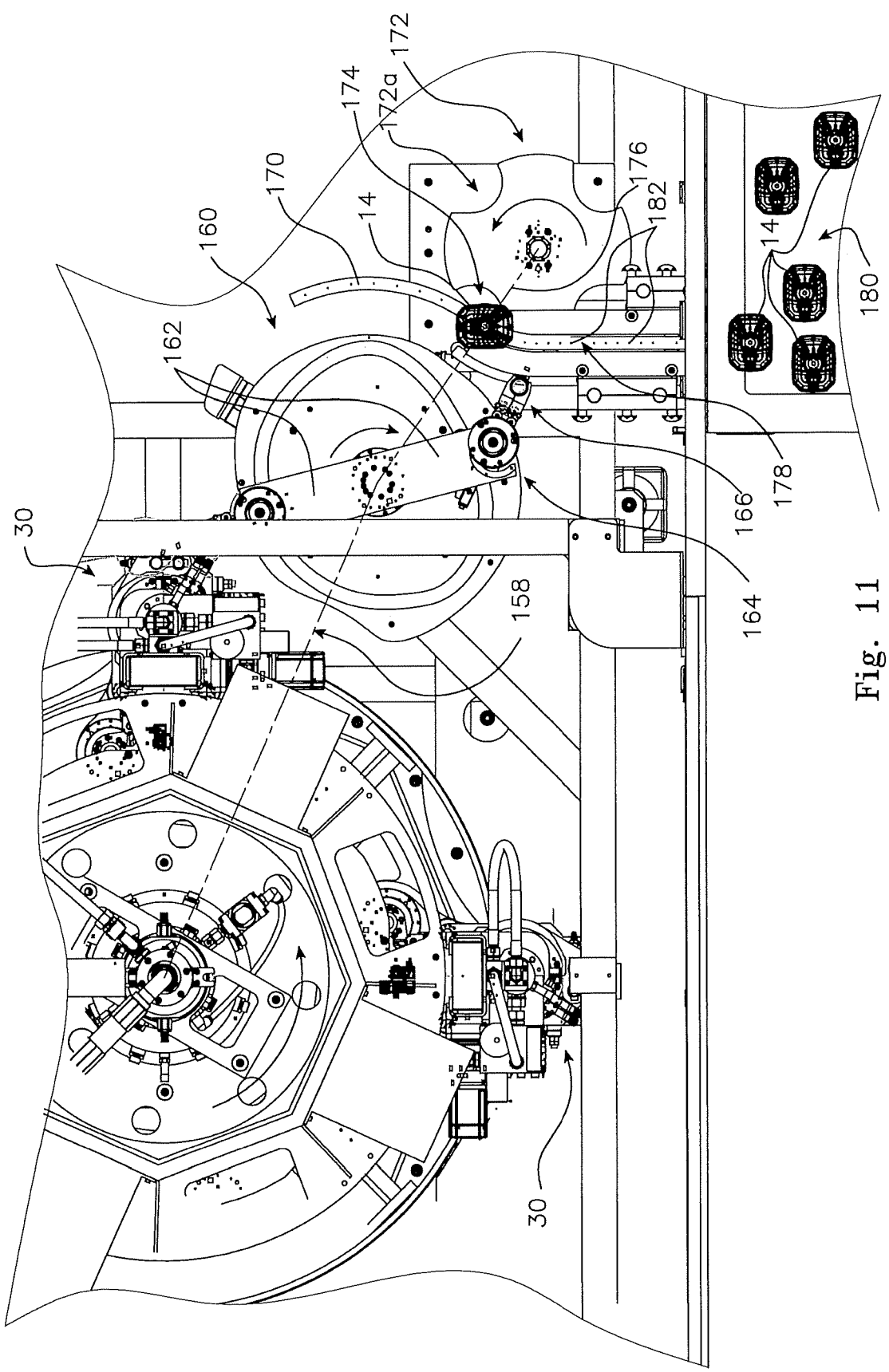
FIG. 11 is a plan view of a portion of the machine of FIG. 3 showing the region of transfer of blown containers from a stretch-blow-moulding die to a container receiving bin.

With the die halves 136 closed, stretch-blow-moulding of the container proceeds and the die 30 loaded at the die loading position 134 rotates towards the die unloading position 158 as shown in FIG. 11.

Container Unloading

A third rotating transfer system 160 is located adjacent the stretch-blow-moulding die assembly 120, and is configured in similar manner to that of the first and second rotating transfer systems 42,132 described above. As for the second rotating transfer system 132, the third rotating transfer system 160 includes opposing radial arms 162 at the ends of each of which is a third pick and place assembly 164. It does not however include a rotary actuator since the container which emerges from the die remains in an upright position through the discharge process.

As for the first and second rotating transfer systems, movements of a gripper 166 is controlled by a combination of the rotation of the opposing radial arms 160, the linear movement of the free element of the linear guide and the two cam loci.

As the stretch-blow-moulding die 30, now containing a finished container 14, nears the die unloading position 158 lying on the line 168 joining the centres of rotation of the stretch-blow-moulding die assembly 120 and of the opposing radial arms 160 of the third transfer system, the gripper of the pick and place is maneuvered into position to grasp the neck of the container. As the die reaches the die unloading position, the die halves open and the gripper extracts the blown container 14 from the die 30.

The third rotating transfer system 160 continuous to rotate, tanking the container 14 held by the gripper 166 into a discharge channel 172, with the base of the container passing over a guide rail 170. Guide rail 170 transitions from concentricity with the third rotating transfer system to concentricity with a rotating two-tiered outfeed wheel 172. As the container 14, now in the discharge channel 172, reaches a release position 174 lying on the line 176 joining the centres of rotation of the third rotating transfer system 160 and that of the outfeed wheel 172, the gripper 166 releases the neck and retracts. At the same time a scalloped indentation 172a of the rotating outfeed wheel captures the body of the container feeding it into a discharge channel 178. As containers follow the path of the gripper 166 and then a path determined by the outfeed wheel 172, the base of the container receives cooling air from orifices 182 in guide rail 170, backpressure from accumulating containers in the discharge channel 172 force containers to drop into a container receiving bin 180.

Control of the Machine

The operation of the machine 10 is under the control a programmable logic controller. As well as ensuring that all rotation drive servo motors operate synchronously, the controller provides for fully adjustability of the parameters of the preheating elements and of the parameters of the stretch-blow-moulding dies. This includes setting differential temperature gradients allowing for a gradually increasing exposure to heat as preforms progress around the preheating transport system, and automatic adjustment of heating element temperatures for changing ambient temperatures.

Control of the preheating is particularly critical in the present system because of the unique characteristics of the preform dictated by the integral handle of the preform. The preheating is thus designed to allow for lateral flow of material in the area between the two junction points of the handle while limiting longitudinal flow and extension during the stretching phase of the stretch-blow-moulding process. Instead, the manner in which heat is applied to the preform ensures that the bulk of polymer which forms the outer shell of the container of FIG. 2, is produced from that region of the preform below the lower junction point of the handle.

Figure 12:
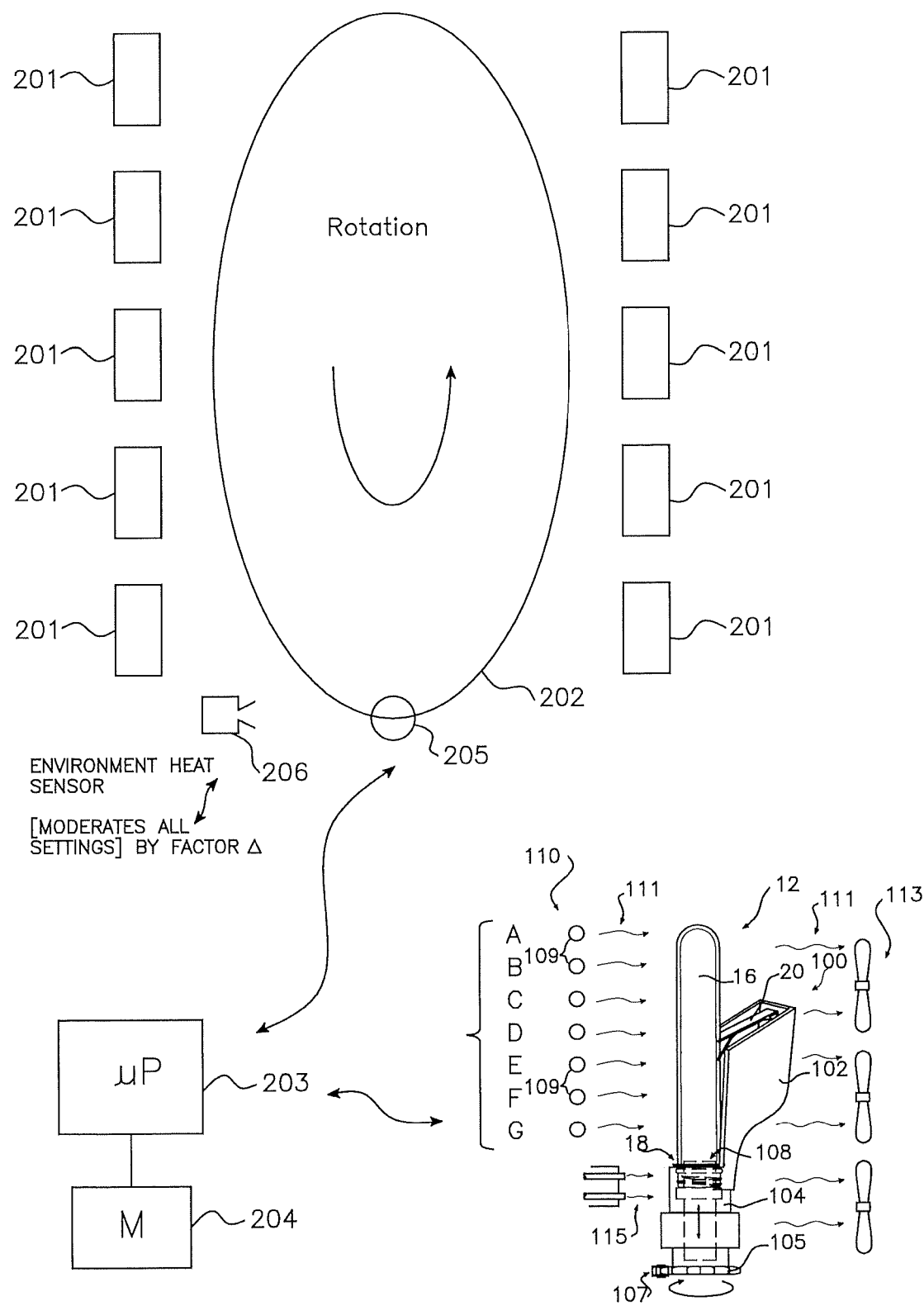
FIG. 12 is a schematic block diagram of control components associated with control of the heating and transport of the preforms usable with any of the above described embodiments.

FIG. 12 is a schematic block diagram of control components associated with control of the heating and transport of the preforms usable with any of the above described embodiments.

As best seen in the inset of FIG. 12, banks 110 of heating elements 109 are positioned along each of the straight sections of the loop rail system 92. Graded hot air 111 is drawn across the path of the preforms 12 by extractor fans 113. To prevent excessive heat build up of the cylindrical collar 104 and the neck 18 of the preform in the collar, a cooling air stream 115 is directed at the collars.

In a preferred form each bank 110 comprises a module 201. The modules 201 are arranged sequentially around the conveyer 202 as illustrated in FIG. 12.

In a preferred form a processor 203 in conjunction with memory 204 executes a program for control of the heating elements 109 of the modules 201.

In a particular preferred form each element 109 of each module 201 is controlled individually by the processor 203.

In an alternative preferred form the elements 109 are controlled as a group based on height—so the top most elements 109 of the modules 201 are controlled to a predetermined temperature together whilst the next down in height elements 109B are also controlled together to a predetermined temperature—and so on down to elements 109G at the lowest level.

In addition the processor 203 controls the speed of rotation of motor 205 in order to control the continuous speed of the preforms 16.

A temperature sensor 206, in one form an infrared temperature sensor provides environment temperature sensing which is utilised by processor 203 to modulate the degree of heating of all elements 109 by a difference factor delta ($\Delta$).

This allows for a global control of the system temperature in response to variations in ambient temperature.

As noted above, the stretch-blow-moulding machine is especially developed for, and adapted to, the feeding and transportation of a non-symmetrical preform with integral handle and, ultimately the stretch-blow-moulding of that preform into a container with an integral handle. The preform according to the invention may take a number of different forms described below, although common to all are the neck portion 18 and the integral handle 20 as shown in FIG. 1.

The preforms now to be described differ primarily in respect of the configuration of their internal surfaces, offering benefits of improved distribution of polymer material to the walls of the blown container as well as significant improvement in economy of manufacture due to reductions in the volume of polymer required.

First Preferred Preform Embodiment

Figure 13:
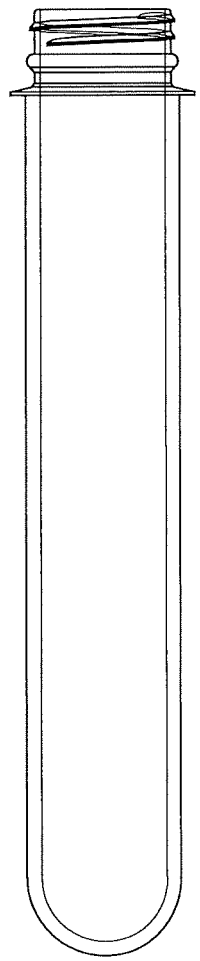
FIG. 13 is a side view of typical injection-moulded preform for stretch-blow-moulding of a polymer container.
Figure 13A:
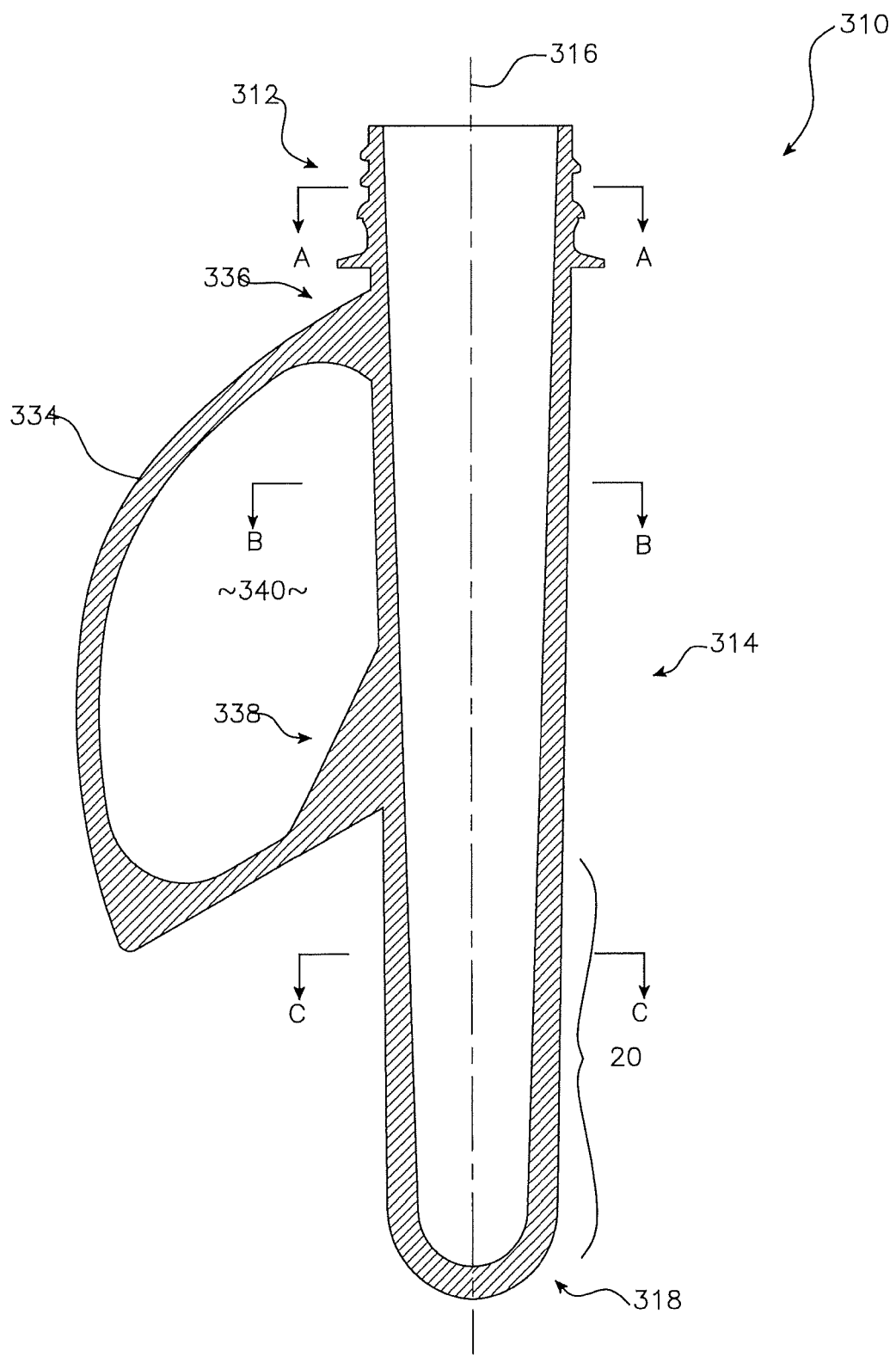
FIG. 13A is a sectioned side view of a preform according to a preferred embodiment of the invention in which a central vertical plane passing through a central vertical axis of the preform lies in the plane of the paper.

In a first preferred a preform 310 according to the invention as shown in FIG. 13A includes a finished neck portion 312 and a tubular hollow body portion 314 extending from below the neck portion. Similar to preforms of the prior art, the outer surfaces of the body portion 314 are defined by diameters centred on a central vertical axis 316, so that the body portion 314 approximates a cylinder but with a decrease in diameters from the neck portion 312 to the closed end 318 of the preform.

Figure 15:
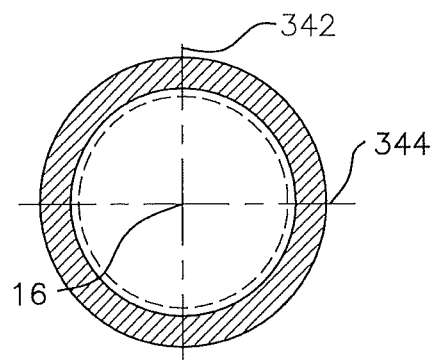
FIG. 15 is cross section along the vertical central axis of the mandrel of FIG. 14 taken at the level of A-A.
Figure 16:
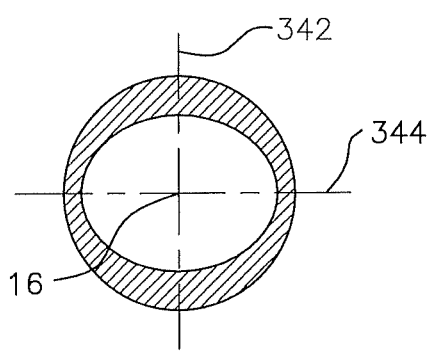
FIG. 16 is a cross section along the vertical central axis of the mandrel of FIG. 3 taken at the level B-B.

The internal surfaces of the preform 310 include surfaces of the hollow body portion 314 which are not concentric with the outer surfaces. Preferably, as shown in FIGS. 15 and 16, cross sections of the internal surfaces of the preform 310 are circular and concentric in the neck portion 312 of the preform as indicated by the cross section A-A, but below the neck portion are of ovoid form as indicated by section B-B. All sections are however centred on the central longitudinal axis 316 of the body of the preform.

Figure 14:
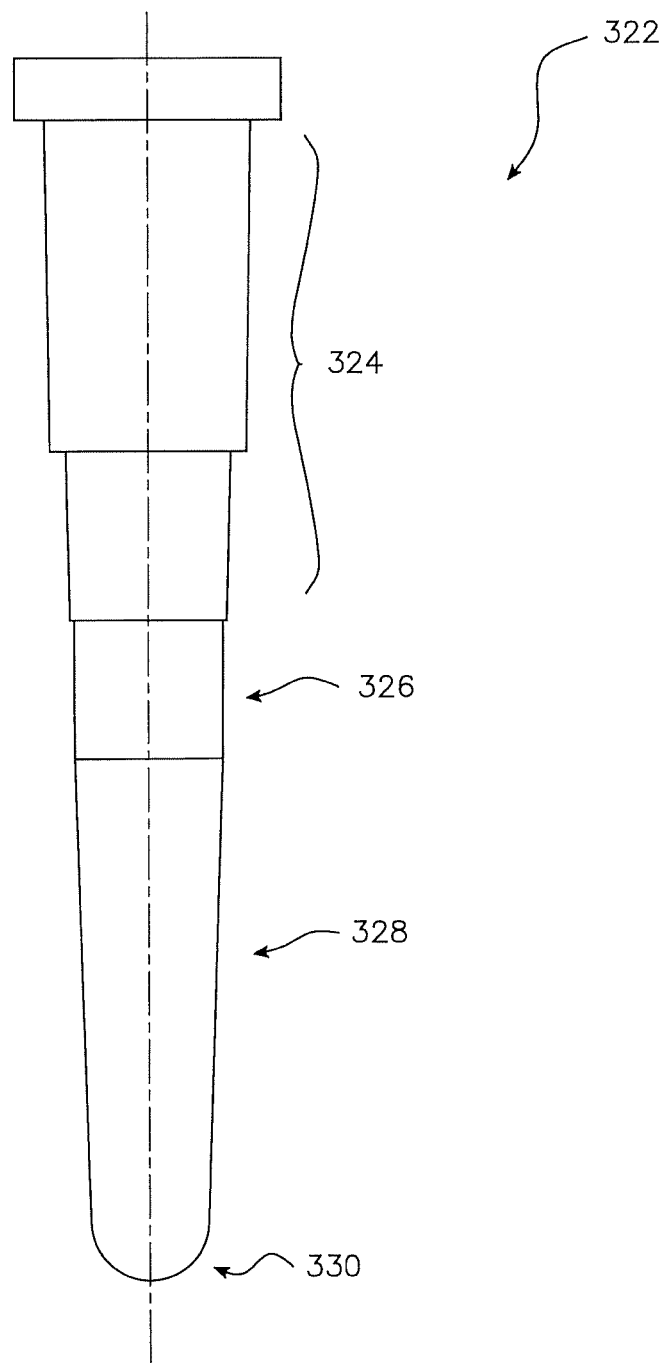
FIG. 14 is a side view of a mandrel for injection-moulding the preform of FIG. 13A in which a central vertical plane passing through a central vertical axis of the mandrel lies in the plane of the paper.

Referring now to FIG. 14, in a preferred arrangement, the mandrel 322 around which the preform 310 is injection moulded, comprises an upper region 324 of circular cross sections adapted to position and retain the mandrel in its correct position in an injection moulding cavity. A first preform-defining portion 326 of the mandrel extends from this upper region 324 to a depth equal to that of the neck portion 312 and is of circular cross section A-A as shown in FIG. 4 to form the concentric walls of the neck portion. The ovoid portion 328 of the mandrel depends from the first portion 326, extending to the tip 330 of the mandrel.

Given the ovoid shape of the cross sections of the ovoid portion 328, there is a short transition portion of the mandrel immediately below portion 326 forming the internal form of the neck portion, which transitions from the circular cross section A-A of portion 326 to the ovoid sections B-B. This transition thus takes the form an asymmetrical frustum of a cone; an upper end of which has a diameter equal to that of a lower end of the first portion 326 with the lower end of the transition portion conforming in cross section to the upper end of the ovoid cross section B-B of the remaining length of the preform.

It can be seen from FIG. 13A, that both the outer surfaces of the body portion 314 of the preform and the ovoid portion of the inside surfaces as defined by the mandrel 322, are tapering; that is, the diameters defining the external surface of the preform are decreasing from below the neck portion 312 to the bottom 318, while similarly, the major axis 344 and the minor axis 342 of the cross sections of the ovoid portion 328 also decrease accordingly.

Referring still to FIG. 13A, the preform 310 of the invention further includes, as noted above, an integral handle 334 which forms a loop of material extending vertically from an upper junction 336 below the neck portion 312 to a lower junction 338 with the outer surface of the preform. The handle 334 is centred on and defines a central vertical plane 340 (lying in the plane of the paper) which contains the central longitudinal axis 316 of the preform.

The mandrel 322, and thus the internal surfaces of the ovoid portion 328, are so oriented relative the handle 334, that major axis 344 of the ovoid cross section B-B lies in the central vertical plane 340.

It can thus be seen from FIG. 16 and cross section B-B that the wall thicknesses of the preform 310 in that portion 328 of the preform in which the inner surfaces are defined by the ovoid cross section, varies from a maximum at opposite ends of the minor axes 342 of the ovoid cross section to minimum thicknesses at outer ends of the major axis 340. Preferably, the ratio of maximum wall thickness to minimum wall thickness of the ovoid portion lies in the range of 2:1 and 2.2:1.

Figures 17, 18:
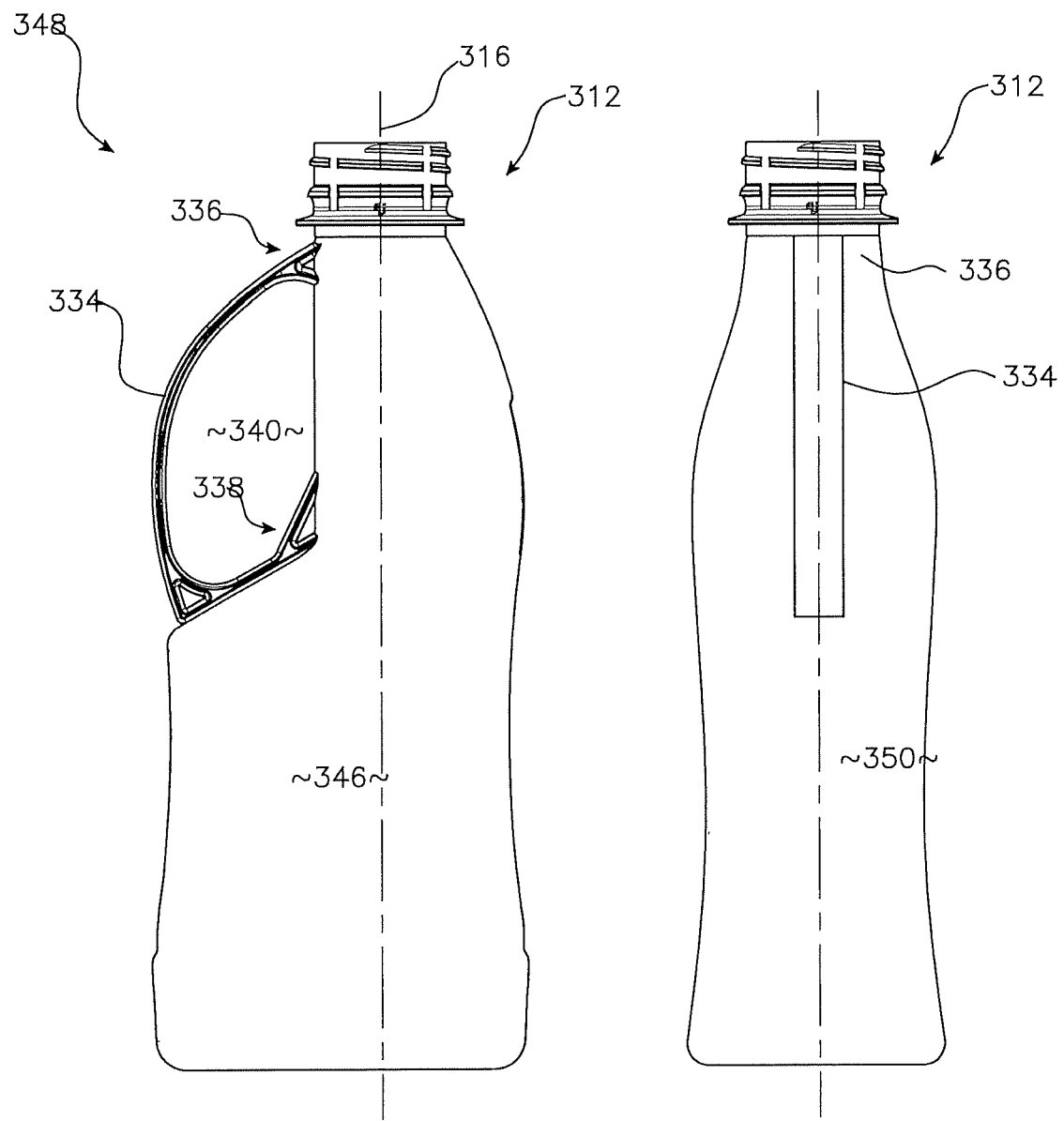
FIG. 17 is a side view of a container stretch-blow-moulded from the preform of FIG. 2.
FIG. 18 is an end view of the container of FIG. 17.

The distribution of polymer in the preform according to the invention, afforded by the non-symmetry of the ovoid portion, allows polymer walls of the preform in the region of maximum thickness to be biased predominantly towards the longer side walls 346 of a rectangular cross section blown container 348, while the polymer walls of the preform from the region of minimum thickness is predominantly distributed towards the shorter side walls 350 of the blown container such as shown in FIGS. 17 and 18. It can be seen from FIGS. 17 and 18 that the longer side walls 346 lie on either side of the central vertical plane 340 and thus the handle 334 so that the alignment of the major axis 344 with the vertical plane 340 ensures that the polymer from regions of maximum wall thickness are directed to those longer side walls. In preferred forms the preform of the first embodiment is produced by an injection moulding process as described earlier in this specification. In preferred forms the preform thus produced is reheated and blown on a continuously rotating, non-symmetric preform feed, stretch-blow-moulding machine as described earlier in this specification.

Second Preferred Preform Embodiment

With reference now to FIG. 19, in this preferred embodiment, the exterior surface 410 of the preform 400 of this embodiment, is of substantially cylindrical form. As for the first embodiment above, it too includes an integrally injection moulded handle 434. In this embodiment, the internal surfaces 414 of the preform are consistently circular in section as shown in the two sample cross sections FIG. 17A and FIG. 17B. However, again as is clear from the two cross sections and the sectioned side view of FIG. 17, there is a tapering of the internal surface 414 so that the wall sections, though concentric to the external surface, increase from a minimum thickness at the neck portion 412 of the preform to a maximum proximate its lower end 418. In preferred forms the preform of the second embodiment is produced by an injection moulding process as described earlier in this specification. In preferred forms the preform thus produced is reheated and blown on a continuously rotating, non-symmetric preform feed, stretch-blow-moulding machine as described earlier in this specification.

Third Preferred Preform Embodiment

Figures 20, 20A, 20B:
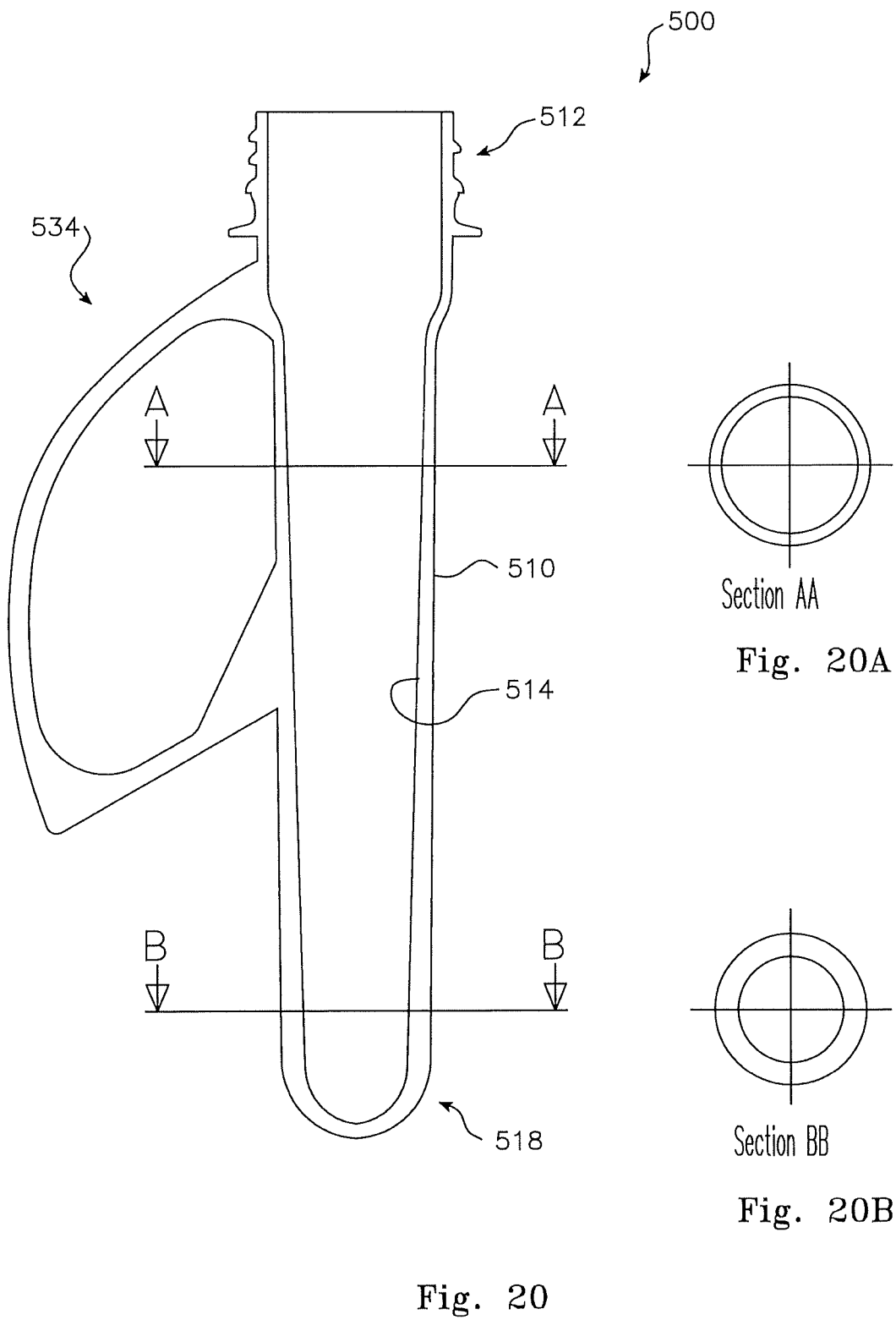
FIG. 20 is a sectioned side view of a further preferred embodiment of a preform according to the invention.
FIGS. 20A and 20B are selected cross sections of the preform of FIG. 20.

In this further preferred embodiment of the invention, a preform 500 as shown in FIG. 20, is formed to significantly reduce the volume of material required to produce the containers shown in FIGS. 17 and 18. As in the embodiments above, the preform 500 includes an injection moulded integral handle 534. Although in this embodiment, the neck portion 512 is identical in its exterior and internal forms to that of the earlier embodiments, there is a substantial reduction in the diameter of the substantially cylindrical portion of the body of the preform below the neck portion.

In this embodiment also, as in the second preferred embodiment above, the internal surfaces of the preform are consistently circular in section as shown in the two sample cross sections A and B of FIGS. 20A and 20B, but taper with the wall sections increasing from the minimum thickness obtaining in the neck portion and through the transition in diameters below the neck portion, to a maximum wall thickness proximate the lower end 518 of the preform.

As a further means of reducing the volume of material in the preform of this embodiment, the outer surface 510 below the neck portion 512, also tapers towards the lower end 518. In preferred forms the preform of the third embodiment is produced by an injection moulding process as described earlier in this specification. In preferred forms the preform thus produced is reheated and blown on a continuously rotating, non-symmetric preform feed, stretch-blow-moulding machine as described earlier in this specification.

Fourth Preferred Preform Embodiment

Figure 21:
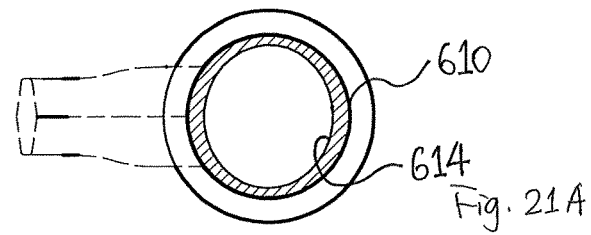
FIG. 21 is a sectioned side view of a further preferred embodiment of a preform according to the invention.
Figure 21:
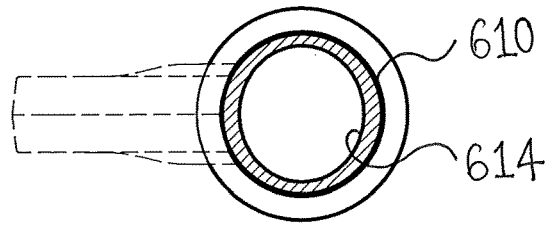
Figure 21:
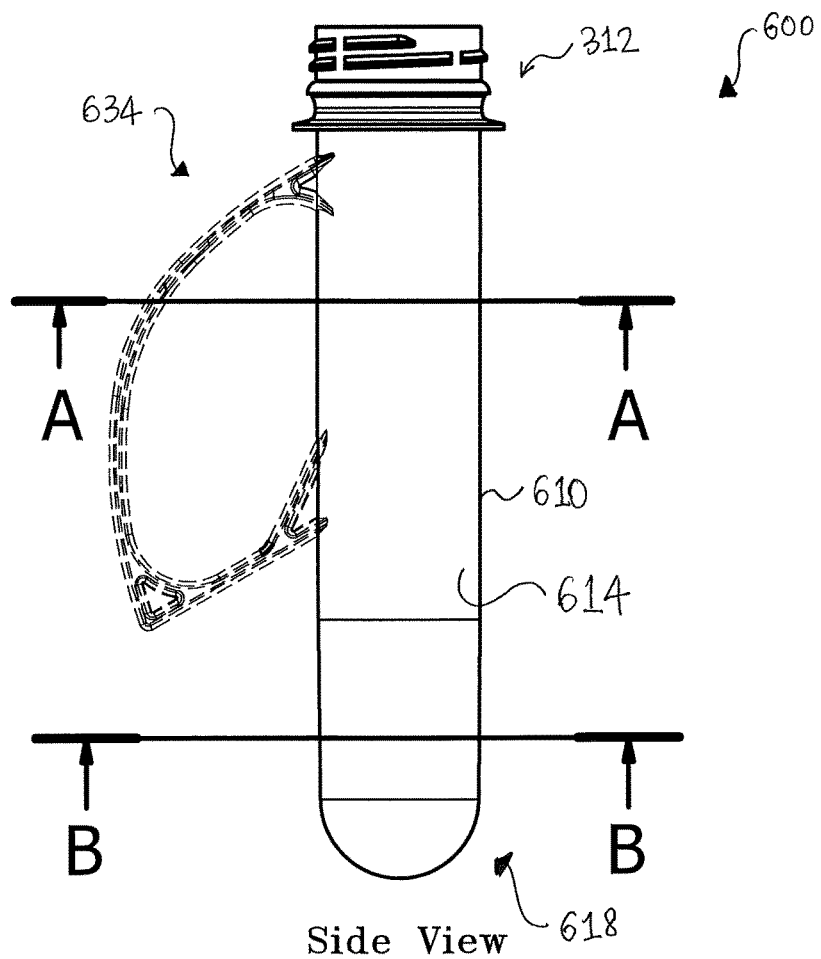

With reference now to FIG. 21, this preferred embodiment of a preform 600 according to the invention, shares a number of characteristics with that of the first and second preferred embodiments above. It has, (as have all the preform embodiments of the present invention), an integral handle 634 as previously described, and, as in the first preferred embodiment above, the internal surfaces 614 of the preform are not consistently of circular section throughout the length of the preform. However, the external surfaces 610 of the preform are substantially cylindrical in form as in the second preferred embodiment.

Thus, although the external surfaces 610 are defined by circular cross sections, the internal surface 614 varies from circular in cross section from the neck portion 612 down to section A-A in FIG. 21A, to then transition to an ovoid section B-B as shown in FIG. 21B, approaching the lower end 618.

A feature of this particular embodiment is that the wall thickness of the ovoid portion of the internal surface 614 of the perform at the ends of the major axes remains constant with the wall thicknesses of the concentric cross sections from section A-A and upwards, while there is a thickening of the walls increasing to maximum at the minor axis of the ovoid cross section. In preferred forms the preform of the fourth embodiment is produced by an injection moulding process as described earlier in this specification. In preferred forms the preform thus produced is reheated and blown on a continuously rotating, non-symmetric preform feed, stretch-blow-moulding machine as described earlier in this specification.

Fifth Preferred Preform Embodiment

The preform of this embodiment of a preform 700 shown in FIG. 22 is similar to that of the fourth preferred embodiment above, but here, as shown in the cross section views A-A and B-B of FIGS. 22A and 22b, the wall thickness at the outer ends of the major axes of the ovoid cross section portion of the preform is not maintained equal with the wall thickness of at and below the neck portion 712. Rather the wall thickness gradually increases from below the neck portion towards the lower end 718 of the preform.

It may be noted at this point, that in those forms of the perform as in this embodiment and that of the first preferred embodiment above, shaping the internal surface in these non-concentric forms of outer and inner surfaces, introduces considerable issues for the injection-moulding of the preforms.

Figure 24:
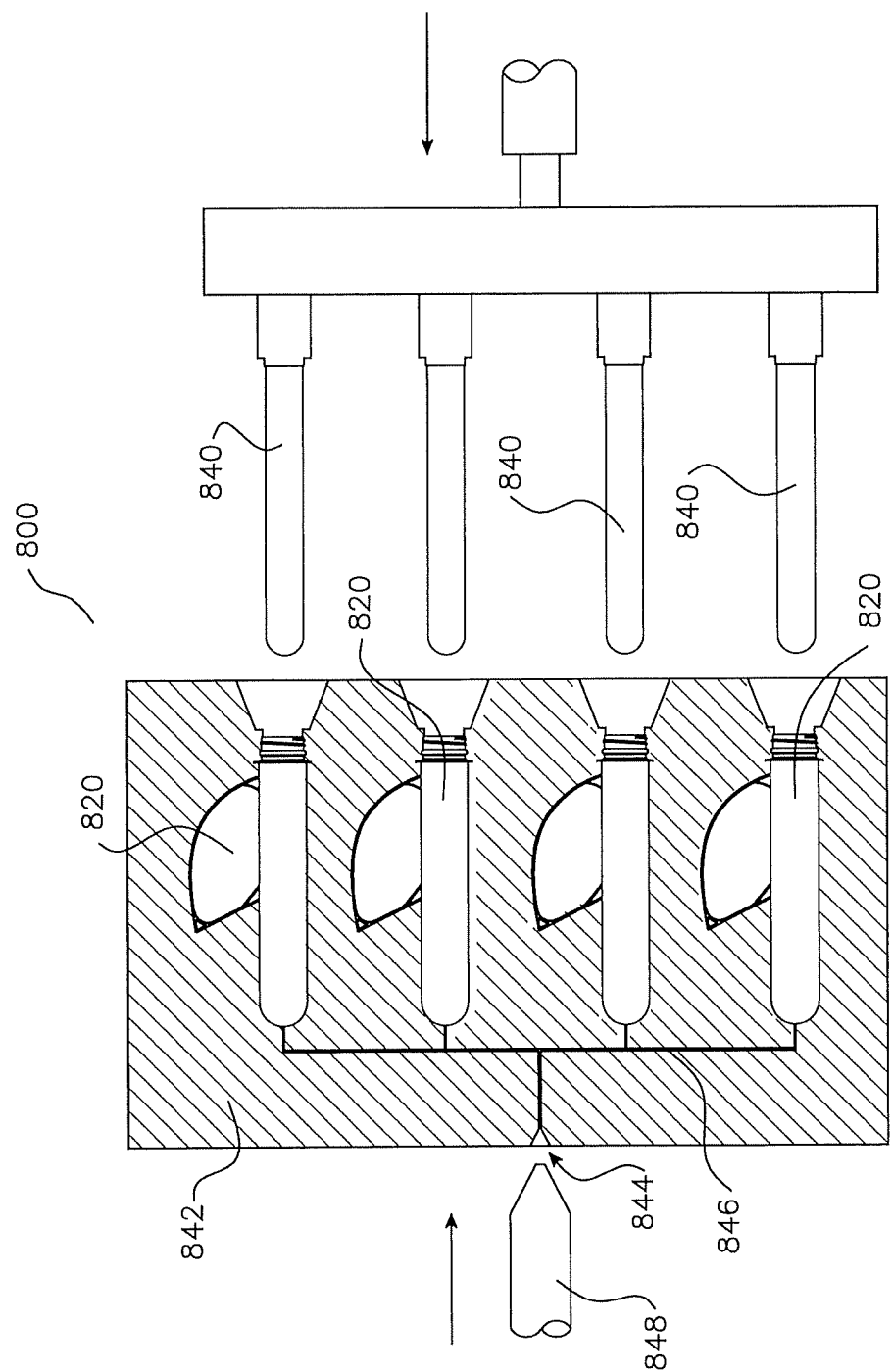
FIG. 24 is a schematic view of an injection moulding process for producing the preforms of FIGS. 13A and 19, 20 to 23.

As shown in FIG. 24, preforms, including those of the present invention, are typically injection moulded in multi-cavity dies 800 in which the cavities 820 in the die conform to the outer shape of the preform, including in the present cases, the shape of the integral handle. In preforms with concentric wall thicknesses, that is, with circular cross sections, the mandrels 840 for forming the internal surfaces will also be of circular cross sections. Thus, the only requirement for positioning such a mandrel relative the injection-moulding cavity is its concentricity with the neck portion of the cavity.

A mandrel for producing an internal surface of a perform which is wholly or partially non-circular in section may firstly require, a considerably more complex machining operation and, secondly it must be specifically oriented in the injection-moulding cavity.

Mandrels for preforms with non-circular cross sections must be positioned within the cavities of an injection-moulding die 820, one half of which is shown in FIG. 24 so that the major axes of the ovoid portion are aligned relative to a vertical central plane of the cavities. For preforms according to the present invention with integral handles, that vertical plane is the plane on which the handle of the preform is centred as set out above (in effect the face 842 of the die half).

To be effective in biasing polymer material flow from different wall thickness areas of the preform towards designated regions of the blown container, the orientation of the preform must be maintained in the cavity of the stretch-blow-moulding machine. That is, the vertical plane of the preform must coincide with a defined vertical plane of the container. In the present invention the vertical plane of the preform is defined by the integral handle and is made coincident in the stretch-blow-moulding cavity with the central vertical plane of the blown container which again is central to the integral handle of the container.

In a moulding cycle, the die halves are brought together to close the die and the array of mandrels 840 driven into the cavities 820. The injection nozzle 848 is then advanced into the injection pocket 844 and molten polymer forced through the runner system 846 to fill the spaces between the external surfaces of the cavities 820 and the mandrels 840 to produce the preforms.

Although the above description has focused in some embodiments on use of ovoid or offset cross sections to vary the wall thicknesses of at least a portion of a preform at any given cross section of that portion, it will be understood that such variation can be achieved with other non-concentric shaping of the mandrel. Again, although the ovoid cross sections described for the preferred embodiment are centred on the vertical axis of the preform, other material distribution effects may be achieved by an asymmetric positioning of these cross section. In preferred forms the preform of the fifth embodiment is produced by an injection moulding process as described earlier in this specification. In preferred forms the preform thus produced is reheated and blown on a continuously rotating, non-symmetric preform feed, stretch-blow-moulding machine as described earlier in this specification.

Sixth Preferred Preform Embodiment

This further preferred embodiment of a preform according to the invention and shown in FIG. 23, the preform 900 is provided with a wall thickness 911 in the region between the junction points 936 and 938 of the integrally injection-moulded handle 934 specifically to optimise control of the material in this region in the stretch-blow-moulding stage of producing a container from the preform.

In this embodiment, the external surface 910 of the preform is again substantially cylindrical. The internal surface of the preform is likewise formed of circular cross sections, but as can be seen in both the side sectioned view of FIG. 13A and cross section AA of FIG. 13A, the centres of a portion of the cross sections (typified by section A-A) do not lie on the central axis 930 of the body of the preform, but are offset towards the handle 934.

The effect is to "thin" the wall thickness in the region between the junction points 936 and 938 of the handle. This is possible and desirable, because firstly there is a lesser volume of material required to form the container since there is no longitudinal stretching of this region and, secondly the thinning provides a significant cost saving in material.

It will be understood that all the above embodiments of the preform seek to optimise both the distribution of the polymer material of the preform into the blown container and do so by reducing the weight and thus the volume of material for reasons of economy of production. In preferred forms the preform of the sixth embodiment is produced by an injection moulding process as described earlier in this specification. In preferred forms the preform thus produced is reheated and blown on a continuously rotating, non-symmetric preform feed, stretch-blow-moulding machine as described earlier in this specification.

Seventh Preferred Preform Embodiment

Figure 26:
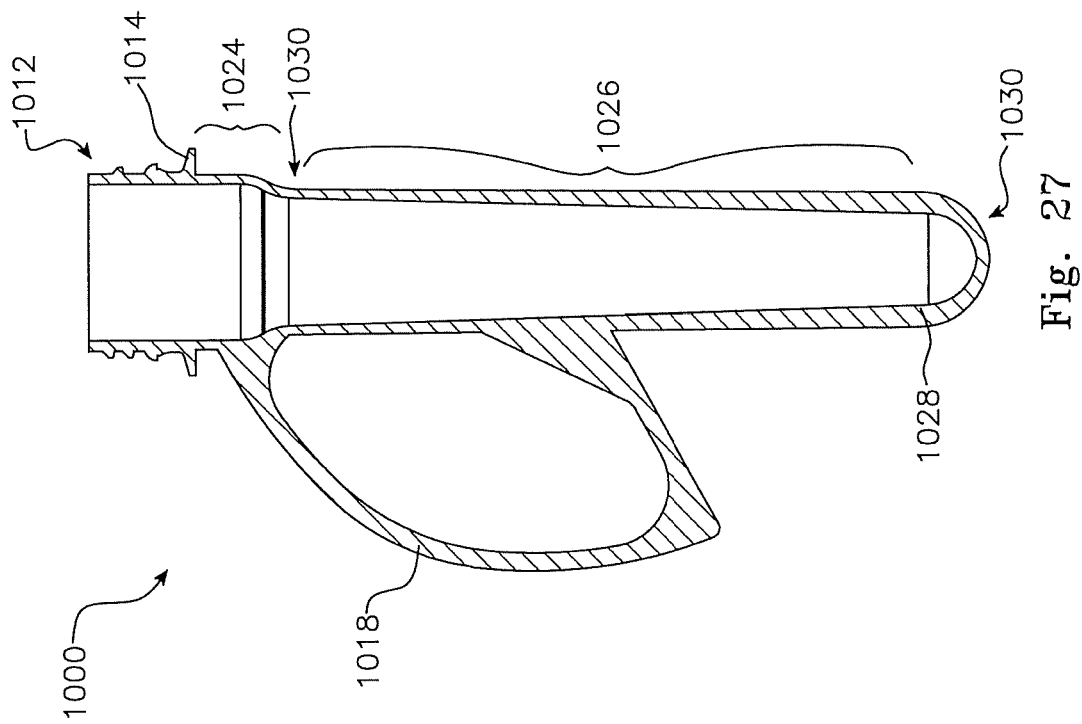
FIG. 26 is a preform of reduced PET volume according to a preferred embodiment of the invention.
Figure 27:
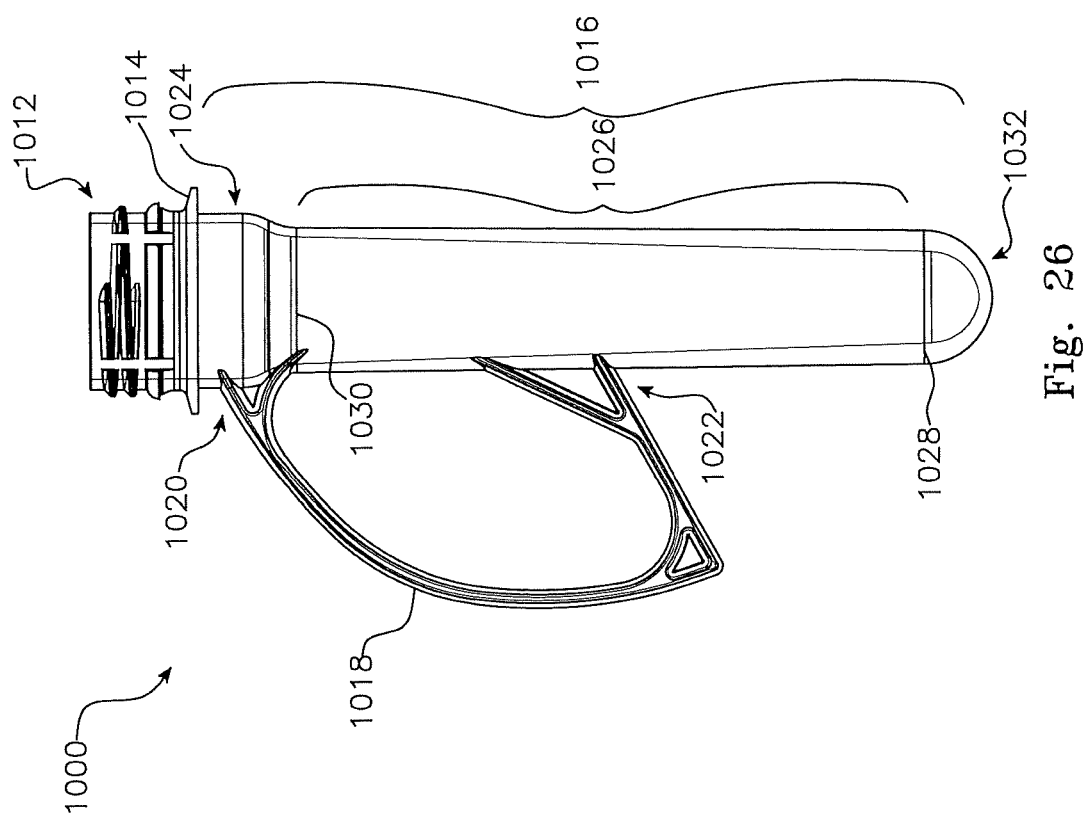
FIG. 27 is a cross section view of the body of the preform of FIG. 26 showing variations in wall thickness.
Figure 28:
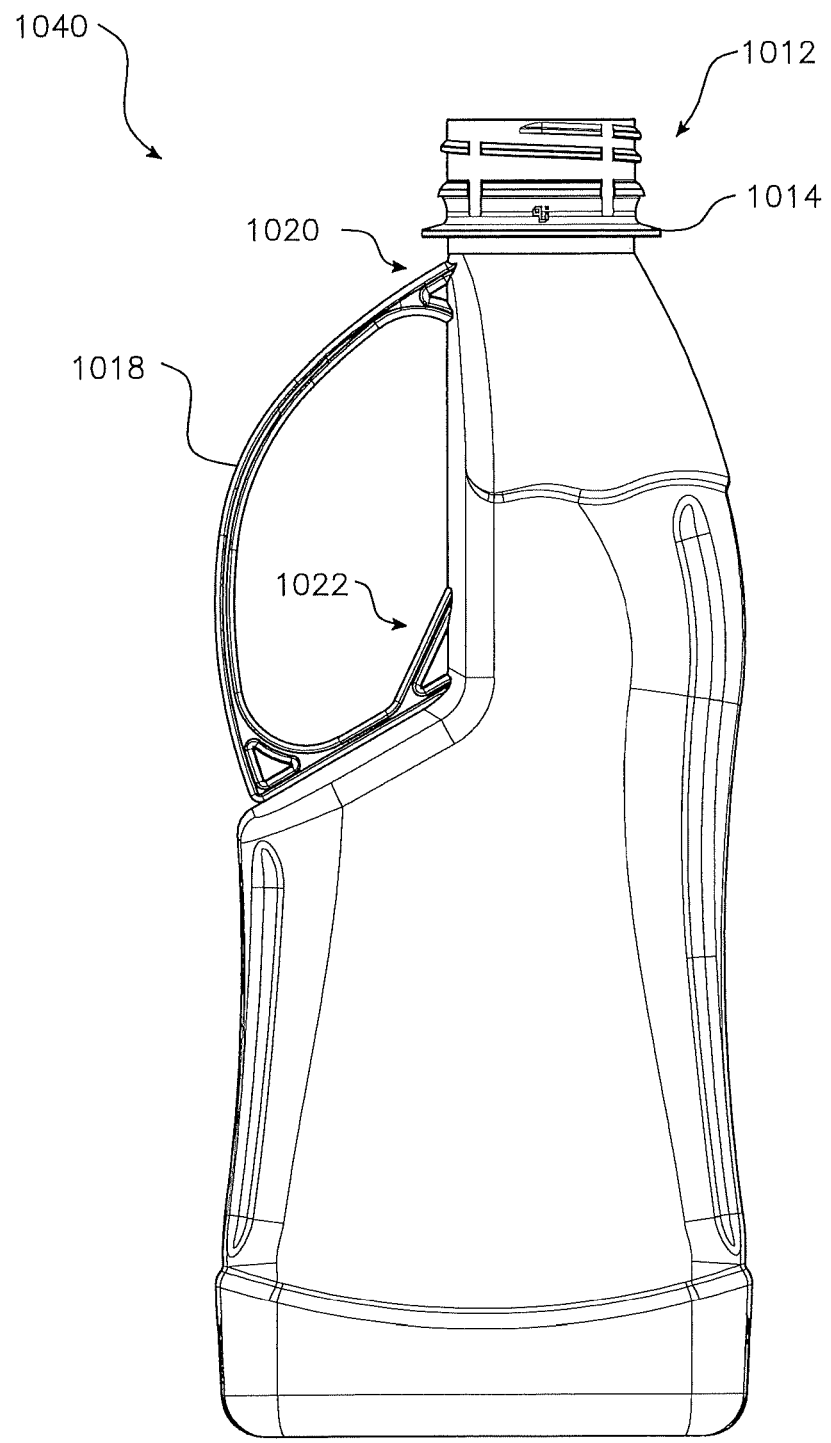
FIG. 28 is a side view of a container stretch-blow-moulded from the preform of FIGS. 26 and 27.

With reference to FIGS. 26 and 27, a preform 1000 for stretch-blow-moulding the container 1040 shown in FIG. 28, is comprised of a neck portion 1012, a collar 1014 and a body 1016 extending from below the collar. As in the preform according to prior art shown in FIG. 1, the preform 1000 includes an integral handle 1018 joined to the body 1016 at first junction position 1020 just below the collar 1014 and a second junction position 1022 along the length of the body.

The first cylindrical portion 1024 of the body extending below the collar 1014, is substantially of constant diameter, and in the region immediately below the collar, the diameter is substantially that of the finished container as can be seen in FIG. 28.

But it can be seen firstly from a comparison between the preform 1000 according to the present invention, and the preform of the prior art, that there is a significant reduction in diameter of the body 1016 below the first cylindrical portion 1024.

Furthermore, it is clear that this second portion 1026 of the body, between the reduction in diameter and the tangent line 1028 with the bottom portion 1030, is not cylindrical but forms a portion of a narrow cone, with the base diameter 1030 of the cone, that is its largest diameter, significantly smaller than the diameter of the first cylindrical portion 1024. Thus, this large reduction in diameter and the tapering provide a first significant reduction in the volume of PET contained in the preform of the invention.

Turning now to the cross-section view of FIG. 27, the walls of the body 1016 of the preform 1000, vary considerably in thickness. While the wall thickness of the neck portion 1012 and the first portion 1024 below the collar 1014 are substantially of a constant thickness, that of the second portion 1026 varies from a relatively thin wall section at the base diameter 1030, to a maximum thickness proximate the tangent line 1028.

The wall thickness of the bottom portion 1032 is further varied, being reduced from the maximum thickness at the tangent line 1028 to a minimum at the base of the bottom portion.

This thinning of the wall thickness in the region below the maximum diameter 1030 of the second portion 1026, augments the reduction in material volume provided by the diameter reduction and the form of the second portion 1026.

As well as providing savings in material volume, these variation in wall thicknesses are designed to evenly distribute the volume of PET material to various areas of the walls of the stretch-blow-moulded container 1040 shown in FIG. 28, to an average thickness of approximately 0.5 mm. In preferred forms the preform of the seventh embodiment is produced by an injection moulding process as described earlier in this specification. In preferred forms the preform thus produced is reheated and blown on a continuously rotating, non-symmetric preform feed, stretch-blow-moulding machine as described earlier in this specification.

Eighth Preferred Preform Embodiment

With reference to FIGS. 33, 34 and 35 there is illustrated a preform having an integral handle with a flared portion thereby to impart an ergonomic aspect to the lifting of containers blown from the preform.

Turning now to FIG. 33, in a preferred form of the preform, a preform 2100 includes a neck 2102, a body portion 2103 and a handle 2113. The neck 2102 has a threaded portion 2104 and a locating ring 2105. The preform is injection moulded from PET material in accordance with the teaching elsewhere in this specification. The handle in its configuration as injection moulded in its preform state, remains unaltered by the stretch blow-moulding process forming the resulting container from the continuous blow moulding process described elsewhere in this specification.

In order to produce the container, the preform 2100 shown in FIGS. 33 to 35, is fed into a blow moulding machine such for example as the machine 10 shown schematically in FIG. 3, and blow moulded according to bi-axial orientation blow moulding techniques. During this process the neck 2102 is held in a mandrel 322, as shown in FIG. 14 of a transport system of the machine 10 in such a way as to prevent its expansion in the stretch blow-moulding die 30.

The loop of orientable material forming the handle 2113 has a generally uniform cross section from proximate the lower connection region 2116 to a gradually widening cross section 2124 approaching the upper connection region 2115 with the cross section reaching and maintaining a maximum width proximate the upper connection region 2115 as can be seen in FIGS. 34 and 35.

With reference again to FIG. 33, integrally moulded first, second and third strengthening elements 2135, 2136 and 2137 are provided respectively at each of the upper connection region 2115, the lower connection region 2116 and at the junction between the straight section 2118 and the arcuate section 2120 of the handle 2113.

The first strengthening element 2135 at the upper connection region 2115 comprises a curved strengthening element conforming generally in width and in cross section to the width and cross section of the widened portion 2124 of the handle proximate the upper connection region. The curved strengthening element extends from a first separate connection region 2140 on the body portion 2103 of the preform (and on the blown container) below the upper connection region 2115 and merges with the loop of orientable material proximate a first end 2141 of the maximum width of the handle.

The second strengthening element 2136 at the lower connection region 2116 of the handle, comprises a straight strengthening element conforming generally in width and cross section with the width and cross section of the straight section 2118. The straight strengthening element extends from a second separate connection region 2142 above the lower connection region 2116 of the straight section of the handle, to merge with the straight section of the handle proximate the lower connection region.

The third strengthening element 2137 at the junction of the straight section 2118 and the arcuate section 2120 of the handle, comprises a further curved strengthening element conforming generally in width and cross section with the width and cross section of the handle of both the straight section 2118 and the arcuate section 2120 adjacent the junction. Respective outer ends of this further curved element merge with each of the straight 2118 and arcuate 2120 sections.

It should be noted that, in this instance, the width of the first strengthening element 2135 is the same as that of the maximum width of the widened part 2124 of the handle proximate the upper connection region 2115. It is this increased width of the first strengthening element 2135 which provides for a larger area for distributing the load of a container over the index finger of a hand (not shown) lifting the container, while the curvature of the first strengthening element is selected to fit comfortably on the average index finger of a human hand.

Preferably, each strengthening element 2135, 2136 and 2137 includes a web of orientable material within boundaries formed respectively between the body portion 2112 of the preform and the first and second strengthening elements 2135 and 2136, and between the third strengthening element 2137 and the straight and arcuate sections 2118 and 2120. Each web of orientable material is aligned with and extends equally in both directions from the central line 2132 of handle. In preferred forms the preform of the eighth embodiment is produced by an injection moulding process as described earlier in this specification. In preferred forms the preform thus produced is reheated and blown on a continuously rotating, non-symmetric preform feed, stretch-blow-moulding machine as described earlier in this specification.

Ninth Preferred Preform Embodiment

Figure 36:
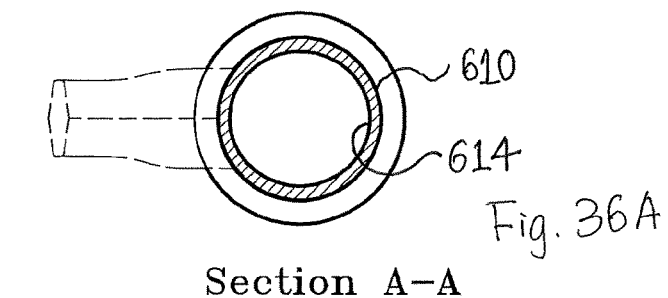
FIG. 36 is a sectioned side view of a further preferred embodiment of a preform according to the invention.
Figure 36:
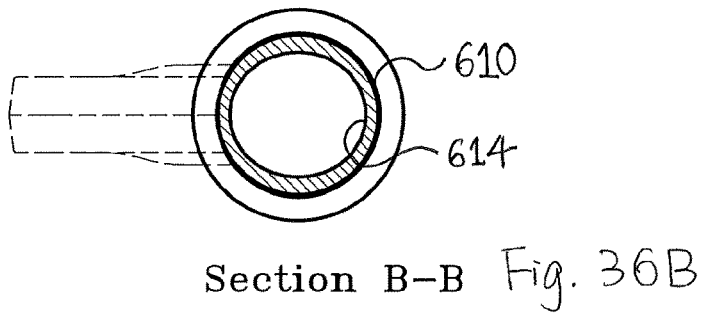
Figure 36:
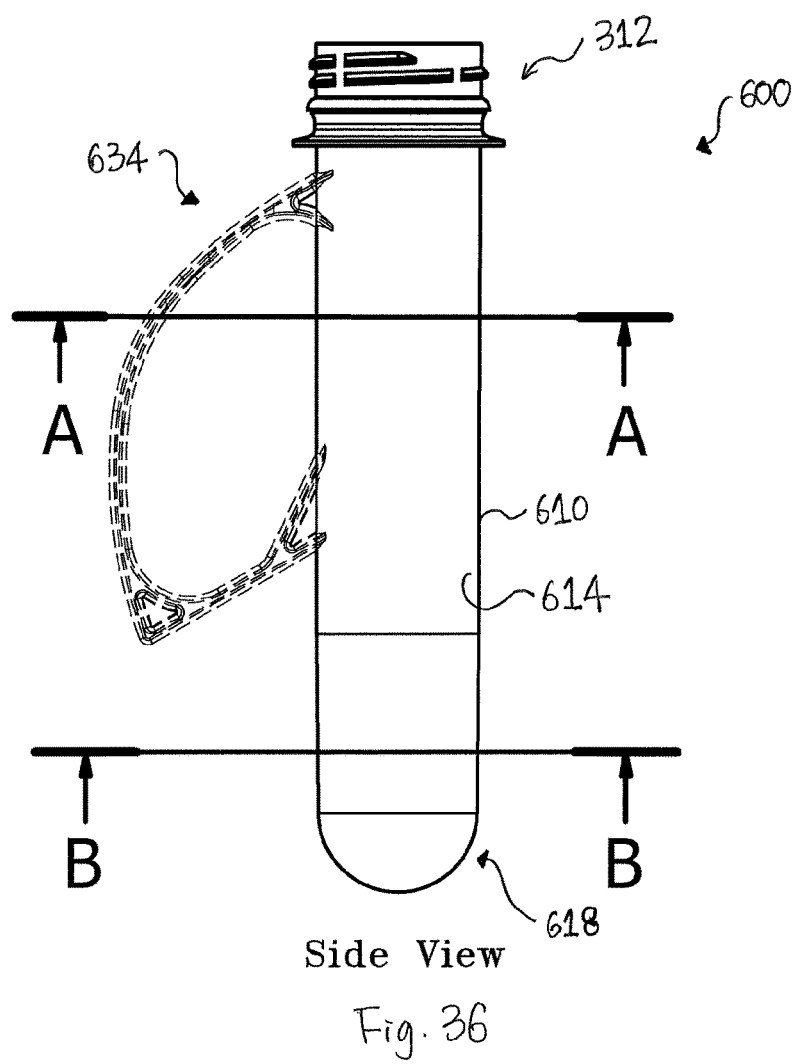

With reference to FIG. 36 there is illustrated a ninth embodiment of the preform showing alternative cross section arrangements for the purpose of reducing volume of the preform. In this instance like components are numbered as for the fourth embodiment with reference to FIG. 21. In this instance the cross section wall profile as shown in section AA and section BB is rotated 90 degrees as compared with the wall profile of FIG. 21. In preferred forms the preform of the ninth embodiment is produced by an injection moulding process as described earlier in this specification. In preferred forms the preform thus produced is reheated and blown on a continuously rotating, non-symmetric preform feed, stretch-blow-moulding machine as described earlier in this specification.

Tenth Preferred Preform Embodiment

Figure 37:
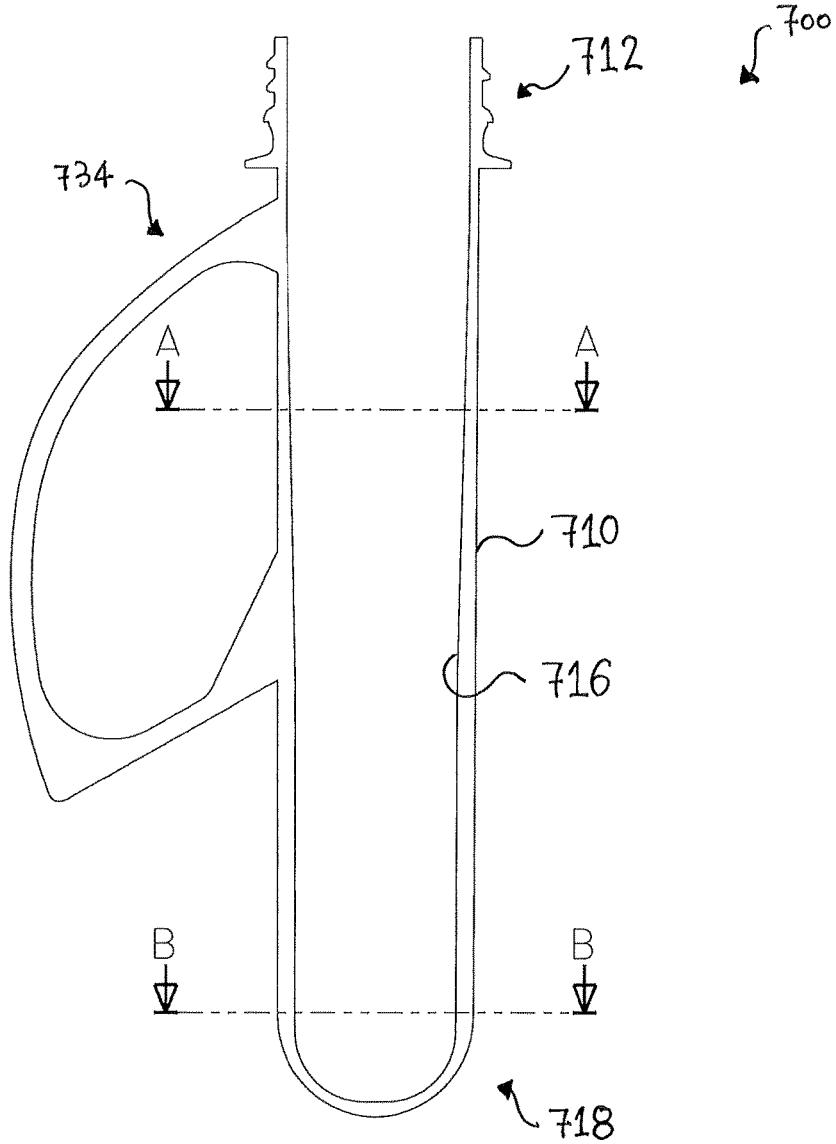
FIG. 37 is a sectioned side view of a further preferred embodiment of a preform according to the invention.
Figure 37A:
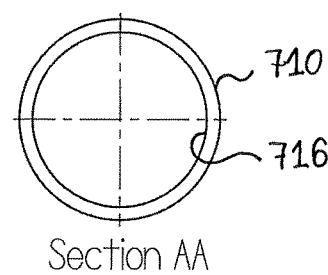
FIGS. 37A and 37B are selected cross sections of the preform of FIG. 37.
Figure 37B:
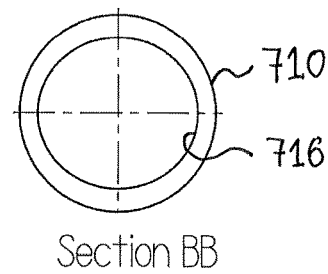

With reference to FIG. 37 there is illustrated a tenth embodiment of the preform showing alternative cross section arrangements for the purpose of reducing volume of the preform. In this instance like components are numbered as for the fifth embodiment with reference to FIG. 22. In this instance the cross section wall profile as shown in section AA and section BB is rotated 90 degrees as compared with the wall profile of FIG. 22. In preferred forms the preform of the tenth embodiment is produced by an injection moulding process as described earlier in this specification. In preferred forms the preform thus produced is reheated and blown on a continuously rotating, non-symmetric preform feed, stretch-blow-moulding machine as described earlier in this specification.

Notes on the Handle

In preferred forms the integral handle of the preform is not substantially deformed or substantially changed in shape during the stretch-blow-moulding process but substantially retains its as-injection-moulded shape. The blow-moulding cavity shown in FIG. 10 includes a recess specifically shaped to the form of the handle as injection moulded. This it will be understood is also a primary function of the heat shield to protect the handle from heat which could cause distortion of the handle while the preform is transported around the preheating stage of the machine.

Injection Moulding of Preforms

A preferred system of injection moulding any one of the above described preforms will now be described with reference to FIGS. 29 to 31. As noted elsewhere, the integral, double connect handles of the containers which are stretch-blow-moulded from the preforms, introduce considerable complexity in the design and operation of the injection moulding tooling.

Typically, in the injection moulding of preforms for symmetrical or non-handled containers, the bodies of the preforms below the neck are formed in cavities in the "hot", fixed section of the injection moulding die, with the threaded neck portions formed in opposing half cavities carried on the face of the moving die section. After a mould cycle, when the die opens, the bodies of the preforms are drawn out of their cavities by the necks which, at this first opening stage, are retained in the still closed opposing half cavities and move with the opening die section. The opposing half cavities now part to release the necks and a stripper plate is activated to force the preforms off the cores (which are fixed to the moving die section).

Figure 29:
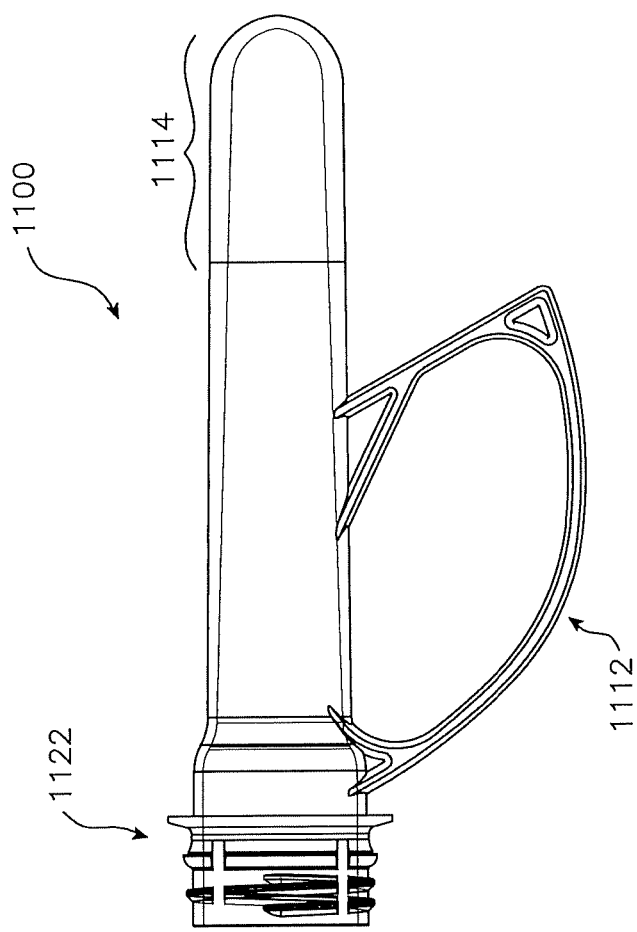
FIG. 29 is a further side view of a preform with integrally formed handle according for stretch-blow-moulding in the machine of the invention.
Figure 30:
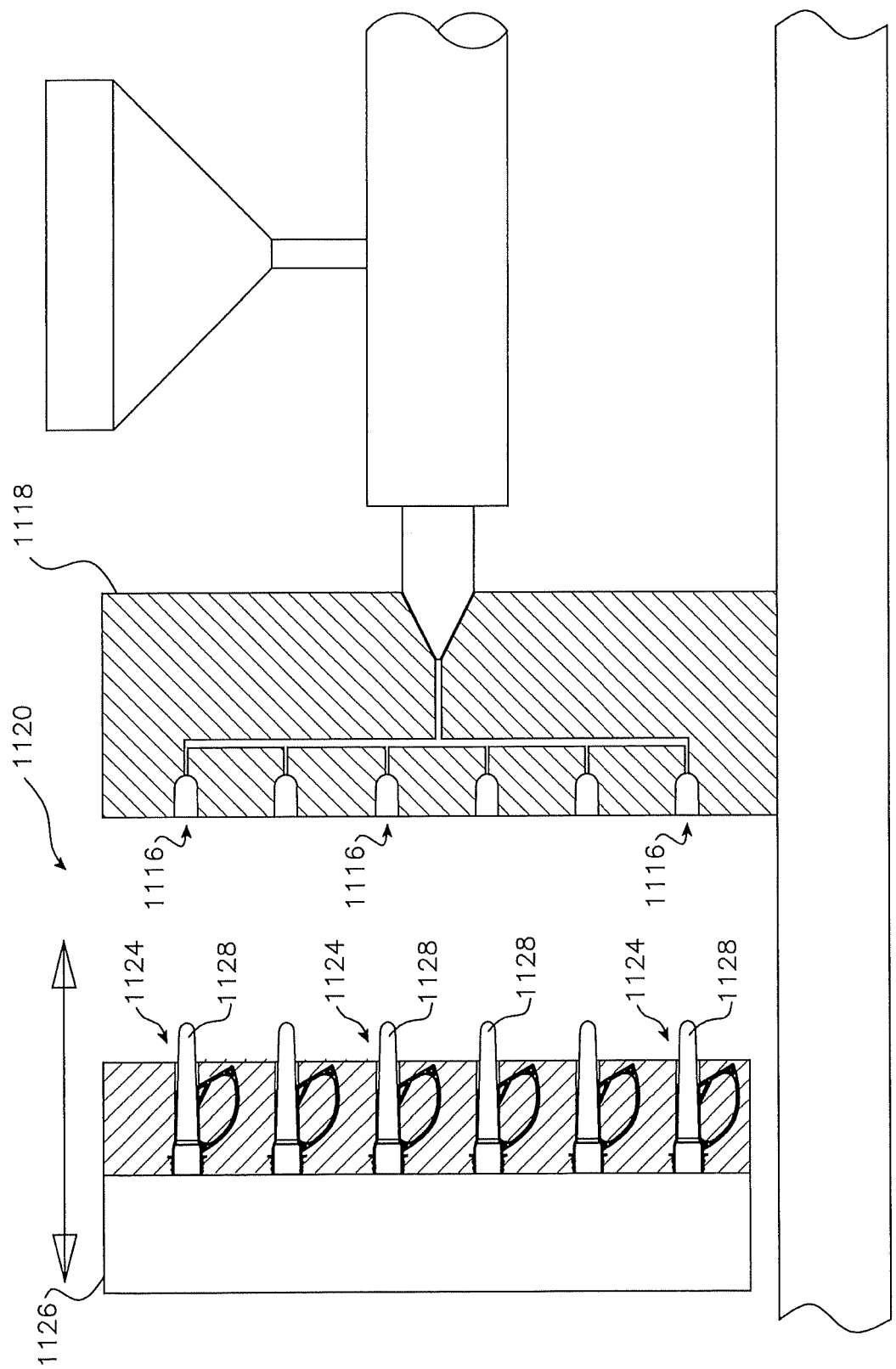
FIG. 30 is a sectioned, schematic side view of an injection moulding press and injection moulding die for moulding the preforms for use in the continuous rotating stretch-blow-moulding machine of the invention, with the die opened prior to an injection moulding cycle.
Figure 31:
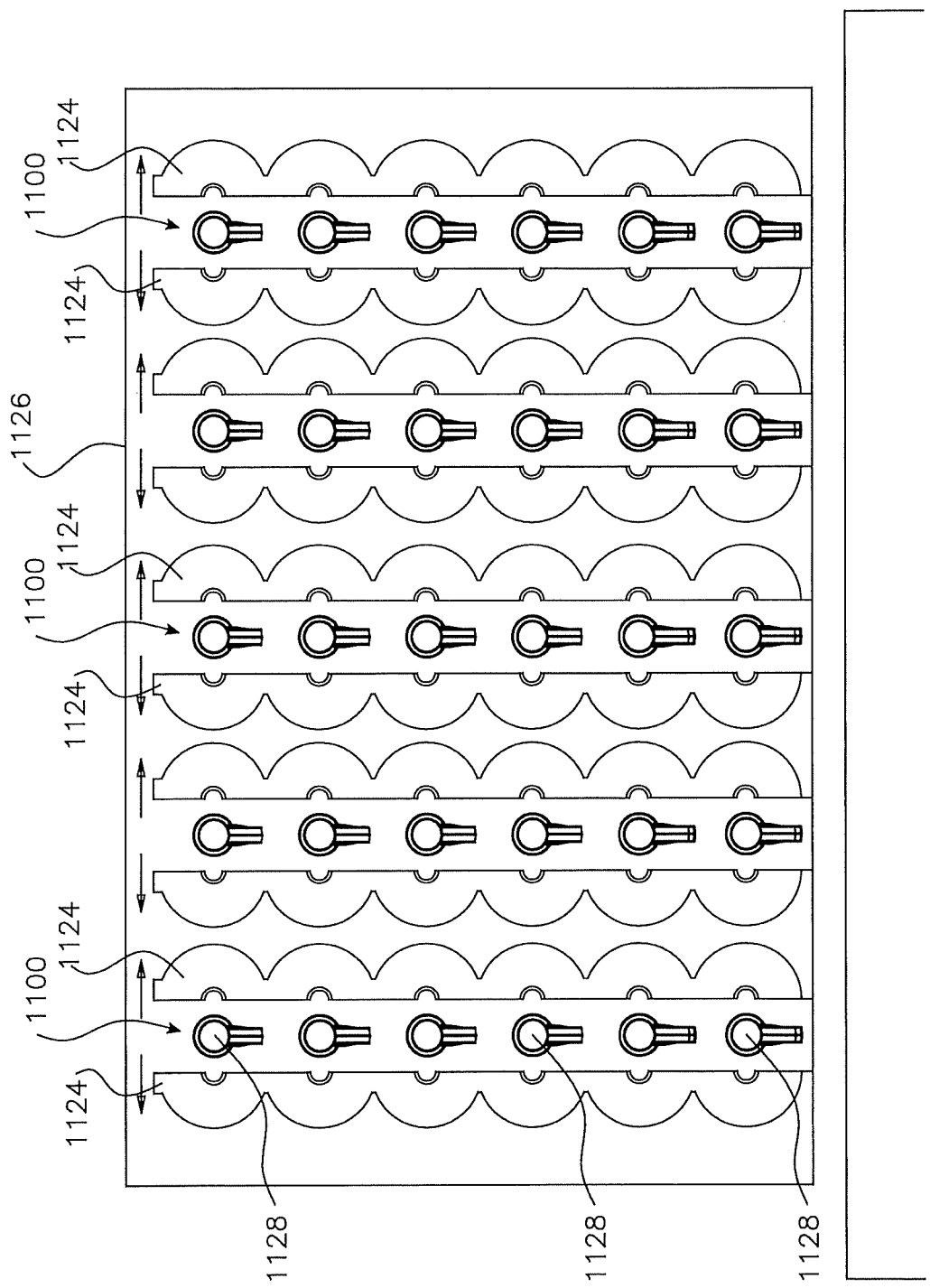
FIG. 31 is a front view of the face of the moving die section of the injection moulding die of FIG. 30 at the end of an injection moulding cycle (with the heated fixed die section removed)

With reference now to FIG. 29 to 31, for preforms 1100 with handles 1112, only that section 1114 below the handle can be formed in cavities 1116 in the heated, fixed section 1118 of the die 1120, with the neck 1122 and handle 1112 formed in much longer and more complex opposing half cavities 1124 carried on the moving die section 1126. Again, the cores 1128 to form the internal shape of the preforms 1100 are fixed to the moving die section 1126 and are located on the common axis of the cavities 1116 in the heated fixed side of the die and the opposing half cavities.

In contrast to the demoulding of symmetrical preforms, the bodies of which are exposed to air immediately the die opens, a much larger section of the preforms of the present invention is retained in the opposing half cavities 1124 and therefore require a longer delay before preforms have cooled and are sufficiently stable for stripping off the cores 1128. This adds considerably to the mould cycle time for preforms with handles.

Figure 32:
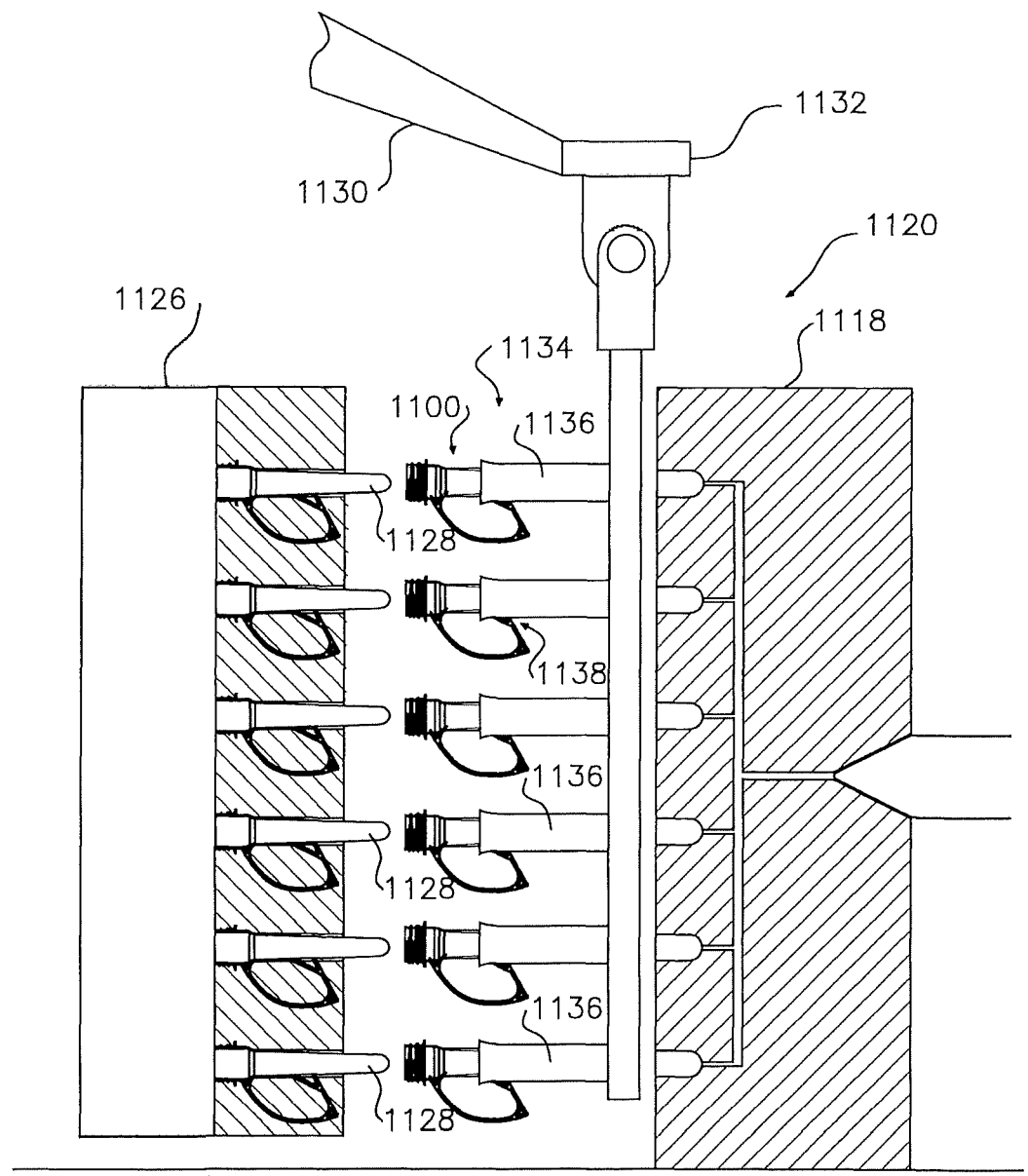
FIG. 32 is a further view of a part of the injection moulding press showing extraction of moulded preforms by vacuum elements inserted into the opened die by a robot.

In order to reduce cycle time and thus increase production, in the system of the present invention referring now to FIG. 32, a robot 1130 (only a portion of the arm of which is shown in FIG. 32) is employed in the demoulding of the preforms 1100. The robot arm end effector 1132 is fitted with an array 1134 of vacuum cups 1136, equal in number and spaced according to the number and spacing of the cavities in the injection moulding die as shown in FIG. 31. Towards the end of a mould cycle this array 1134 of vacuum cups is poised above (or to the side of) the injection moulding die 1120 and as soon as the die opens sufficiently to allow insertion of the array, the robot brings the array into registered position between the parted sections 1118 and 1126 of the die, and advances the vacuum cups 1136 to fit over the lower ends of the preforms.

It is important for correct extraction of the preforms that the handles remain aligned in their as-moulded orientation to prevent rotation of the handles into positions at which they may be caught on edges of the opposing cavity halves. For this reason the vacuum cups are provided with a slot or channel 138 at their outer ends which slides around the lower end of the handle. By this means also a larger portion of the preform is covered by the vacuum cup. Vacuum is now applied to the cups 1136 and the robot retracts the array 1134, and the performs 1100 now secured by vacuum pressure in the cups, to draw the preforms off the cores. Once free of the cores the array of vacuum cups and retained preforms are withdrawn from between the heated fixed section 1118 and the moving side 1126 of the die, and rotated so that the axes of the preforms are in a substantially vertical orientation. Vacuum pressure is then cut allowing the preforms to fall from the vacuum cups into a receiving bin.

The advantage of the use of vacuum in the demoulding process rather than a conventional stripper plate, is that the application of vacuum aids significantly to the cooling of the preforms, thus allowing their extraction at an earlier point in the mould cycle and shortening that cycle. This is particularly beneficial for the preforms of the present invention in which the end below the handle, being the last part of the preform to be formed (injection proceeding from the tip of the closed end of the preform), is at the highest temperature when the die opens. Additionally the slot or channel which accommodates the lower part of the handle, provides for a greater portion of the preform to be subjected to the cooling provided by air flow into the suction cups when vacuum is applied just before suction cups fully envelop the lower and mid portions of the preforms.

The cooling proceeds further as the robot draws the array of vacuum cups and preforms away from the die and over a receiving bin. The array is then rotated from the initial as-removed from the die position, that is with the axes of the preforms horizontal, to the vertical allowing the preforms to fall out of the cups when vacuum pressure is cut, and into the receiving bin.

INDUSTRIAL APPLICABILITY

The continuous movement of previously injection moulded, non-symmetrical preforms from their initial feeding into the machine 10 through the various continuously rotating stages described above, provides a marked improvement in output and quality of containers stretch-blow-moulded from such preforms. This continuous flow from preform infeed to the outfeed of container is made possible by the unique features of the transfer systems of the machine and the control of orientation of the preform handles at each transfer, and that of the preform supporting mandrels at transfers into and away from the preheating stage.

Figure 25:
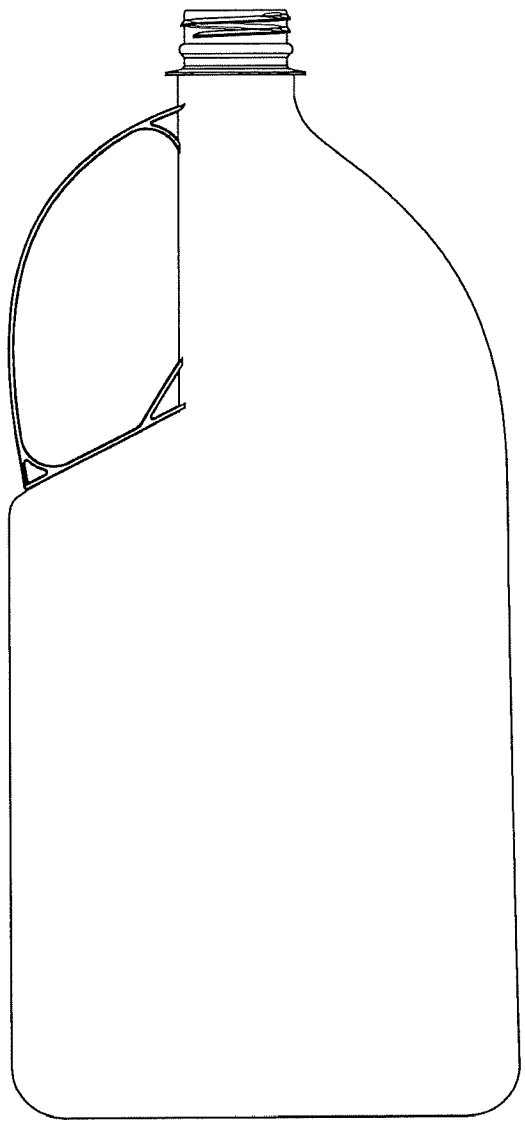
FIG. 25 is a container with integral handle as blow-moulded from the preform of FIG. 13.

The preforms of the above described embodiments, provide for the stretch-blow-moulding of a container in the stretch-blow-moulding machine, which is equal in capacity to that of the container of the prior art shown in FIG. 25, but with a significant reduction in the volume of PET and conferring an optimum distribution of material from the preform to form the containers shown in FIGS. 17 and 18. Thus, the preforms of the invention provides for a considerable reduction in raw material costs in the production of PET containers with integral handle.

The invention claimed is:

1. A continuously rotating, non-symmetric preform feed, stretch-blow-moulding machine dedicated to the stretch-blow-moulding of containers from non-symmetric injection moulded preforms; the non-symmetric preforms including an integral handle extending from a first junction point to a second junction point on a body of the preform; the body of the preform and the integral handle constituted from the same material; the machine including a preform orientation system to orient the handle of the preform into a known orientation at arrival at a pick off position.

2. The machine of claim 1 wherein preforms are in continuous motion from an initial preform pick off point through stretch-blow-moulding into the containers and ejection from the machine as stretch-blow-moulded containers.

3. The machine of claim 1 wherein the integral handle retains a shape of the handle as injection moulded through all stages of the stretch-blow-moulding machine to forming a handle on the stretch-blow-moulded container.

4. The machine of claim 3 wherein the stages of the stretch-blow-moulding machine include a handle orientation stage; all preforms arriving at the pick off point having the integral handle oriented in a predetermined direction relative to motion of the preform approaching the pick off position.

5. The machine of claim 3 wherein the stages of the stretch-blow-moulding machine include a continuously rotating first transfer system transferring preforms from a continuously rotating preform feeder wheel at the preform pick off position to a transfer to preheating position at a continuously rotating preheating stage.

6. The machine of claim 5 wherein a first pick and place apparatus of the first transfer system includes a preform grasping gripper; reciprocating rotation and linear displacement of the grasping gripper induced by a combination of a rotating carrier of the pick and place apparatus and two cam loci.

7. The machine of claim 6 wherein the rotating carrier is an arm of four radially extending support arms rotating about a common centre of rotation; an outer end of each support arm rotationally supporting a pick and place apparatus.

8. The machine of claim 7 wherein the support arms rotate above a fixed cam plate; the cam plate provided with an inboard cam channel for a first locus of the two cam loci and a periphery of the cam plate providing an outer cam surface for a second locus of the two cam loci.

9. The machine of claim 7 wherein a housing of a linear guide of the pick and place apparatus is rotationally mounted at the outer end of the supporting arm; an outrigger arm extending from the housing provided with a first cam follower locating in the cam channel.

10. The machine of claim 9 wherein a free sliding element of the linear guide is provided with a second cam follower;

the second cam follower maintained in contact with the outer cam surface by a spring.

11. A non-incremental, continuously rotating, stretch-blow-moulding machine fed with non-symmetric injection moulded preforms with integral handles and producing stretch-blow-moulded containers with integral handles from the non-symmetric injection moulded preforms with integral handles; the handles extending between a first junction point and a second junction point on a body portion of the preform; the body portion of the preform and the integral handle constituted from the same material; the machine including a preform orientation system to orient the handle of the preform into a known orientation at arrival at a pick off position; the known orientation of the preform maintained from the pick off position and during movement through a preheating stage; preforms being extracted from the preheating stage having been rotated into a position in which the handle is oriented for insertion into a continuously rotating stretch blow moulding die.

12. The machine of claim 11 wherein preforms are in continuous motion from an initial preform pick off point through stretch-blow-moulding into the containers and ejection from the machine as stretch-blow-moulded containers.

13. The machine of claim 11 wherein the integral handle retains a shape of the handle as injection moulded through all stages of the stretch-blow-moulding machine to forming a handle on the stretch-blow-moulded container.

14. The machine of claim 13 wherein the stages of the stretch-blow-moulding machine include a handle orientation stage; all preforms arriving at the pick off point having the integral handle oriented in a predetermined direction relative to motion of the preform approaching the pick off position.

15. The machine of claim 13 wherein the stages of the stretch-blow-moulding machine include a continuously rotating first transfer system transferring preforms from a continuously rotating preform feeder wheel at the preform pick off position to a transfer to preheating position at a continuously rotating preheating stage.

16. The machine of claim 15 wherein a first pick and place apparatus of the first transfer system includes a preform grasping gripper; reciprocating rotation and linear displacement of the grasping gripper induced by a combination of a rotating carrier of the pick and place apparatus and two cam loci.

17. The machine of claim 16 wherein the rotating carrier is an arm of four radially extending support arms rotating about a common centre of rotation; an outer end of each support arm rotationally supporting a pick and place apparatus.

18. The machine of claim 17 wherein the support arms rotate above a fixed cam plate; the cam plate provided with an inboard cam channel for a first locus of the two cam loci and a periphery of the cam plate providing an outer cam surface for a second locus of the two cam loci.

19. The machine of claim 17 wherein a housing of a linear guide of the pick and place apparatus is rotationally mounted at the outer end of the supporting arm; an outrigger arm extending from the housing provided with a first cam follower locating in the cam channel.

20. The machine of claim 19 wherein a free sliding element of the linear guide is provided with a second cam follower; the second cam follower maintained in contact with the outer cam surface by a spring.

* * * * *